US010107196B2

(12) United States Patent
Devine

(10) Patent No.: US 10,107,196 B2
(45) Date of Patent: Oct. 23, 2018

(54) ADJUSTABLE SIZE INLET SYSTEM

(71) Applicant: Michael Thomas Devine, Kansas City, MO (US)

(72) Inventor: Michael Thomas Devine, Kansas City, MO (US)

(73) Assignee: Thomas International, Inc., Kansas City, MO (US)

( * ) Notice: Subject to any disclaimer, the term of this patent is extended or adjusted under 35 U.S.C. 154(b) by 642 days.

(21) Appl. No.: 14/455,637

(22) Filed: Aug. 8, 2014

(65) Prior Publication Data

US 2016/0040595 A1  Feb. 11, 2016

(51) Int. Cl.
| | | |
|---|---|---|
| *F02K 3/077* | (2006.01) | |
| *F02C 7/042* | (2006.01) | |
| *B64D 33/02* | (2006.01) | |
| *F02K 3/06* | (2006.01) | |

(52) U.S. Cl.
CPC .............. *F02C 7/042* (2013.01); *B64D 33/02* (2013.01); *F02K 3/06* (2013.01); *F02K 3/077* (2013.01); *B64D 2033/0226* (2013.01); *B64D 2033/0253* (2013.01); *B64D 2033/0286* (2013.01)

(58) Field of Classification Search
CPC . F02C 7/042; F02K 3/06; F02K 3/077; B64D 33/02; B64D 2033/0226; B64D 2033/0286; B64D 2033/0253
See application file for complete search history.

(56) References Cited

U.S. PATENT DOCUMENTS

| | | | |
|---|---|---|---|
| 2,417,896 A | 3/1947 | Zimmerman | |
| 2,997,258 A | 8/1961 | Purpura | |
| 3,119,581 A | 1/1964 | Trevaskis | |
| 3,285,003 A * | 11/1966 | Martin | ............ B64C 1/34 |
| | | | 138/45 |
| 3,393,882 A | 7/1968 | Soulez-Lariviere et al. | |
| 3,446,223 A * | 5/1969 | Hancock | ......... F02C 7/042 |
| | | | 137/15.2 |
| 3,524,611 A | 8/1970 | Frank | |
| 3,618,867 A | 11/1971 | Skidmore | |

(Continued)

OTHER PUBLICATIONS

Smith, M., "VZ-11—VTOL Lift from Fans in the Wings," Flight International. No. 2756, vol. 81, Sep. 27, 1962.

(Continued)

*Primary Examiner* — Carlos A Rivera
*Assistant Examiner* — Kyle Thomas
(74) *Attorney, Agent, or Firm* — Polsinelli PC

(57) ABSTRACT

An adjustable size inlet duct system for a ducted fan propulsion system may change its inlet profile to enhance thrust levels in low-speed and hovering flight conditions and may change its inlet profile to reduce drag to permit faster flight speeds at higher operating speeds. The adjustable size inlet duct system may include duct petals and associated actuators. During slow speed flight, the petals may expand to generate a rounded large inlet area bellmouth profile. At higher flight speeds, the petals may contract to reduce the profile drag of the duct in forward flight. An optional exterior bypass duct may be included to provide additional thrust in excess of the thrust provided by the ducted fan. An optional annular electric motor housed in the exterior bypass duct may be included to generate still more excess thrust.

42 Claims, 23 Drawing Sheets

(56) References Cited

U.S. PATENT DOCUMENTS

| | | | |
|---|---|---|---|
| 3,664,612 A * | 5/1972 | Skidmore et al. | B64D 33/02 137/15.1 |
| 3,972,490 A | 8/1976 | Zimmermann et al. | |
| 4,132,240 A | 1/1979 | Frantz | |
| 4,147,029 A * | 4/1979 | Sargisson | F02C 7/042 137/15.1 |
| 4,865,268 A * | 9/1989 | Tracksdorf | B64D 33/02 137/15.2 |
| 4,994,660 A | 2/1991 | Hauer | |
| 5,000,399 A * | 3/1991 | Readnour | B64D 33/02 244/130 |
| 5,086,993 A | 2/1992 | Wainfan | |
| 5,145,126 A | 9/1992 | Patilla | |
| 5,150,857 A | 9/1992 | Moffitt et al. | |
| 5,152,478 A | 10/1992 | Cycon et al. | |
| 5,170,963 A | 12/1992 | Beck, Jr. | |
| 5,226,350 A | 7/1993 | Cycon et al. | |
| 5,277,380 A | 1/1994 | Cycon et al. | |
| 5,295,643 A | 3/1994 | Ebbert et al. | |
| 5,351,913 A | 10/1994 | Cycon et al. | |
| 5,407,150 A | 4/1995 | Sadleir | |
| 5,454,531 A | 10/1995 | Melkuti | |
| 5,743,493 A * | 4/1998 | McCaughan | B64C 21/025 244/130 |
| 5,746,390 A | 5/1998 | Chiapetta | |
| 5,779,188 A | 7/1998 | Frick | |
| 5,823,468 A * | 10/1998 | Bothe | B64B 1/08 244/12.3 |
| 5,890,441 A | 4/1999 | Swinson et al. | |
| 5,987,877 A * | 11/1999 | Steiner | B64D 33/10 60/39.08 |
| 6,170,778 B1 | 1/2001 | Cycon et al. | |
| 6,270,038 B1 | 8/2001 | Cycon et al. | |
| 6,450,445 B1 | 9/2002 | Moller | |
| 6,488,232 B2 | 12/2002 | Moshler | |
| 6,502,787 B1 | 1/2003 | Barrett | |
| 6,547,180 B1 | 4/2003 | Cassidy | |
| 6,691,949 B2 | 2/2004 | Plump et al. | |
| 6,817,570 B2 | 11/2004 | Yoeli | |
| 6,883,748 B2 | 4/2005 | Yoeli | |
| 7,032,861 B2 | 4/2006 | Sanders | |
| 7,249,732 B2 | 7/2007 | Sanders et al. | |
| 7,281,680 B2 | 10/2007 | Mielkuti | |
| 7,658,346 B2 | 2/2010 | Goossen | |
| 7,681,832 B2 | 3/2010 | Colclough | |
| 7,806,362 B2 | 10/2010 | Yoeli | |
| 8,240,597 B2 | 8/2012 | Entsminger | |
| 8,402,739 B2 * | 3/2013 | Jain | F04D 27/0253 137/15.1 |
| 2002/0113165 A1 | 8/2002 | Moshler | |
| 2007/0200027 A1 | 8/2007 | Johnson | |
| 2010/0019098 A1 | 10/2010 | Collette | |
| 2011/0001017 A1 | 1/2011 | Burdisso | |
| 2011/0155860 A1 | 6/2011 | Chapman et al. | |
| 2011/0171007 A1 * | 7/2011 | Johnson | F01D 17/162 415/145 |
| 2011/0277483 A1 * | 11/2011 | Khalid | B64C 7/02 60/772 |
| 2012/0307440 A1 | 12/2012 | Franz | |
| 2013/0220435 A1 * | 8/2013 | James | B64D 29/08 137/15.1 |
| 2014/0064955 A1 * | 3/2014 | Senter | F01D 9/042 415/209.3 |
| 2015/0121841 A1 * | 5/2015 | Izquierdo | F02K 3/075 60/204 |
| 2016/0298550 A1 * | 10/2016 | Kupratis | F02C 3/13 |

OTHER PUBLICATIONS

Johansen, H., "600-m.p.h. Vertifan Jet Can Hover Like a Copter." Popular Science, Sep. 1966, pp. 69-73.

Machine Translation of Abstract for Carbonel, J., La SNECMA von Zborowski et le Colère, Editions Artipresse, (ISBN 978-2-919231-01-0) presentation en ligne, 2011, printed Jan. 22, 2018, from https://www.aviationmegastore.com/la-snecma-von-zborowski-et-le-coleoptere-9782915205121-artipresse-9782915205121-france/product/?action=prodinfo&art=99195.

* cited by examiner

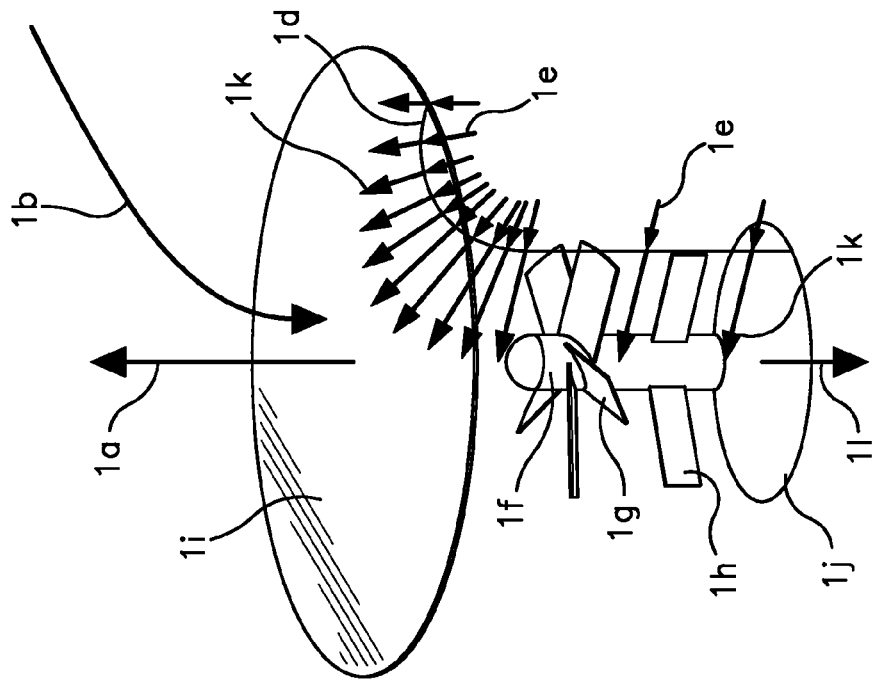
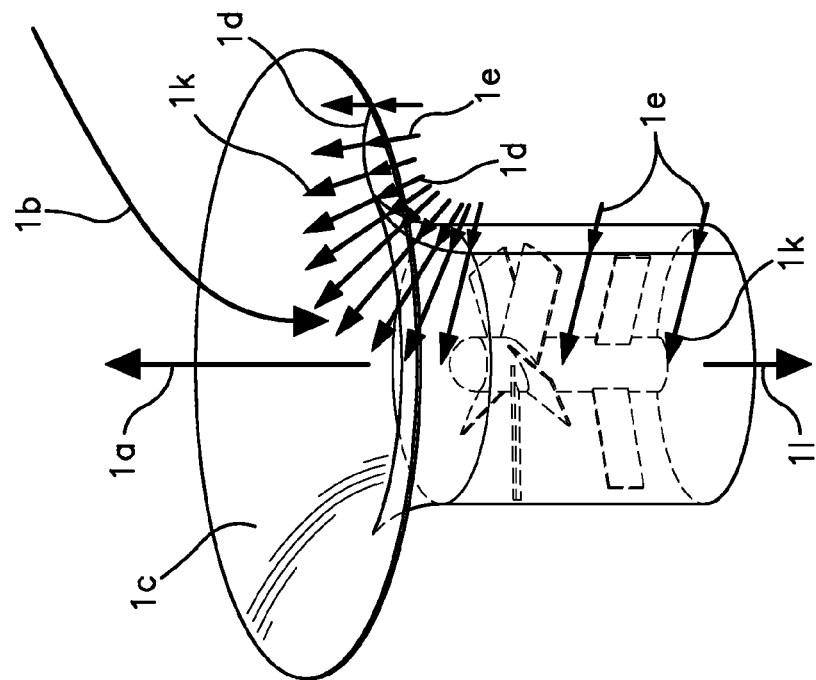

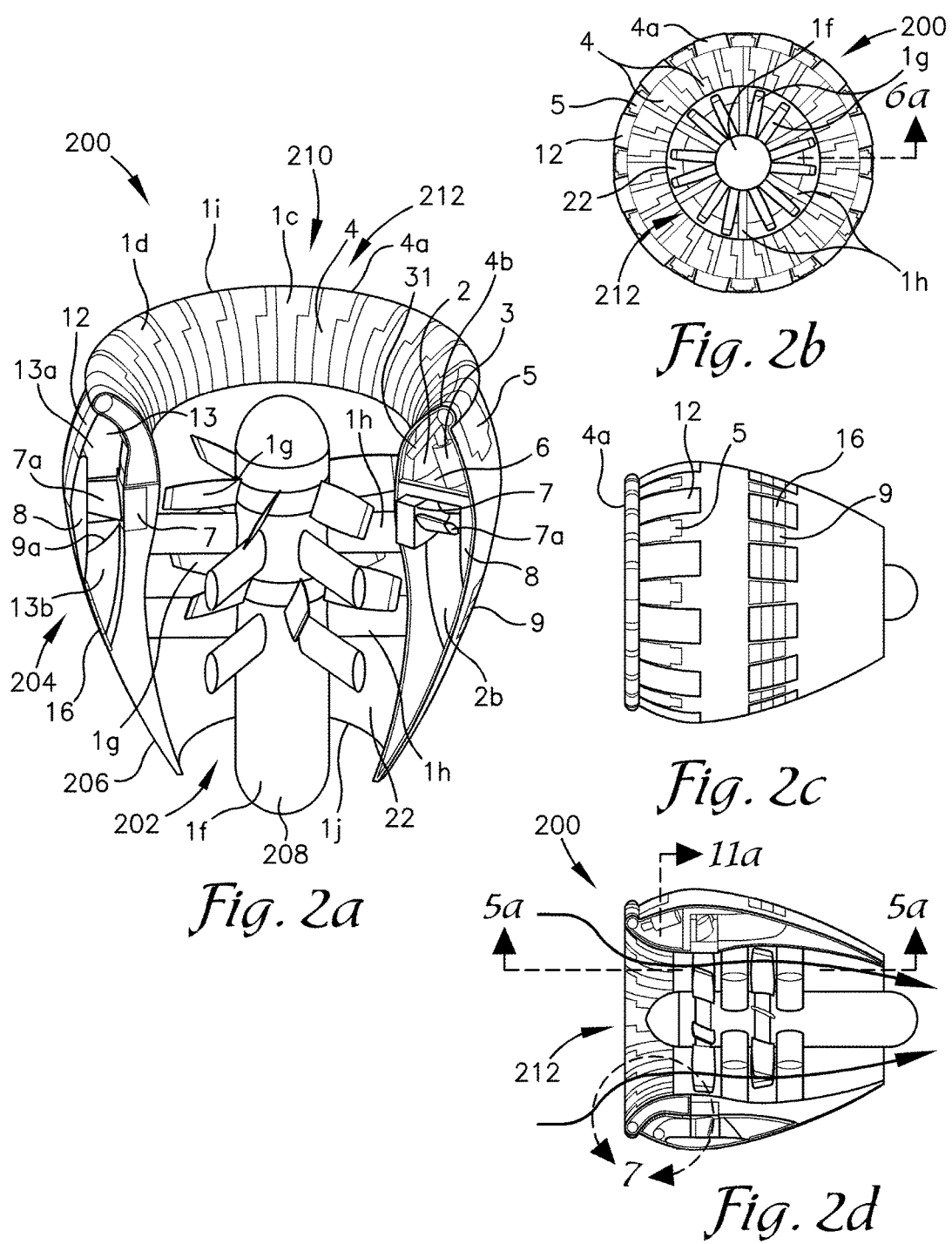

(refer 2d)

(refer 3d)

(refer 4d)

(refer 2b)

(refer 3b)

(refer 2d)

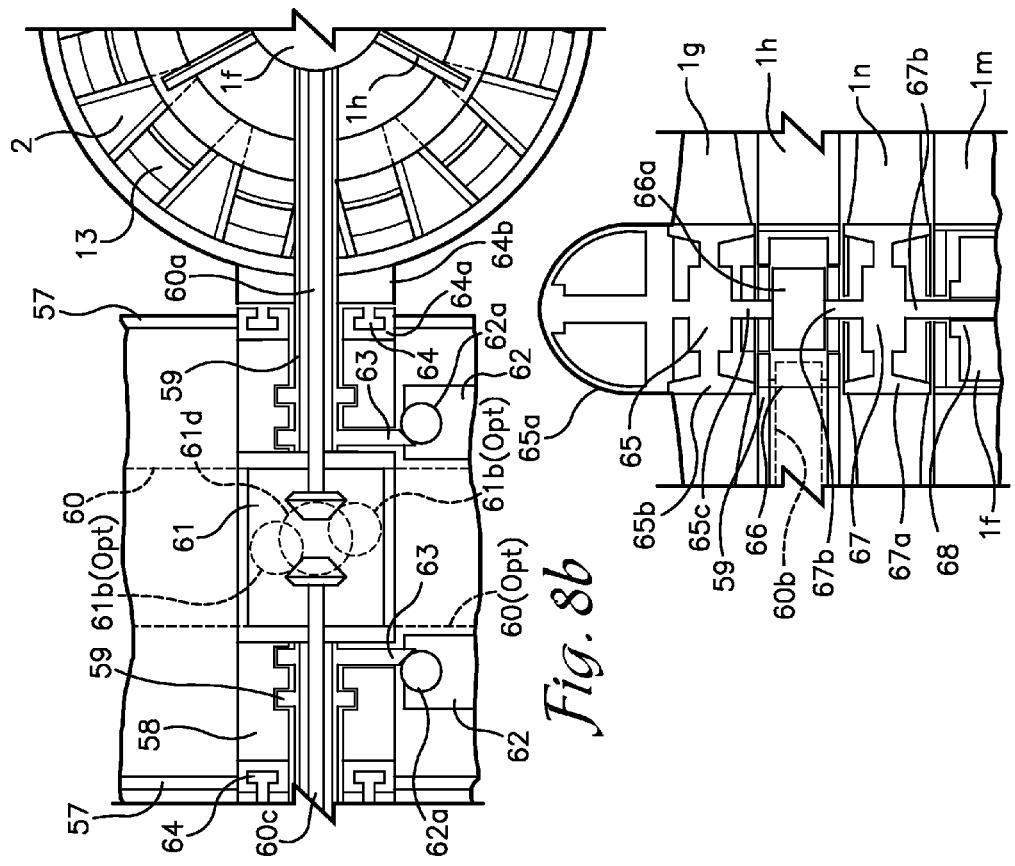

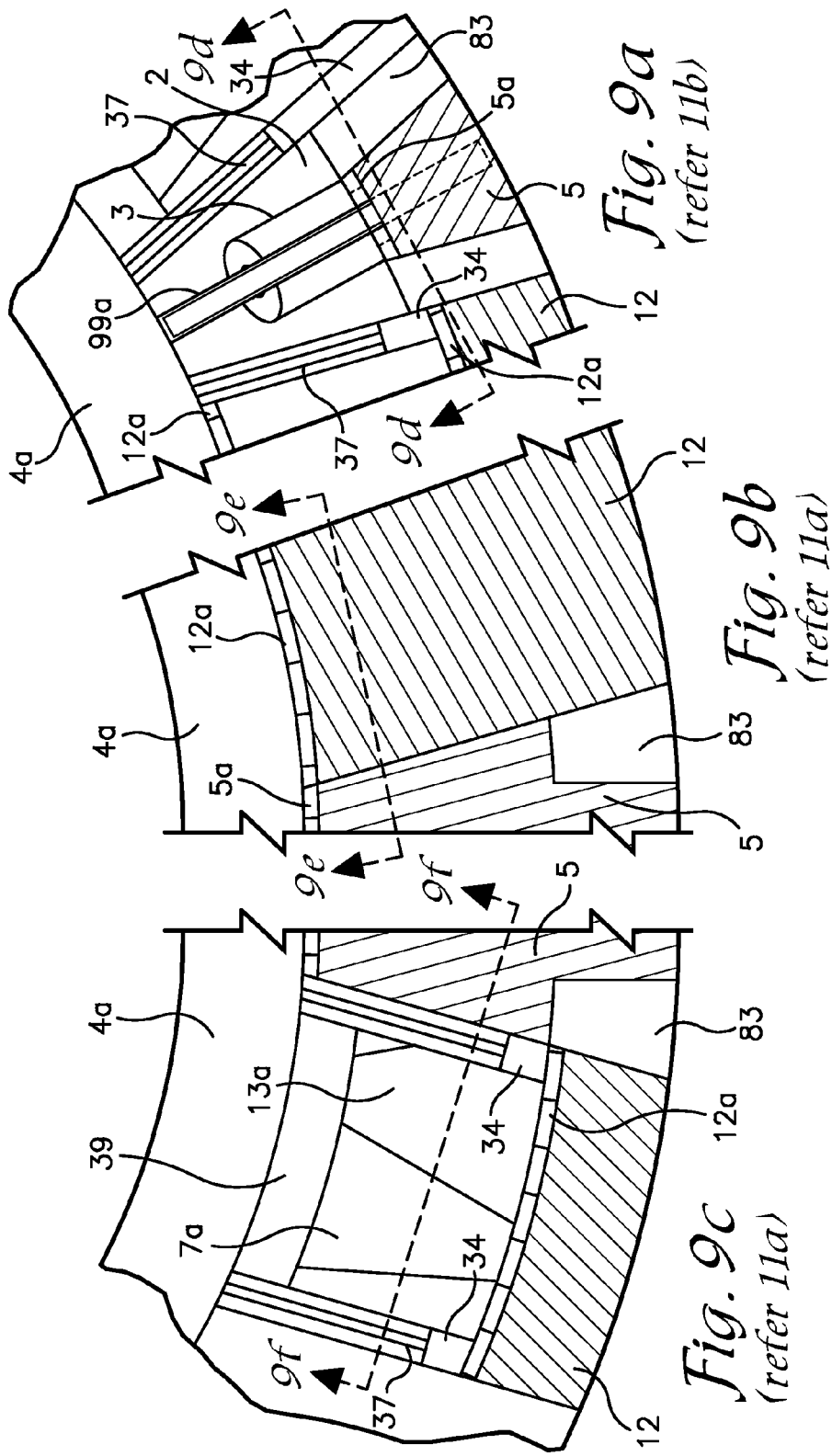

(refer 9a)

(refer 9b)

(refer 9c)

(refer 5c)

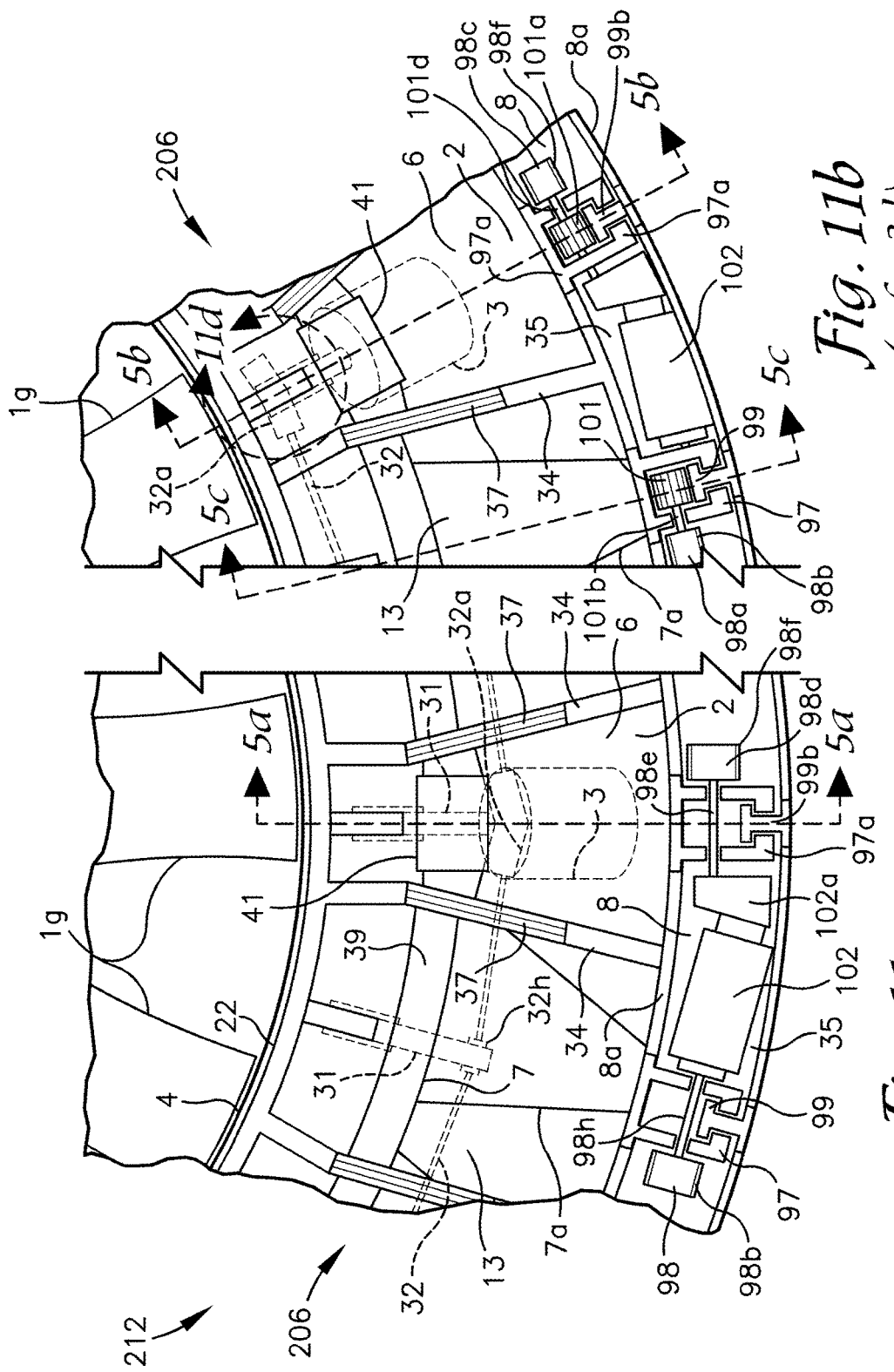

(refer 11a)

(refer 11b)

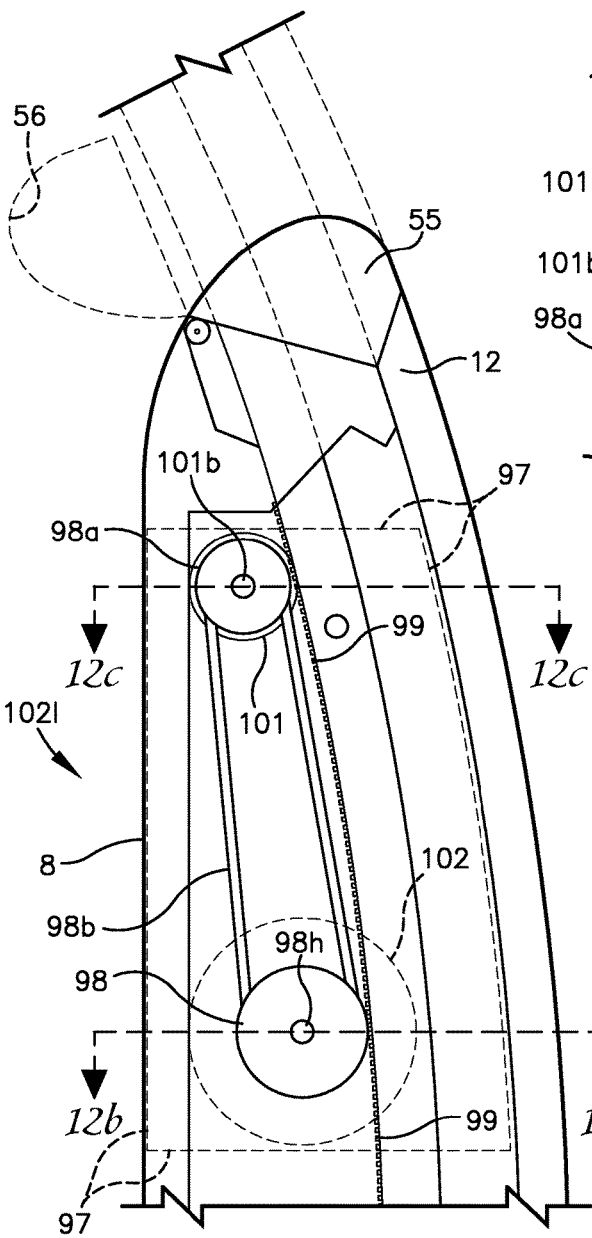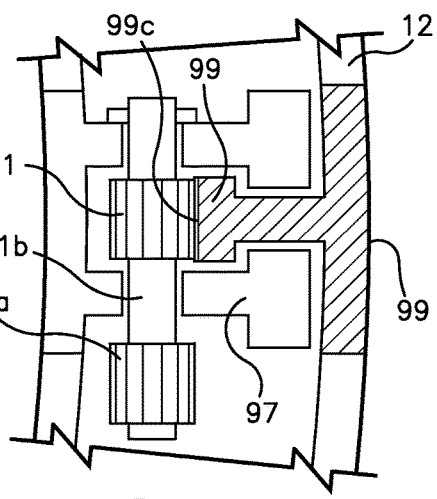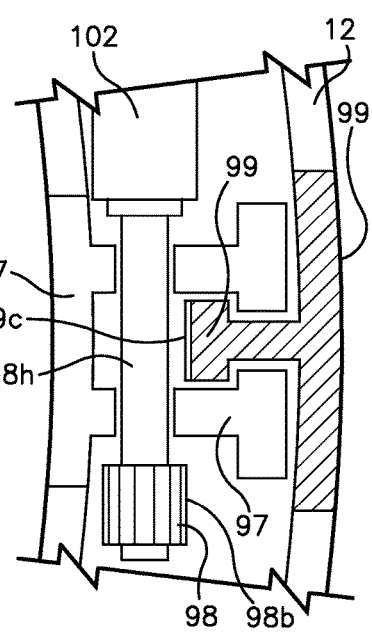
Fig. 12a
(refer 5c)
Fig. 12c
Fig. 12b

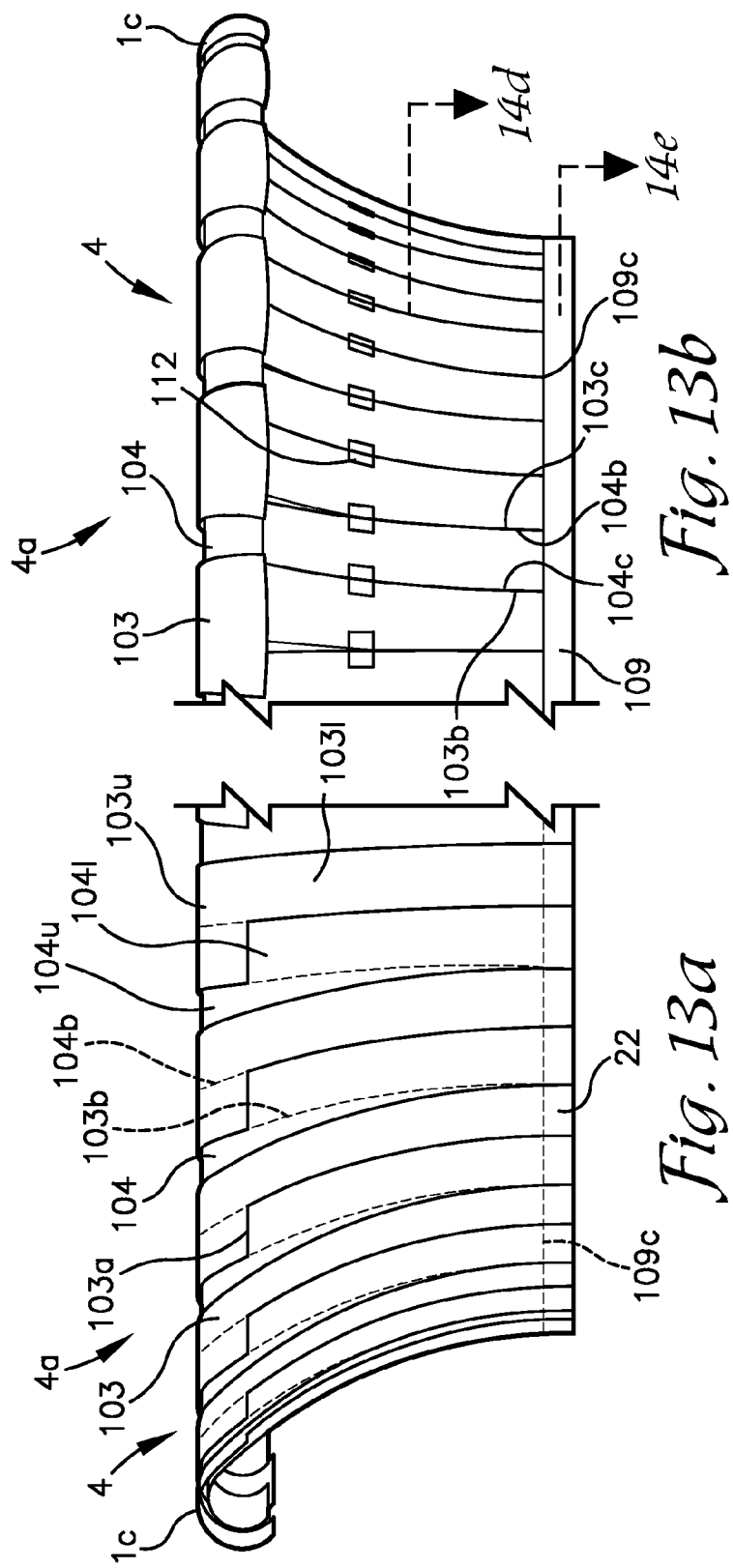

(refer 5a)

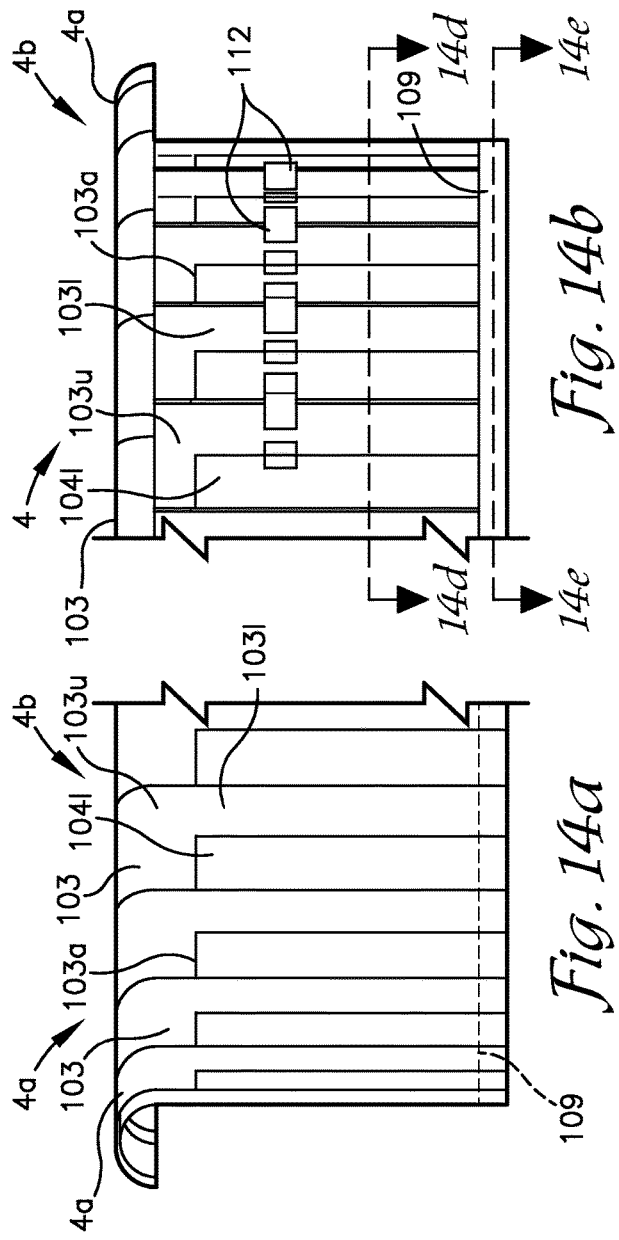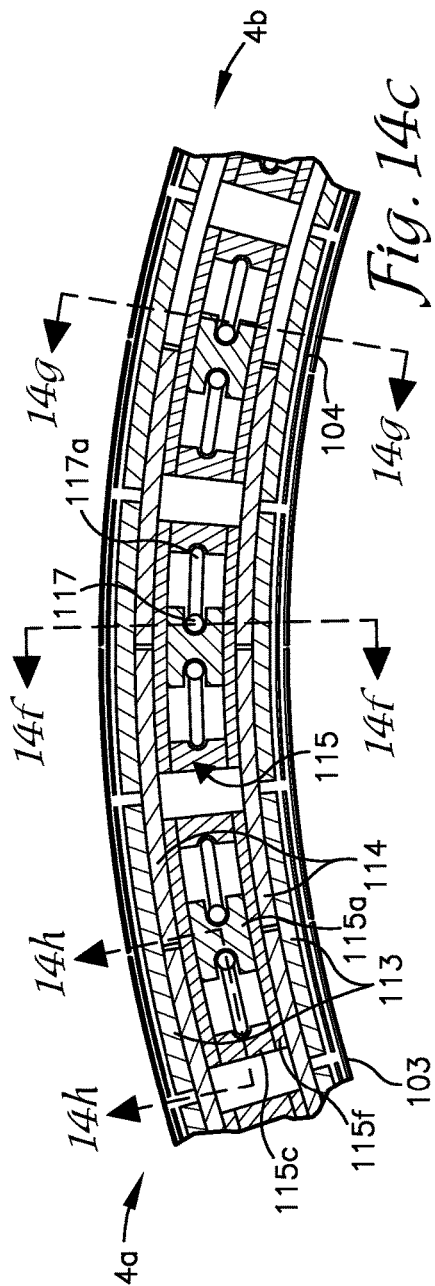

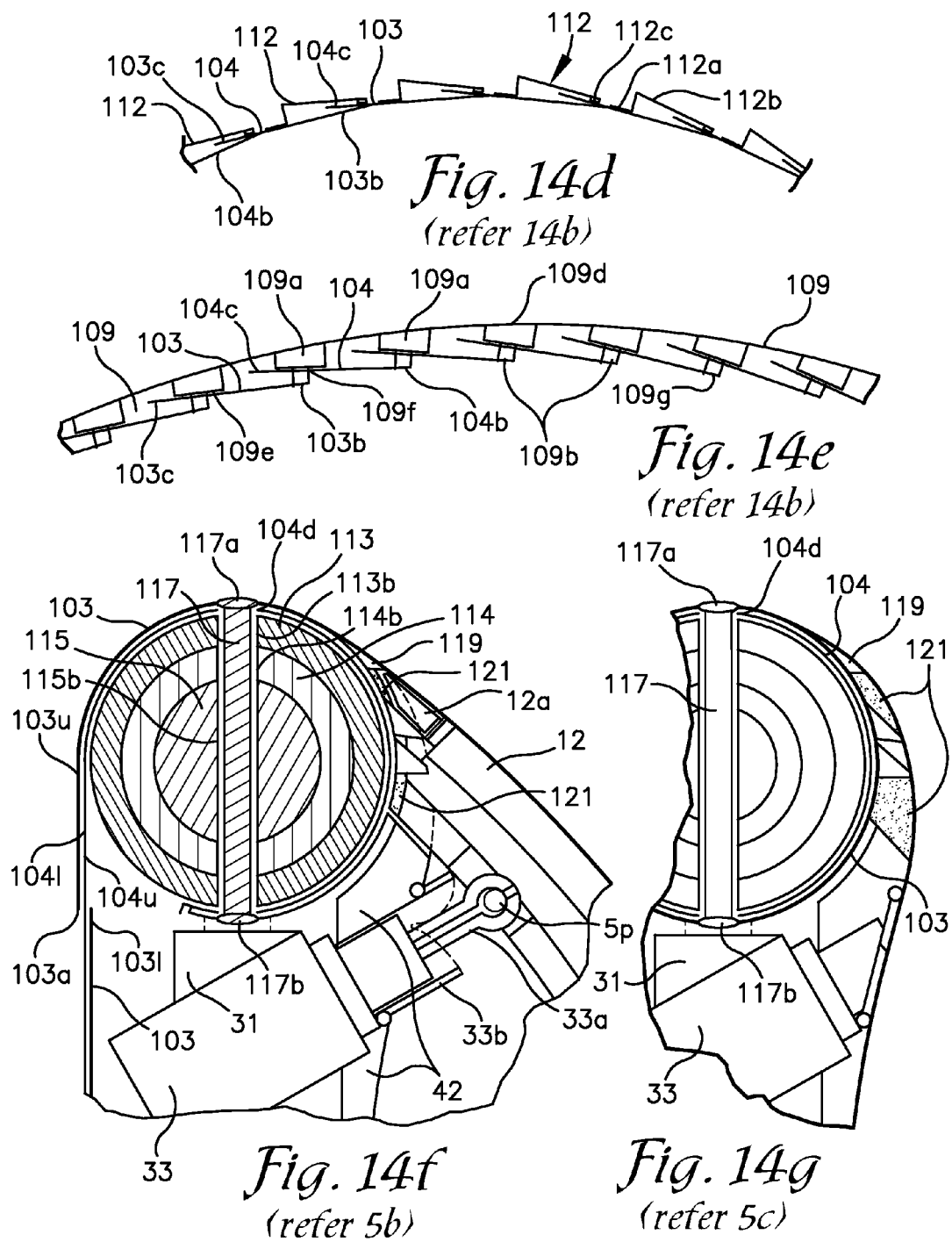

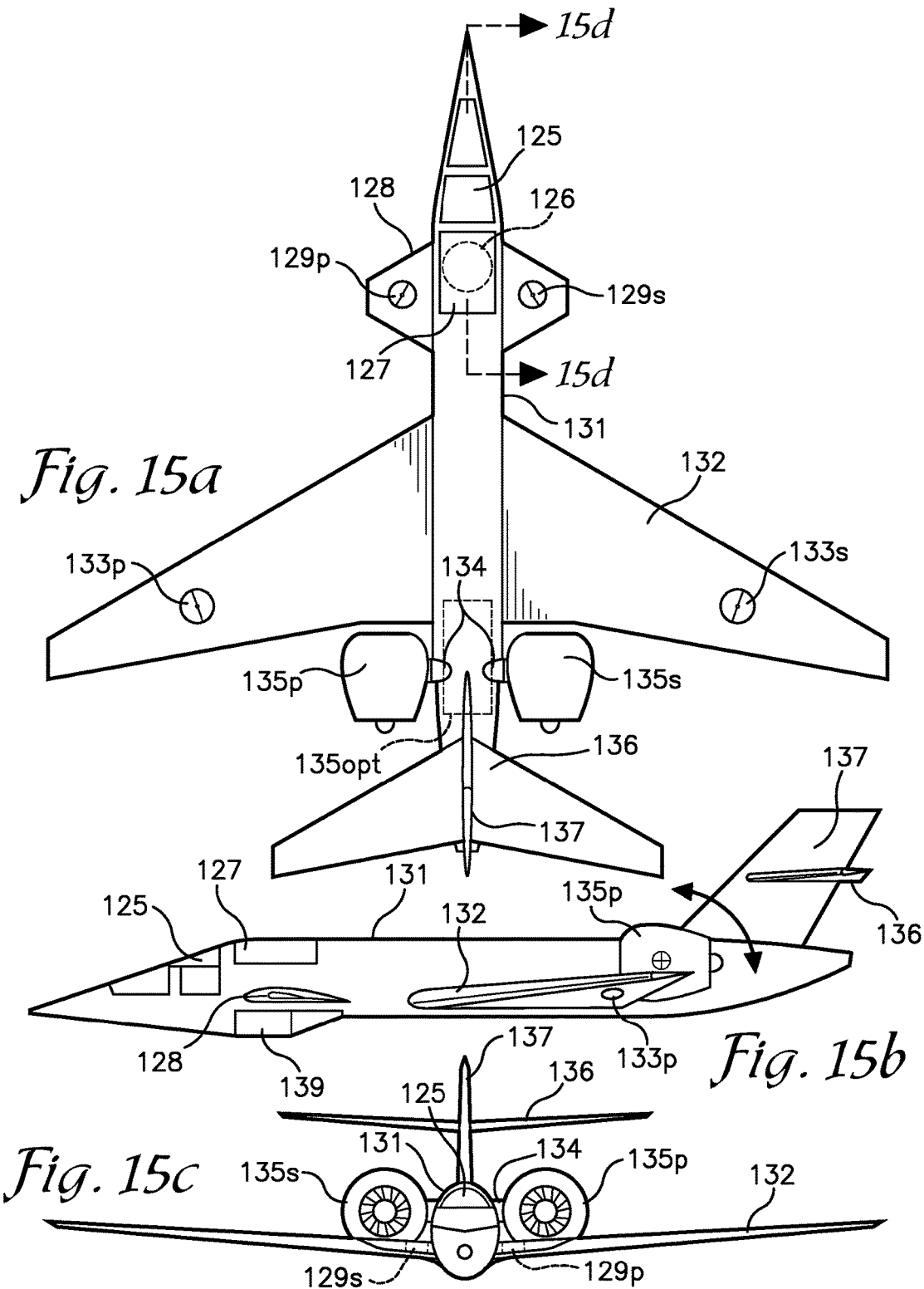

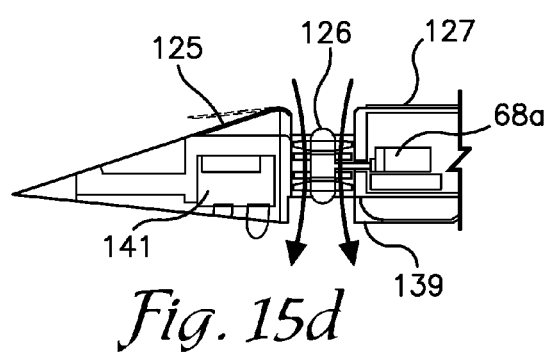
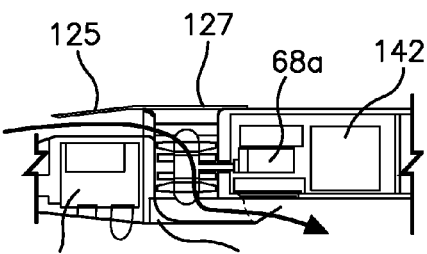
Fig. 15d
Fig. 15e
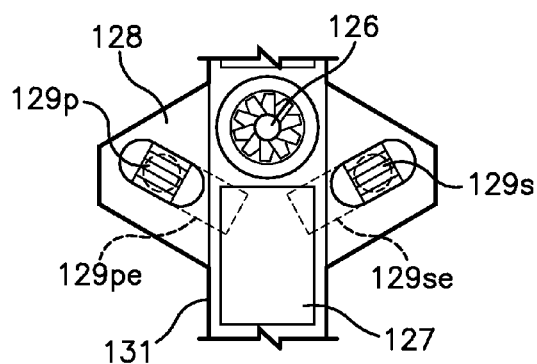
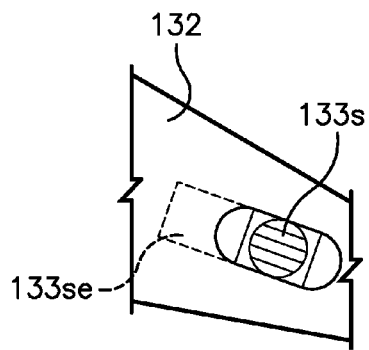
Fig. 15f
Fig. 15g
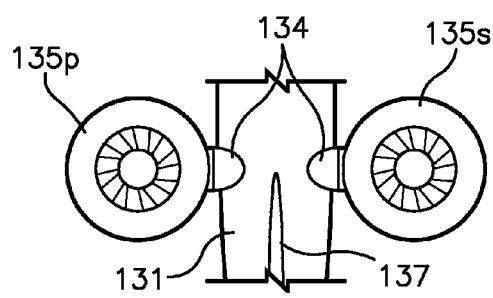
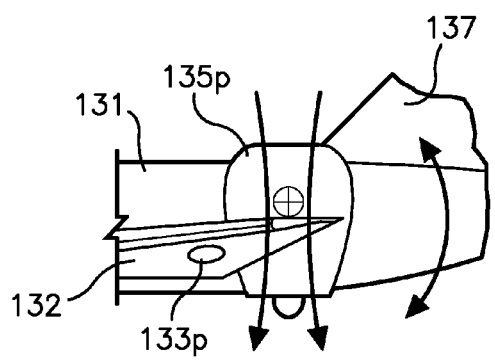
Fig. 15h
Fig. 15i

ADJUSTABLE SIZE INLET SYSTEM

FIELD OF THE DISCLOSURE

The present disclosure relates to a new class of aircraft ducted fan devices that are capable of changing their inlet profile in response to their flight condition. The variable-shape duct inlets can be more closely optimized for a variety of conditions including hovering flight, low speed flight, and high speed flight conditions.

BACKGROUND

A wide variety of aircraft ducted fan systems have been experimented with for many years. A typical ducted fan system may include an inlet duct to direct an inflow of air to a rotating set of impellors situated downstream of an inlet face. The inlet duct may be contoured into a bellmouth profile that induces an internal duct pressure profile that is favorable for efficient thrust production at low speeds. This bellmouth profile, characterized by a relatively rounded inlet lip, may produce detrimental profile drag at high flight speeds, thereby reducing the aircraft's performance. To enhance high speed performance, a sharper inlet lip may be provided in place of the rounded inlet lip, but the sharper inlet lip fails to provide the favorable pressure profile needed for efficient thrust production at low flight speeds. Because of this need for rounded inlet lips in low speed flight and sharper inlet lips in high speed flight, ducted fan propulsion systems typically operate in a compromised state, with at least one important flight condition operating in a suboptimal state.

A variety of additional design features have attempted to overcome this fundamental limitation of ducted fan system design. In previous designs, movable louvers or doors may be incorporated to better control the airflow through the duct, but the curvature of the inlet lip remains fixed. In other existing designs, inflatable inlet surfaces integrated into the inlet lip may be deployed to provide a curved inlet lip profile at low flight speeds and may be deflated at high flight speeds to assume a sharp inlet profile. However, this inflatable inlet lip design may be vulnerable to rapid aging and to sudden failure with associated foreign object damage to the engine.

Ducted fan propulsion systems are particularly well-suited for use in VTOL (vertical takeoff and landing) aircraft due to their ability to produce high thrust at low flight speeds. In order to take off and land vertically, a VTOL aircraft must produce an amount of thrust that is greater than the aircraft's total weight and must further direct this thrust vertically downward at essentially zero flight speed. However, upon transition to horizontal flight, the propulsion system must produce thrust directed afterward relative to the fuselage of the aircraft at relatively high flight speeds.

SUMMARY OF THE DISCLOSURE

In one aspect, an adjustable size inlet system for a fan duct containing a fan. The adjustable size inlet system includes a plurality of nested structural tubes forming a ring; a petal array comprising an interleaved plurality of petals arranged around a perimeter of the ring to define an adjustable size inlet lip; and a plurality of actuators to cause the plurality of nested structural tubes to move radially outward and inward, thereby causing an increase or a decrease of a circumference of the adjustable size inlet lip. Each petal includes an upper portion curved over, and at least partially enclosing, at least a portion of the plurality of nested structural tubes. The partially enclosed portions of the plurality of nested structural tubes cause corresponding upper portions of the plurality of petals to expand to form a bellmouth inlet profile when the plurality of actuators cause the circumference of the adjustable size inlet lip to increase. The corresponding upper portions of the plurality of petals contract to form a cylindrical inlet profile when the plurality of actuators cause the circumference of the adjustable size inlet lip to decrease.

The plurality of nested structural tubes may be operatively coupled in a sliding arrangement. The plurality of nested structural tubes may slide circumferentially outward to increase the circumference of the adjustable size inlet lip when the plurality of actuators move the plurality of nested structural tubes radially outward. The plurality of nested structural tubes may slide circumferentially inward to decrease the circumference of the adjustable size inlet lip when the plurality of actuators move the plurality of nested structural tubes radially inward.

Each petal of the plurality of petals may further include a lower portion affixed to the edge of the fan duct. Each lower portion may form a curved lengthwise profile when the plurality of actuators moves the plurality of nested structural tubes radially outward, and may form a linear lengthwise profile when the plurality of actuators moves the plurality of nested structural tubes radially inward. Each petal of the petal array may include a strip including the upper portion and the lower portion at opposite ends of the strip. The adjustable size inlet system may further include a plurality of structural hub and tube units operatively connected to the actuators, and each structural hub and tube unit may be enclosed within one of the plurality of nested structural tubes. The actuators may each cause a corresponding structural hub and tube unit to move radially inward and outward to cause the plurality of nested structural tubes to move radially inward and outward, thereby contracting or expanding the circumference of the adjustable size inlet lip.

At least a portion of the plurality of nested structural tubes may slide circumferentially apart or together when the actuator arms cause the structural hub and tube units to move radially inward and outward to cause the plurality of nested structural tubes to move radially inward and outward. Each actuator of the plurality of actuators may include a piston arm attached to an actuator arm at an actuator pivot between an opposed first end and second end of the actuator arm. The first end of each actuator arm may be operatively coupled to an end pivot moving within a slot in an adjacent duct structural wall within the adjustable size inlet system. The second end of each actuator arm may be attached to one of a plurality of structural hub and tube units within one of the plurality of nested structural tubes. The second end of each actuator arm may cause the attached structural hub and tube unit to move radially outward when the piston arm is retracted. The second end of each actuator arm may cause the attached structural hub and tube unit to move radially inward when the piston arm is extended. At least a portion of the plurality of nested structural tubes may slide circumferentially apart or together when the actuator arms cause the corresponding attached structural hub and tube units to move radially outward or inward, thereby expanding or contracting the circumference of the adjustable size inlet lip.

The plurality of nested structural tubes may include: a plurality of outer structural tubes; a plurality of inner structural tubes, each inner structural tube including opposed inner tube ends inserted within corresponding adjacent outer structural tubes; a plurality of structural hub tubes, each structural hub tube including opposed hub tube ends inserted within corresponding adjacent inner structural tubes; and the plurality of structural hub and tube units, each structural hub and tube unit comprising a solid cylinder affixed within a structural hub tube, each structural hub tube comprising opposed hub tube ends inserted within corresponding adjacent inner structural tubes.

The plurality of nested structural tubes may also include a plurality of alignment pins. Each end of each alignment pin may be affixed to one of a pair of pin fixation fittings formed within the upper portion of an outer petal from the plurality of petals. Each outer petal may include two pairs of pin fixation fittings. Each alignment pin may extend through a plurality of slots formed within corresponding adjacent petals, adjacent outer structural tubes, adjacent inner structural tubes, and adjacent structural hub and tube units. A range of the expansion and contraction of the circumference of the adjustable size inlet lip may be limited by a mechanical interference between each alignment pin and at least one end of at least one corresponding slot.

The adjustable size inlet system may further include a plurality of control rods arranged around a perimeter of the adjustable size inlet system to limit the expansion and contraction of the circumference of the adjustable size inlet lip.

The adjustable size inlet system may further include a plurality of sliding doors that include a plurality of exterior bypass duct doors and a plurality of equipment bay doors arranged in an alternating sequence around an outer perimeter of a nacelle containing the fan duct and adjacent to the plurality of interleaved petals. The plurality of sliding doors may slide to maintain a position adjacent to the plurality of interleaved petals throughout the expansion and contraction of the plurality of petals. A sliding door operating assembly may raise and lower the exterior bypass duct doors and the equipment bay doors.

The adjustable size inlet system may further include a plurality of sidewall extenders within the nacelle, each sidewall extender shortening and elongating to adjust a length of a sidewall within the nacelle formed by each sidewall extender, thereby accommodating the expansion and contraction of the plurality of interleaved petals.

Each exterior bypass duct door may further include a pair of projecting ridges. The pair of projecting ridges may project laterally from opposed lateral edges of the exterior bypass duct door along at least a portion of the lateral edge to engage with a corresponding engagement groove of an adjacent duct extender wall when the exterior bypass duct door is in a raised position. Each of the two type sliding doors may form at least a portion of an outer surface of the nacelle throughout a range of sliding.

The adjustable size inlet system may further include a plurality of exterior bypass ducts. Each exterior bypass duct may include: an upper bypass duct formed within the nacelle and opening externally to an upper bypass duct inlet; a lower bypass duct formed within the nacelle containing an lower duct area operable outlet louver; and one of the plurality of exterior bypass duct doors to seal the upper bypass duct inlet when the one exterior bypass duct door is raised and to open the upper bypass duct inlet when the one exterior bypass duct door is lowered.

The adjustable size inlet system may further include a plurality of equipment bays. Each equipment bay may include an upper equipment bay formed within the nacelle and sealed at one end by one of the plurality of equipment bay doors. The one equipment bay door may be raised and lowered by the sliding door operating assembly. The one equipment bay door may be lowered to prevent mechanical interference with the petal array when the circumference of the adjustable size inlet lip is increased. The one equipment bay door may be raised to maintain the seal at the one end of the equipment bay when the circumference of the adjustable size inlet lip is decreased. Each equipment bay door may be guided by an embedded linear guidebar operatively coupled to an extension track affixed over the one end of the equipment bay to transition from the raised position to a lowered position. The equipment bay doors may be lowered and raised to provide space in the equipment bay for the expanded bellmouth for the adjustable size inlet when in vertical lift mode The nacelle and adjustable size inlet system may rotate to a horizontal orientation, a vertical orientation, clockwise relative to the horizontal orientation, counterclockwise relative to the horizontal orientation, clockwise relative to the vertical orientation, counterclockwise relative to the vertical orientation, and to a plurality of intermediate orientations between the horizontal orientation and the vertical orientation. Each petal may slide circumferentially apart or together from each corresponding adjacent petal when the actuators expand or contract the circumference of the adjustable size inlet lip.

In another aspect, an adjustable size inlet system for attachment to an edge of a fan duct is provided. The adjustable size inlet system includes: a plurality of nested structural tubes operatively coupled in a sliding arrangement and forming a ring; a petal array including an plurality of outer petals interleaved with a plurality of inner petals, the petal array arranged around a perimeter of the ring to define an adjustable size inlet lip, a plurality of actuators, each actuator comprising a piston arm attached to an actuator arm at an actuator pivot between an opposed first end and second end of the actuator arm, wherein the first end of each actuator arm is operatively coupled to an end pivot moving within a slot in an adjacent duct structural wall within the adjustable size inlet system; and a plurality of structural hub and tube units operatively connected to the actuators, each structural hub and tube unit enclosed within one of the plurality of nested structural tubes and attached to the second end of each actuator arm.

Each petal of the petal array includes a strip with an upper portion and a lower portion at opposite ends of the strip. Each upper portion is curved over at least a portion of the plurality of nested structural tubes to at least partially enclose the portion of the plurality of nested structural tubes. Each lower portion is attached to the edge of the fan duct.

The second end of each actuator arm moves each corresponding attached structural hub and tube unit radially outward when the piston arm is retracted. The second end of each actuator arm moves each corresponding attached structural hub and tube unit radially inward when the piston arm is extended. At least a portion of the plurality of nested structural tubes slide circumferentially apart or together when the plurality of actuators move the plurality of structural hub and tube units outward or inward, thereby expanding or contracting a circumference of the adjustable size inlet lip.

Each petal slides circumferentially apart or together from each corresponding adjacent petal when the plurality of actuators expand or contract the circumference of the adjustable size inlet lip. Each lower portion of each petal forms a curved lengthwise profile when the plurality of actuators expand the circumference of the adjustable size inlet lip. Each lower portion of each petal forms an approximately linear profile when the plurality of actuators contract the circumference of the adjustable size inlet lip. An exposed inner surface of the petal array may define a tubular upper inlet wall; the exposed inner surface includes a total of all exposed inner surfaces of the plurality of petals in the petal array.

The adjustable size inlet system assumes a bellmouth inlet profile when the plurality of actuators expand the circumference of the adjustable size inlet lip. The adjustable size inlet system assumes a cylindrical inlet profile when the plurality of actuators contract the circumference of the adjustable size inlet lip.

The adjustable size inlet system may further include a plurality of perimeter control actuators. Each perimeter control actuator may include: a control rod joining box affixed to one actuator arm of the plurality of actuator arms between the first end and second end of the one actuator arm. The control rod joining box may include: a pair of gear systems at opposite ends of the control rod joining box, each gear system comprising a threaded fitting; a motor operatively coupled to the pair of gear systems to reversibly rotate both threaded fittings of both gear systems when the motor is activated; and a first control rod and a second control rod, each control rod comprising a first threaded portion at a first rod end and a second threaded portion at a second rod end opposite the first rod end. Each first rod end is operatively coupled to one threaded fitting of the control rod joining box by meshing the first threaded portion with the threaded fitting; and each second rod end is operatively coupled to one adjacent threaded fitting of one adjacent control rod joining box. Each control rod joining box is coupled to a first adjacent control rod joining box by the first control rod and to a second adjacent control rod joining box by the second control rod opposite to the first adjacent control rod joining box, forming a portion of a second continuous ring around the perimeter of the adjustable size inlet system. Each first threaded portion and each second threaded portion of each control rod translate in or out of each corresponding control rod joining box when each corresponding threaded fitting is rotated by each corresponding motor, causing the perimeter of the second continuous ring to decrease or increase. The operation of each motor is coordinated with the operation of the plurality of actuators to coordinate the decrease or increase of the circumference of the second continuous ring with the decrease or increase of the circumference of the adjustable size inlet lip.

The plurality of nested structural tubes may include: a plurality of outer structural tubes evenly spaced around the circumference of the adjustable size inlet lip, each outer structural tube including a first curved tube enclosing an outer lumen extending a length of the outer tube and opening at each opposed end of the outer tube; a plurality of inner structural tubes evenly spaced around the circumference of the adjustable size inlet lip, each inner structural tube including a second curved tube enclosing an inner lumen extending a length of the inner structural tube and opening at each opposed end of the inner structural tube; and a plurality of structural hub tube units evenly spaced around the circumference of the adjustable size inlet lip. Each opposed end of each inner structural tube and at least a portion of the inner structural tube, are situated within the outer lumen of an adjacent outer structural tube. Each opposed end and at least a portion of the structural hub tube are situated within the inner lumen of an adjacent inner structural tube. Each structural hub and tube unit may include a solid cylinder affixed within a third curved tube. Each opposed end and at least a portion of the structural hub tube unit are situated within the inner lumen of an adjacent inner structural tube. Each end of each inner structural tube slides in and out of a toroidal space between the outer structural tube and the structural hub and tube unit when the plurality of actuators move the plurality of structural hub and tube units radially inward and outward.

The adjustable size inlet system may further include a plurality of alignment pins, each alignment pin affixed at each end to an opposed pair of pin fixation fittings situated near a lateral edge of each outer petal of the petal array. A central portion of each pin may extend inward through a pair of opposed petal slots formed within an underlying petal edge of an underlying inner petal of the petal array. Each petal slot may extend along a portion of a width of the inner petal from a distal petal slot end near the underlying edge to a proximal petal slot end. The central portion of each pin may further extends inward through a pair of opposed outer slots formed within an underlying outer tube end of an underlying outer structural tube. Each outer slot may extend along a portion of a length of the underlying outer structural tube from a distal outer slot end near the underlying outer tube end to a proximal outer slot end. A central portion of each pin may also extend inward through a pair of opposed inner slots formed within an underlying inner tube end of an underlying inner structural tube. Each inner slot may extend along a portion of a length of the underlying inner structural tube from a distal inner slot end near the underlying inner tube end to a proximal inner slot end. The central portion of the pin may further extend through a hub slot formed within an underlying hub tube end of the structural hub and tube unit. Each hub slot may extend from a distal hub slot end near the underlying hub tube end for a portion of the length of the structural hub and tube unit to a proximal hub slot end.

A range of sliding movement of the of the plurality of structural tubes may be limited by a mechanical interference of each alignment pin with at least one or more corresponding slot ends selected from: the proximal petal slot end, the proximal outer slot end, the proximal inner slot end, the proximal hub slot ends, the distal petal slot end, the distal outer slot end, the distal inner slot end, and the distal hub slot end.

The plurality of petals may include a plurality of first petals interleaved between a plurality of second petals. Each first petal includes a first left lateral edge, a first right lateral edge, and a transition slit extending inward from the first left lateral edge to a centerline situated midway between the first left and first right lateral edges. Each second petal includes a second left lateral edge and a second right lateral edge. Each second right lateral edge may be inserted into an adjacent transition strip of an adjacent first petal. An upper portion of the second right lateral edge may be situated between the underlying adjustable size inlet lip and the overlying upper portion of the adjacent first petal. A lower portion of the second right lateral edge may be situated at least partially over the lower portion of the adjacent first petal. The second left lateral edge may be situated between the underlying adjustable size inlet lip and an opposite adjacent first petal situated opposite to the adjacent first petal. Each second right lateral edge may slide in and out of each transition slit when the plurality of actuators contract and expand the circumference of the adjustable size inlet lip.

In an additional aspect, a ducted fan propulsion system is provided that includes a main fan duct and an adjustable size inlet attached at an end of the main fan duct. The adjustable size inlet may include: a plurality of nested structural tubes operatively coupled in a sliding arrangement and forming a ring; a petal array comprising an interleaved plurality of petals arranged around a perimeter of the ring to define an adjustable size inlet system; and a plurality of actuators to cause the plurality of nested structural tubes to move radially outward and inward, thereby causing an increase or a decrease of a circumference of the adjustable size inlet lip. Each petal may include: an upper portion curved over, and at least partially enclosing, a first portion of the plurality of nested structural tubes; and a lower portion attached to the main fan duct.

The ducted fan propulsion system may further include a plurality of structural hub and tube units operatively connected to the actuators, each structural hub and tube unit enclosed within one of the plurality of nested structural tubes. The actuators may each cause a corresponding structural hub and tube unit to move radially inward and outward to cause the plurality of nested structural tubes to move radially inward and outward, thereby contracting or expanding the circumference of the adjustable size inlet lip. Each actuator may include a piston arm attached to an actuator arm at an actuator pivot between an opposed first end and second end of the actuator arm. The first end of each actuator arm may be operatively coupled to an end pivot affixed within the adjustable size inlet system. The second end of each actuator arm may be attached to one of a plurality of structural hub and tube units within one of the plurality of nested structural tubes. The second end of each actuator arm and corresponding attached structural hub and tube unit may move radially outward when the piston arm is retracted, thereby increasing the circumference of the adjustable size inlet lip. The second end of each actuator arm and corresponding attached structural hub and tube unit may move radially inward when the piston arm is extended, thereby decreasing the circumference of the adjustable size inlet lip.

At least a portion of the plurality of nested structural tubes may slide circumferentially apart or together when the plurality of actuators expand or contract the circumference of the adjustable size inlet lip. Each of the plurality of petals may slide circumferentially apart or together from each corresponding adjacent petal when the plurality of actuators expand or contract the circumference of the adjustable size inlet lip. Each lower portion of the plurality of petals may form a curved lengthwise profile when the plurality of actuators expand the circumference of the adjustable size inlet lip. Each lower portion may form a linear lengthwise profile when the plurality of actuators contract the circumference of the adjustable size inlet lip.

In another additional aspect, a nacelle is provided that includes a plurality of exterior bypass ducts. Each exterior bypass duct may include: an upper bypass duct formed within a nacelle housing and opening externally to an upper bypass duct inlet; a lower bypass duct formed within the nacelle and a nacelle perimeter compartment; a lower duct area operable outlet louver; an exterior bypass duct door to seal the upper bypass duct inlet when the exterior bypass duct door is raised and to open the upper bypass duct inlet when the exterior bypass duct door is lowered; and a sliding door operating assembly to raise and lower the exterior bypass duct doors.

The upper bypass duct may further include: a duct wall fixed section affixed to a portion of a structural floor and extending toward a first end of an actuator arm of an adjustable size inlet system; a duct wall moveable section comprising a duct wall section mounted on the actuator arm; and a pair of duct sidewall extenders. Each duct sidewall extender may include a fixed duct wall core extending outward from the duct wall fixed section and an inner extendable duct wall ply and an outer extendable duct wall ply on opposite sides of the fixed duct wall core. The inner and outer extendable duct wall plies are pinned together and may be raised or lowered together when the actuator arm moves radially inward or outward in coordination with the radially inward or outward movements of the actuator arm. The duct wall fixed section and the duct wall moveable section may form a back wall of the upper bypass duct; and the first and second duct sidewall extenders may form a pair of lateral walls extending outward from the back wall of the upper bypass duct.

The inner and outer sidewall extender plies may be fastened to each other with an outer ply connecting pin and may be raised and lowered together by a sidewall extender operating assembly. Each outer ply connecting pin may move freely through a slot formed within the fixed duct wall core. The sidewall extender operating assembly may include: a sidewall extender motor operatively coupled to a lower pulley wheel. The lower pulley wheel may be coupled to an upper pulley wheel with a belt. The sidewall extender operating assembly may further include an axle affixed to fixed duct wall core and operatively coupled to the upper pulley wheel. The axle may include a gear-toothed rim attached to an end of the axle. The sidewall extender operating assembly may further include a gear strip affixed to a lateral surface of the inner extendable duct wall ply and operatively coupled to the gear-toothed rim. The sidewall extender motor may be activated to rotate the gear-toothed rim, causing the raising or lowering of the extendable duct wall plies. The nacelle may further include a flexible seal attached at an upper seal edge to the duct wall moveable section and attached at a lower seal edge to the duct wall fixed section.

Each sliding door operating assembly may include: a door motor operatively coupled to a first operating gearframe unit that operates the exterior bypass duct door and a second operating gearframe unit that operates the equipment bay doors. The door motor may be supported within the nacelle perimeter compartment. The first operating gearframe unit may include a lower pulley operatively coupled to the door motor via a driveshaft; a belt connecting the lower pulley to a door pulley; an upper pulley shaft attached at one end to the door pulley and attached at an opposite end to a toothed drive wheel; and a linear gearbar operatively coupled to the toothed drive wheel. The linear gearbar may be embedded within the exterior bypass duct door. The second operating gearframe may include: a control gearbox coupled to the door motor via the driveshaft; a second belt connecting the control gearbox and an upper pulley wheel; an axle attached at one end to the upper pulley wheel and attached to a second toothed drive wheel at an opposite end, and a second linear gearbar operatively coupled to the second toothed drive wheel. The second linear gearbar may be embedded in the equipment bay door. The door motor may rotate the toothed drive wheel and the second toothed drive wheel to translate the linear gearbar and the second linear gearbar, respectively, thereby raising or lowering the attached exterior bypass duct door and equipment bay door.

The exterior bypass duct may further include a rounded nose attached at an edge of a nacelle perimeter compartment. The nose is positioned over the edge of the nacelle perimeter compartment when the exterior bypass duct door is lowered to provide a smooth inlet edge for the open exterior bypass duct. The nose is positioned interior of the nacelle perimeter compartment to provide clearance when the exterior bypass duct door is raised.

In yet another aspect, a nacelle is provided that includes: a fan duct extending between a duct inlet and a duct exit; a plurality of interleaved petals arranged around a perimeter of the duct inlet; a plurality of actuators to expand the plurality of interleaved petals to form a bellmouth inlet profile and to contract the plurality of interleaved petals to form a cylindrical inlet profile; a plurality of control rods arranged around a perimeter of the fan duct to limit expansion of the plurality of interleaved petals; a plurality of sliding doors arranged around an outer perimeter of the nacelle adjacent to the plurality of interleaved petals, the plurality of sliding doors sliding to remain adjacent to the plurality of interleaved petals throughout the expansion and contraction of the plurality of interleaved petals; and a plurality of sidewall extenders within the nacelle to shorten and elongate, each sidewall extender shortening and elongating to adjust a length of a sidewall within the nacelle formed by each sidewall extender, thereby accommodating the expansion and contraction of the plurality of interleaved petals.

While multiple embodiments are disclosed, still other embodiments of the present disclosure will become apparent to those skilled in the art from the following detailed description that shows and describes illustrative embodiments of the disclosure. As will be realized, the systems and methods are capable of modifications in various aspects, all without departing from the spirit and scope of the present disclosure. Accordingly, the drawings and detailed description are to be regarded as illustrative in nature and not restrictive.

BRIEF DESCRIPTION OF THE DRAWINGS

The following figures illustrate various aspects of the disclosure.

FIG. 1a is a perspective view of a ducted fan with a bellmouth inlet profile and associated flow field and static pressure distribution.

FIG. 1b is a perspective view of a ducted fan with a bellmouth inlet profile and a significantly smaller cross-sectional outlet area of the air flow exit.

FIG. 2a is a cutaway perspective view of a ducted fan with an adjustable size inlet system and exterior bypass ducts in a Stage 1 position characterized by a rounded inlet lip profile.

FIG. 2b is a top view of the ducted fan with an adjustable size inlet system and exterior bypass ducts in the Stage 1 position and fully activated for VTOL flight.

FIG. 2c is a side view of the ducted fan with an adjustable size inlet system and exterior bypass ducts in the Stage 1 position and tilted horizontally in a low speed forward flight mode.

FIG. 2d is a cutaway side view of the ducted fan with an adjustable size inlet system and exterior bypass ducts in the Stage 1 position and tilted horizontally for low speed forward flight.

FIG. 8b is a partial cross-sectional top view of a fuselage of a VTOL aircraft affixed to a ducted fan with an adjustable size inlet system and exterior bypass ducts in the Stage 1 position; the ducted fan is shown tilted vertically for vertical takeoff or landing.

FIG. 8c is a cutaway partial top view of the ducted fan illustrated in FIG. 8a.

FIG. 8d is a partial cross-sectional view of the ducted fan showing the main motor, stators and contra-rotating impeller.

FIG. 9a is a partial top view of a ducted fan with an adjustable size inlet system in transition to the Stage 1 position.

FIG. 9b is a partial top view of a ducted fan with an adjustable size inlet system in the Stage 2 position.

FIG. 9c is a partial top view of a ducted fan with an adjustable size inlet system in the Stage 3 position.

FIG. 11a is a partial cutaway plan view taken at 11a of FIG. 2d showing an exterior bypass duct bay, an equipment bay, and a nacelle perimeter compartment containing a sliding door operating assembly for both bays.

FIG. 11b is a sectional top view taken at 11b of FIG. 3d illustrating a bypass duct bay, an equipment bay and an operating mechanism for the sliding duct doors.

FIG. 12a is an enlarged cross-sectional view taken at 12a of FIG. 5c through a front portion of a nacelle perimeter compartment containing operating equipment for the nacelle sliding doors.

FIG. 12b is a horizontal cross-sectional view taken through section 12b-12b of FIG. 12a passing through the lower sliding duct door operating equipment within the nacelle perimeter compartment.

FIG. 12c is a horizontal cross-sectional view taken through section 12c-12c of FIG. 12a and passing through the upper sliding duct door operating equipment within the nacelle perimeter compartment.

FIG. 13a is a partial front projected elevation viewed from inside the ducted fan of the adjustable size inlet system in the Stage 1 position, showing the type A petals with transition slits and the type B petals.

FIG. 13b is a partial back projected elevation view of the adjustable size inlet system in the Stage 1 position, showing the type A petals with transition slits and type B petals.

FIG. 14a is a partial projected front elevation view of the adjustable size inlet in the Stage 2 or Stage 3 position showing the type A petals with transition slits and the type B petals.

FIG. 14b is a partial projected back elevation view of the adjustable size inlet in the Stage 2 or Stage 3 position showing the type A petals with transition slits and the type B petals.

FIG. 14c is a partial horizontal cross-sectional view of an adjustable size inlet in the Stage 2 position showing type A and type B petals with the upper sections of type A petals abutting and fully enclosing upper sections of type B petals.

FIG. 14d is a partial horizontal cross-section diagram taken at 14d-14d of FIG. 14b in the Stage 2 position through the section of petals below the transition slits, showing the overlapping type A and type B petals with affixed alignment tabs.

FIG. 14e is a partial horizontal cross-section diagram taken at 14e-14e of FIG. 14b in the Stage 2 position through the base of the petals affixed to the top edge of the ducted fan wall using wedge shaped formers and fasteners.

FIG. 14f is an enlarged partial cross-section diagram of the adjustable size inlet taken at 14f-14f of FIG. 14c in the Stage 2 position showing a solenoid locking device with a locking arm locked onto the exterior bypass duct sliding door locking pin to lock the door into position against the inlet lip surface.

FIG. 14g is an enlarged partial cross-section diagram of the adjustable size inlet taken at 14g-14g of FIG. 14c in the Stage 3 position showing a retracted locking device arm covered by a hinged door to maintain a smooth aerodynamic surface over the exterior bypass duct surface.

FIG. 15a is a planform view of a VTOL aircraft with twin ducted fans arranged in the Stage 2 position.

FIG. 15b is a side elevation of the VTOL aircraft shown in FIG. 15a.

FIG. 15c is a front view of the VTOL aircraft shown in FIG. 15a.

FIG. 15d is a partial cross-section diagram of a nose of a VTOL aircraft in the Stage 1 position for vertical ascent/descent, showing a fixed (non-tilting) ducted fan.

FIG. 15e is a partial cross-section diagram of a nose of a VTOL aircraft in the Stage 3 position showing ram air entering the fan duct and exiting as a vectored airstream for forward thrust.

FIG. 15f is a partial top view of a canard wing of a VTOL aircraft showing a fixed ducted fan with cover retracted, as well as a pair of forward aircraft attitude control thrusters with covers retracted.

FIG. 15g is a partial top view of a main wing section of a VTOL aircraft showing an attitude control thruster with cover retracted.

FIG. 15h is a partial top view of the VTOL aircraft's aft section showing twin ducted fans tilted vertically in the Stage 1 position for vertical ascent/descent and low speed forward flight.

FIG. 15i is a partial side view of the VTOL aircraft empennage showing a ducted fan tilted vertically for ascent/descent and other VTOL requirements.

Corresponding reference characters and labels indicate corresponding elements among the views of the drawings. The headings used in the figures should not be interpreted to limit the scope of the claims.

DETAILED DESCRIPTION

Figure 3A:
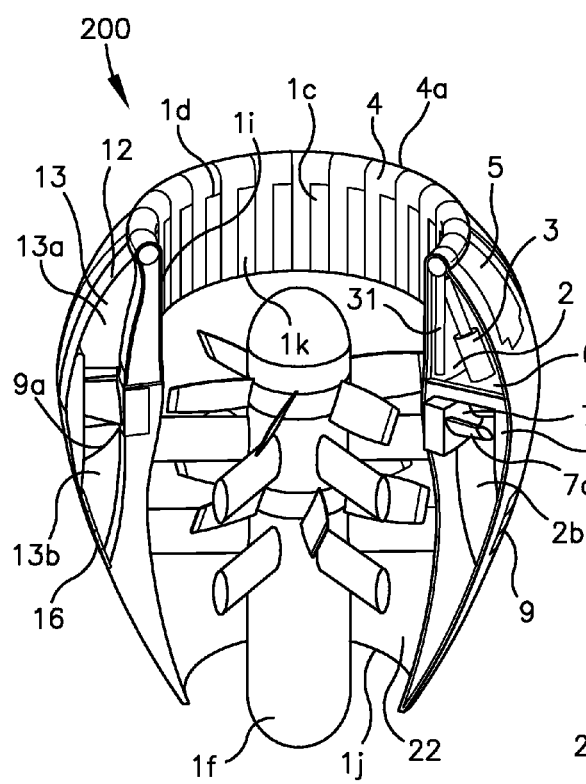
FIG. 3a is a cutaway perspective view of the ducted fan with an adjustable size inlet system and exterior bypass ducts in a Stage 2 position characterized by a sharp inlet lip profile and a reduced inlet cross-sectional area.

In various aspect of the disclosure, an adjustable size ducted fan system is provided that includes a main fan assembly and an exterior bypass fan assembly housed within a nacelle. The main fan assembly may include a multi-stage counter-rotating fan housed within an adjustable size fan duct. The adjustable size fan duct provides the capability to vary the contour of the inlet duct to enhance thrust production over a variety of conditions including, but not limited to, hovering flight, low speed forward flight, and high speed forward flight. The exterior bypass fan assembly may include a toroidal fan attached to the outer perimeter of the main fan duct. The inlet airflow to the toroidal fan may be provided by a plurality of exterior bypass ducts within an outer portion of the nacelle that may be opened and closed to produce additional thrust as needed for a variety of conditions including, but not limited to takeoff, landing, and high speed forward flight.

The nacelle containing the ducted fan system may be attached to an aircraft by a ring connector using a ducted fan tilting system. The ducted fan tilting system may include actuators and mechanical elements to rotate the nacelle to a variety of orientations including, but not limited to: a vertical orientation, a horizontal orientation, orientations between the vertical and horizontal orientations. A vertical orientation, as defined herein refers to an orientation in which the engine axis is aligned in a vertical direction with the inlet of the nacelle pointing upward, as illustrated in FIG. 2a. A horizontal orientation, as defined herein, refers to an orientation in which the engine axis is aligned in a horizontal direction, with the inlet of the nacelle pointing forward, as illustrated in FIG. 2c. In an aspect, the nacelle may rotate to an orientation of up to about 30° beyond vertical, in which the inlet of the nacelle points slightly afterward. In another aspect, the nacelle may rotate to an orientation of up to about 30° below horizontal, in which the inlet of the nacelle points slightly below the horizontal direction. In various aspects, the ducted fan tilting system and ducted fan system may be used to provide vectored thrust to a variety of aircraft including, but not limited to, a VTOL (vertical takeoff and landing) aircraft. In various other aspects of the disclosure, a VTOL aircraft that incorporates the ducted fan system and ducted fan tilting system are provided.

I. Principle of Operation

A ducted fan may be characterized as a fan situated within a cylindrical duct that may reduce the losses in thrust from the tips of the fan blades. Without being limited to any particular theory, the ducted fan may produce thrust through at least two mechanisms. Like any fan or propeller, the ducted fan may produce thrust as a result of the change in momentum of the airflow upstream versus downstream of the fan. Additional thrust may be produced by the effect of differential pressures acting inside versus outside the duct as a result of the acceleration of air flow within the duct. This additional thrust may be enhanced by the contour of the duct inlet and the non-linear diameter configuration of the duct walls. In one aspect, a bellmouth inlet characterized by a gradual contraction in cross-sectional area may generate additional thrust as described herein below.

Referring to FIGS. 1a and 1b, an incoming airflow 1b may enter through an inlet area 1i of a ducted fan and may move over and through the bellmouth 1c. The airflow 1b advancing through the bellmouth 1c may accelerate as a result of a contraction in cross-sectional area of the bellmouth 1c. As is well-known in the art, the principle of continuity of fluids dictates that the mass flow of a fluid remain constant as it flows through the duct, as expressed in Eqn. (1):

$$\dot{m}_1 = \dot{m}_2 \tag{1}$$

in which $\dot{m}_1$ and $\dot{m}_2$ are the mass flows through any two regions of the duct.

For incompressible flow, the flow speed V of a fluid flowing through a duct changes as a function of the changes in duct cross-sectional area A according to Eqn. (2):

$$V_1 A_1 = V_2 A_2 \tag{2}$$

Changes in the pressure (P) of the fluid with a constant density p within the duct may be governed by changes in the flow speed V according to Bernoulli's equation as expressed in Eqn. (3):

$$P_1 + \frac{1}{2}\rho V_1^2 = P_2 + \frac{1}{2}\rho V_2^2 \tag{3}$$

Eqn. 2 may be substituted into Eqn. (3) to develop an expression for the difference in pressure between two positions 1 and 2, as expressed in Eqn. 4:

$$P_1 - P_2 = \Delta P = \frac{1}{2}\rho V_2^2 \left(1 - \left(\frac{A_2}{A_1}\right)^2\right) \tag{4}$$

As expressed in Eqn. 4, as a fluid advances into the contracting cross-sections of a bellmouth inlet duct as illustrated in FIGS. 1a and 1b, the flow speed increases and the pressure decreases in proportion to the contraction in cross-sectional area of the duct. The distribution of internal duct pressures 1k as a function of distance advanced into the bellmouth duct is illustrated in FIG. 1b. However, the static pressure 1e acting on the outside surface of the duct remains constant in low speed and/or hovering flight, resulting in a pressure differential across the duct wall. This pressure differential, ΔP may be a significant thrust generation mechanism of a ducted fan, in particular at low speed flight conditions. The pressure differential may be integrated over the duct radius (dr) and over the length of the duct (dl) to determine the additional thrust ($T_{duct}$), resulting in Eqn. (5):

$$\vec{T}_{duct} = \iint \Delta P d\vec{r} d\vec{l} \tag{5}$$

Referring to Eqn. (5), if the radius and corresponding inlet area 1i is sufficiently large, then the thrust produced will be comparatively large with respect to a duct with a smaller bellmouth. In addition, a rounded bellmouth lip may help keep the incoming airflow 1b attached and may further increase the area over which accelerated airflow will travel, thereby enhancing the thrust of the nacelle or duct body during low speed and/or hovering flight operations. As a result, a bellmouth with a large cross-sectional inlet area may be particularly advantageous for hovering and low-speed flight.

However, during high-speed operations, a bellmouth inlet geometry may result in relatively high aerodynamic profile drag. Typically, a ducted fan characterized by a more streamlined inlet profile with a less rounded inlet lip and smaller inlet area is provided to enhance overall aircraft performance at high airspeeds.

II. Ducted Fan System

Figures 5A, 5B, 5C:
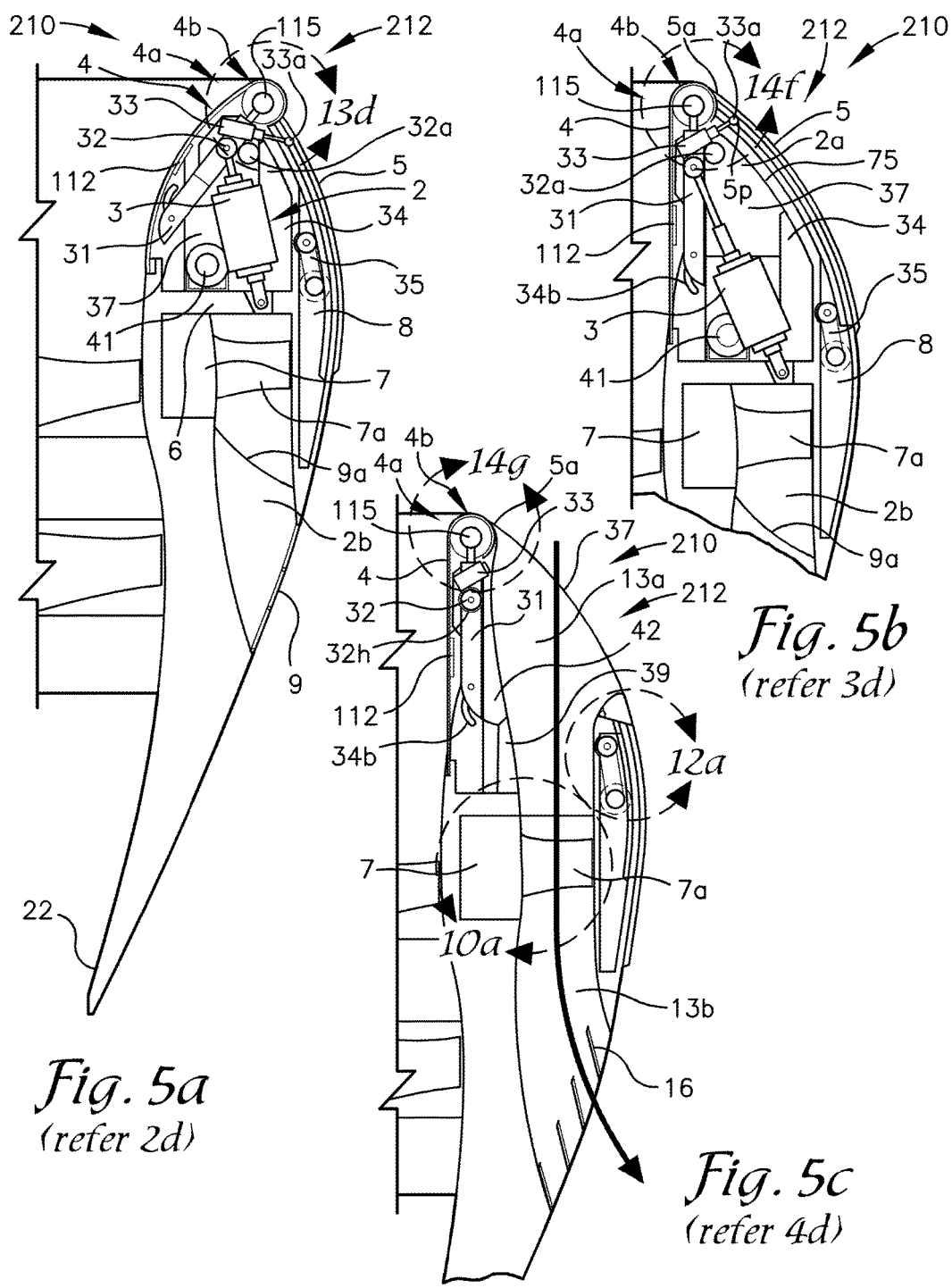
FIG. 5a is a vertical cross sectional view taken at section 5a-5a of FIG. 2d of the ducted fan with an adjustable size inlet system and an equipment bay in the Stage 1 position.
FIG. 5b is a vertical cross sectional view taken at section 5b-5b of FIG. 3d of the ducted fan with an adjustable size inlet system and an equipment bay in the Stage 2 position.
FIG. 5c is an enlarged and rotated view of the cross-section taken at 5c of FIG. 4d of the ducted fan with an adjustable size inlet system and an exterior bypass duct in the Stage 3 position.

In various aspects, an adjustable size ducted fan system is provided. Referring to FIG. 2a, the ducted fan system 200 may include a main fan assembly 202 and an exterior bypass fan assembly 204 housed within a nacelle 206. The main fan assembly 202 may include a multi-stage counter-rotating fan 208 housed within a duct structural wall 22 of an adjustable size fan duct 210. Referring to FIGS. 5a-5c, the adjustable size fan duct 210 may include an adjustable size inlet system 212 to provide the capability to vary the contour of the inlet duct over a variety of flight conditions. The adjustable size fan duct 210 may include an adjustable size inlet 4a defined by an adjustable size inlet lip 4b and a petal array 4 partially enclosing the adjustable size inlet lip 4b.

Figures 4A, 4B, 4C, 4D:
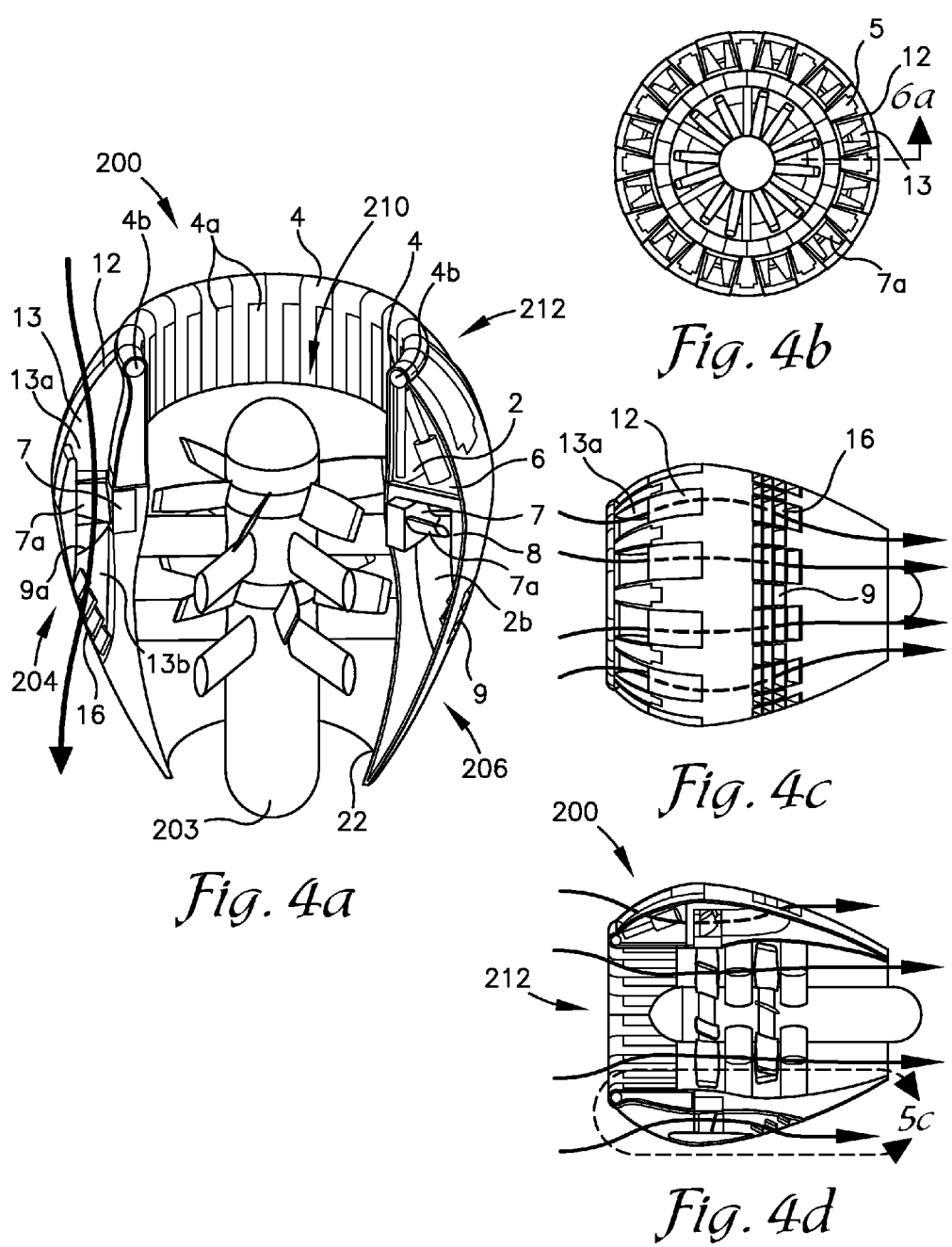
FIG. 4a is a cutaway perspective view of the ducted fan with an adjustable size inlet system and exterior bypass ducts in the Stage 3 position characterized by a sharp inlet lip profile, a reduced inlet cross-sectional area, and open exterior bypass duct doors to permit ram air flow through the bypass duct.
FIG. 4b is a front view of the ducted fan with an adjustable size inlet system and exterior bypass ducts in the Stage 3 position showing the contracted adjustable size inlet system petals and the opened exterior bypass duct sliding doors.
FIG. 4c is a side view of the ducted fan with an adjustable size inlet system and exterior bypass ducts in the Stage 3 position tilted horizontally for high-speed forward flight.
FIG. 4d is a cutaway side view of the ducted fan with an adjustable size inlet system and exterior bypass ducts in the Stage 3 position tilted horizontally for high-speed forward flight.

Referring to FIG. 4a, the ducted fan system 200 may further include an exterior bypass fan assembly 204 housed within the nacelle 206. The exterior bypass fan assembly 204 may include a toroidal fan 7 attached to the outer perimeter of the main fan duct structural wall 22. Referring to FIGS. 4a-4c, the inlet airflow to the toroidal fan 7 may be provided by a plurality of exterior bypass ducts 13 situated between the duct structural wall 22 of the central multi-stage counter-rotating fan 208 and the outer surface of the nacelle 206 within an outer portion of the nacelle 206 that may be opened and closed to produce additional thrust as needed for a variety of flight conditions.

A. POSITIONS OF ADJUSTABLE SIZE DUCTED FAN SYSTEM

In various aspects, the elements of the ducted fan system 200 may be positioned in a variety of positions. In the Stage 1 position, the adjustable size inlet system 212 may be fully expanded to a large bellmouth profile as illustrated in FIG. 2d. In a Stage 1 position, the rounded lip of the inlet may provide increased thrust that is well-suited for a variety of flight conditions including, but not limited to, low speed forward flight, hovering, and/or loitering.

Figure 3B:
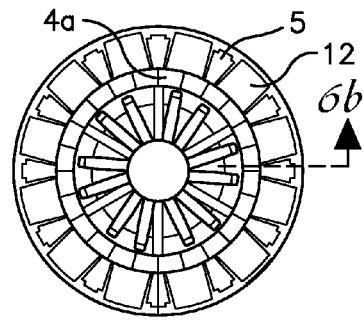
FIG. 3b is a front view of the ducted fan with an adjustable size inlet system and exterior bypass ducts in the Stage 2 position.
Figure 3C:
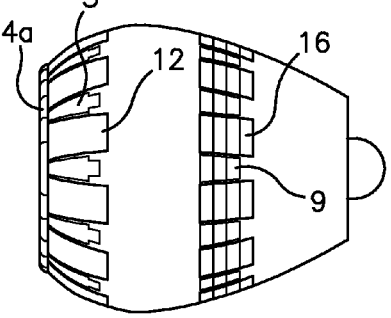
FIG. 3c is a side view of the ducted fan with an adjustable size inlet system and exterior bypass ducts in the Stage 2 position tilted horizontally for high speed forward flight.
Figure 3D:
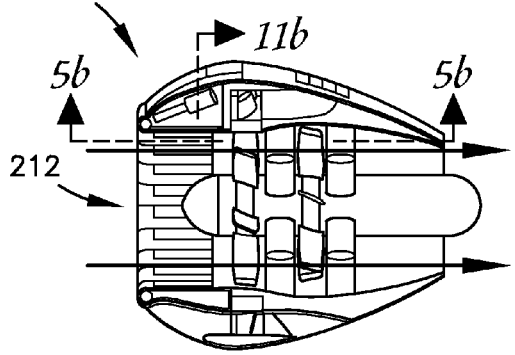
FIG. 3d is a cutaway side view of the ducted fan with an adjustable size inlet system and exterior bypass ducts in the Stage 2 position tilted horizontally for high speed forward flight.

Referring to FIG. 3d, the ducted fan system 200 may also be positioned in a Stage 2 position. In the Stage 2 position, the adjustable size inlet system 212 may be fully contracted to a cylindrical profile characterized by a relatively constant cross-sectional profile and relatively sharp edge of the inlet. The Stage 2 position is well-suited for high speed forward flight conditions because the ducted fan system 200 continues to provide thrust without the induced aerodynamic drag penalty of large bellmouth associated with the Stage 1 position.

Referring to FIG. 4d, the ducted fan system 200 may also be positioned in a Stage 3 position. In the Stage 3 position, the adjustable size inlet system 212 may be fully contracted to the cylindrical profile associated with the Stage 2 position. In addition, a plurality of sliding doors are repositioned to expose a plurality of exterior bypass inlet ducts, resulting in a substantial increase in thrust provided by the annular motor impeller blades embedded in the exterior bypass ducts.

Figure 7:
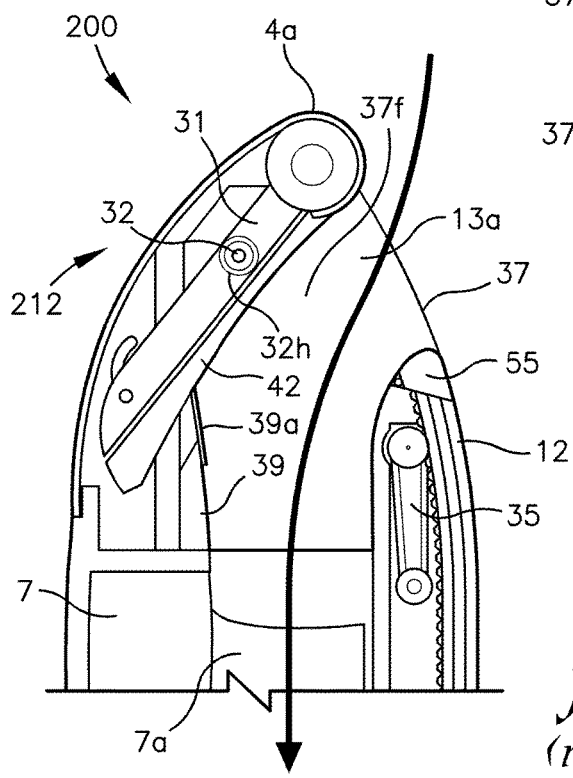
FIG. 7 is a vertical cross sectional view of an exterior bypass duct configured in the Stage 1X position characterized by lowered exterior bypass duct sliding doors and an activated annular electric motor and impellers.

Referring to FIG. 7, the ducted fan system 200 may also be positioned in a Stage 1x position. In the Stage 1x position the adjustable size inlet system 212 may be fully expanded as in the Stage 1 position, with the plurality of exterior bypass inlet ducts opened as in the Stage 3 position. The annular motor impellers are activated in the Stage 1x position to provide supplementary thrust to that of the ducted fan in the Stage 1 position as needed for takeoff and/or landing.

B. ADJUSTABLE SIZE INLET SYSTEM

In various aspects, the ducted fan system 200 is provided with an adjustable size inlet system 212 that includes an adjustable size inlet 4a defined by an adjustable size inlet lip 4b and a petal array 4 partially enclosing the adjustable size inlet lip 4b, as illustrated in FIG. 2a and FIG. 2b. The adjustable size inlet lip 4b may be operatively coupled to one or more actuators (not shown) to reposition the adjustable size inlet lip 4b between the Stage 1 position, characterized by a relatively large air inlet diameter (see FIG. 2a), and the Stage 2 position, characterized by a relatively small air inlet diameter (see FIG. 3a). In addition, the adjustable size inlet 4a may be provided with one or more additional actuators 3 to alter the curvature of the adjustable size inlet 4a from a bellmouth profile with a relatively high curvature associated with the Stage 1 position to a cylindrical profile with a relatively low curvature associated with the Stage 2 position and vice-versa. In various aspects, the petal array 4 is configured to reposition in a coordinated manner with the adjustable size inlet lip 4b to define the profile of the adjustable size inlet 4a in the Stage 1 and Stage 2 positions.

i. Petal Array

FIG. 13a is a partial view of the petal array 4 taken from inside the inlet duct configured in the Stage 1 position. The petal array 4 includes a plurality of type A inlet petals 103 and a plurality of type B inlet petals 104 arranged in an interleaved (i.e., alternating and overlapping) pattern around the circumference of the inlet. Each individual petal 103/104 may be formed from a long rectangular piece of a thin material including, but not limited to, a sheet metal material. Each Type A petal 103 may be a relatively thin strip with an essentially rectangular perimeter. Each Type A petal 103 may include a transition slit 103a extending inward from one lateral edge 103b to the approximate centerline of the Type A petal 103 in an aspect. The transition slit 103a separates an upper portion 103u of the type A petal 103 that partially encloses the adjustable size inlet lip 4b (not shown) and a lower portion 103l that extends downstream into the adjustable size inlet 4a and attaches to a top edge 109c of a duct structural wall 22.

Referring again to FIG. 13a, each type B petal 104 may be a relatively thin sheet with an essentially rectangular perimeter. In an aspect, the Type B petal 104 may be the same in dimension as the Type A petal 103, but may lack a transition slit 103a. Each of the Type B petals 104 is situated such that the lower edges of the Type A and Type B petals 103 and 104 are aligned. One lateral edge 104b of the Type B petal 104 is inserted into the transition slit 103a of the Type A petal 103 such that the lower portion 104l of the Type B petal 104 is exposed on the inner surface of the adjustable size inlet duct 4a and at least part of the upper portion 104u of the Type B petal 104 is concealed beneath the upper portion of 103a of the Type A petal 103 above the transition slit 103a.

In the Stage 1 position, as illustrated in FIG. 13a and FIG. 13b, the individual Type A petals 103 form into a curved profile characterized by outward curvature relative to the top edge 109c of the fan duct 22 to accommodate the bellmouth profile associated with the Stage 1 position. As a result, the upper portions 103u of the Type A petals 103 may be slightly separated, thereby exposing at least a fraction of the upper portion 104u of the Type B petals 104 between the upper portions 103u of each pair of adjacent Type A petals 103 in the petal array 4.

When the adjustable size inlet system 212 is configured in the Stage 2 position, as illustrated in FIG. 14a and FIG. 14b, actuators (not shown) reduce the circumference of the adjustable size inlet lip 4b (not shown), causing the upper portions 103u of adjacent Type A petals 103 to slide circumferentially toward one another during transition from the Stage 1 position to the stage 2 position. In addition, the actuators move the adjustable size inlet lip 4b slightly upward, causing each lower portion 103l/104l of the petals 103/104 to form a linear profile characterized by an alignment of each inner surface of each petal 103/104 with a central axis of the fan 208 (not shown). Taken together, the petal array 4 defines a slightly faceted cylindrical duct profile.

As a result of the reduced circumference and slight upward movement of the adjustable size inlet lip 4b effectuated by the actuators, adjacent Type A petals 103 abut one another along each pair of adjoining lateral edges 103b/104c and 103c/104b. As a result, the inner surfaces of the Type B petals 104 are concealed beneath the Type A petals 103 except for about half of the lower portions 104l that protrude downward from the transition slits 103a of the Type A petals 103. The remaining half of the lower portion 104l of each Type B petal 104 that protrudes downward from each transition slit 103a is concealed beneath the lower portion 103l of each adjacent Type A petal 103.

Figure 13C:
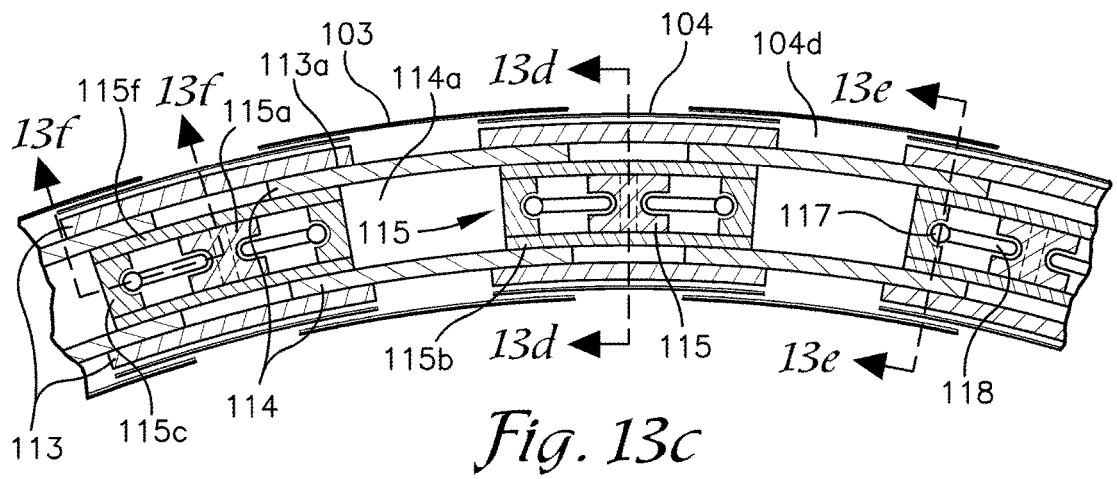
FIG. 13c is a partial horizontal cross-sectional view of the adjustable size inlet in the Stage 1 position showing the type A and type B petals and interior lip components.
Figure 13D:
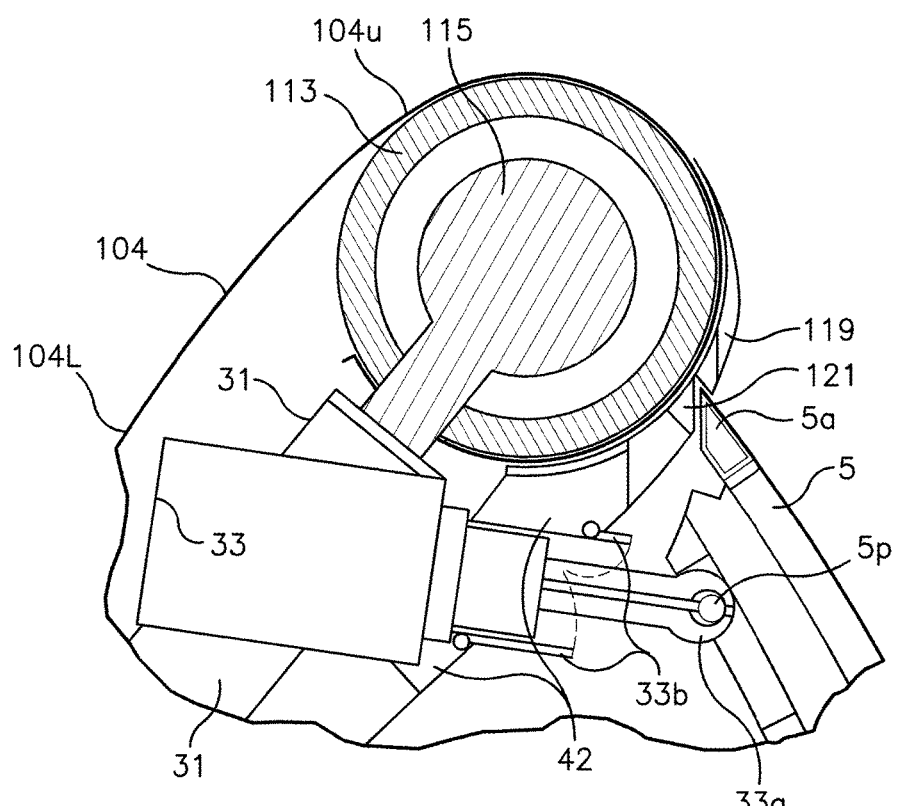
FIG. 13d is an enlarged vertical cross-sectional view of the adjustable size inlet taken at 13d-13d of FIG. 13c in the Stage 1 position showing the type B petals enclosing the inlet lip structural components.

Referring to FIG. 13d, the upper portions 103u/104u of the petals 103/104 are curved outward and downward to partially enclose the adjustable size inlet lip 4b. In one aspect, the upper portions 103u/104u may be recurved. The term recurved, as used herein, refers to the outward curvature of the upper portions 103u/104u over an arc length 4c that partially encircles the adjustable size inlet lip 4b. As illustrated in the cross-section through the plane of the adjustable size inlet 4a provided in FIG. 13c, the overlapping upper portions 103u/104u of the petals 103/104 form an essentially toroidal lumen within which the adjustable size inlet lip 4b is situated. In an aspect, the petals 103/104 interact mechanically with the elements of the adjustable size inlet lip 4b to reposition in a coordinated manner with the adjustable size inlet lip 4b. FIG. 14f is a cross-sectional view showing the adjustable size inlet lip 4b enclosed within the upper portions 103u/104u of the inlet petals 103/104 in the Stage 2 position.

Attachment Formers and Anchors

FIG. 14e is a cross-sectional view taken through the inlet plane at the top edge 109c of the inlet duct 22 as identified in FIG. 14b. As shown in FIG. 14e, the lower portions 103l/104l of the petals 103/104 are attached to the top edge 109c via a plurality of wedge-shaped formers 109a and anchors 109b.

Each base of each petal 103/104 near one lateral edge 103c/104c may be situated in direct contact with one of a plurality of an inner face 109e of the wedge-shaped formers 109a and held in place by an anchor 109b in an alternating pattern such that each base of a Type A petal 103 is attached adjacent to a base of a Type B petal 104. Each remaining lateral edge 103b/104b of each base of the petals 103/104 may be attached to the adjacent anchor 109b protruding from an adjacent wedge-shaped former 109a. In this aspect, each wedge-shaped former 109a has two attached petals 103/104: a first base of a petal 103/104 situated in direct contact with the wedge-shaped formers 109a and held in place by an embedded end 109f of an anchor 109b and a second base of a second petal 104/103 attached at a projecting end 109g of an anchor 109b opposite to the embedded end. In an aspect, each anchor 109b may further permit a limited degree of vertical movement of each attached petal 103/104 to allow for a slight splaying of each petal 103/104 in the Stage 1 position.

Alignment Tabs

As shown in FIG. 13b and FIG. 14b, the outer surfaces of the inlet petals 103/104 opposite to the inner surface of the inlet duct may further include one or more alignment tabs 112. The alignment tabs 112 mechanically interact to stabilize the petal array 4 in all stages and during the transition between stages.

FIG. 14d is a cross-sectional view taken as identified in FIG. 14b, in which the adjustable size inlet 4a is in the Stage 2 position. As illustrated in FIG. 14d, each alignment tab 112 may include a base 112a attached near a lateral edge 103b/104b of each petal 103/104. Each alignment tab 112 may further include a raised clip 112b protruding from the base 112a toward the lateral edge 103b/104b of a petal 103/104 at a relatively small height above the outer surface of the petal 103/104. The projecting end of the clip 112b opposite to the base 112a may further include a ridge 112c projecting toward the underlying surface of the petal 103/104. In an aspect, the ridge 112c may enhance the retention of an underlying lateral edge 104c/103c of an adjacent petal 104/103 within a gap between the alignment tab 112 and the outer surface of the petal 103/104 to which the alignment tab 112 is attached.

Referring again to FIG. 14d, a first petal 104 may have a first alignment tab 112 attached to its outer surface and a second petal 103 situated adjacent to the first petal 104 may have a second alignment tab 112 similarly mounted on its outer surface. A lateral edge 103c of the second petal 103 opposite to the second alignment tab 112 may protrude into a gap between the outer surface of the first petal 104 and the first alignment tab 112. When the adjustable size inlet system 212 is arranged in the Stage 1 position, the adjacent lateral edges 103c/104c of the petals 103/104 may protrude a smaller distance into the corresponding alignment tabs 112 due to the splaying of the petals 103/104 to form the bellmouth inlet duct shape associated with the Stage 1 position. When the adjustable size inlet system 212 is arranged in the Stage 2 position, as illustrated in FIG. 14b, the adjacent lateral edges 103c/104c of the petals 103/104 may project a larger distance into the corresponding alignment tabs 112 due to reduction in the radius of the adjustable size inlet 4a associated with the Stage 2 position. In various aspects, the dimensions of the alignment tabs 112 may be selected to retain the lateral edges 103c/104c of the petals 103/104 throughout the range of movements associated with the transition from the Stage 1 position to the Stage 2 position and vice-versa.

ii. Adjustable Size Inlet Lip

Referring to FIG. 2a, in various aspects the adjustable size inlet system 212 may include an adjustable size inlet lip 4b. Referring to FIG. 13c, the adjustable size inlet lip 4b may include a plurality of inner inlet lip petals 104, a plurality of nested structural tubes 113/114, and structural hub and tube unit 115 that interconnect to form a continuous ring structure around the perimeter of the adjustable size inlet 4a. The nested structural tubes may be coupled in a sliding arrangement to permit increases and decreases in the circumference of the inlet lip associated with various positions assumed by the inlet duct during use. Additional features, such as alignment pins and associated slots, may constrain the range of circumferential movement of the nested structural tubes to a range associated with the Stage 1 and Stage 2 positions of the inlet duct. In various aspects, one or more actuators coupled to the adjustable size inlet lip 4b may provide the required forces to transition the adjustable size inlet lip 4b and associated petal array 4 between the Stage 1 position and the Stage 2 position as needed during use.

Upstream refers to a direction opposite to the airflow direction through the nacelle, which may be, for example, relative to a translation or element location. Downstream refers to a direction the same as the airflow direction through the nacelle, which may be, for example, relative to a translation or element location. Depending on the orientation of the nacelle, the upstream and downstream directions may be oriented vertically up or down, horizontally left or right, or at any intermediate orientation. In various aspects, when the nacelle is positioned in a vertical orientation, as illustrated in FIGS. 2a and 3a, the terms upstream, up, over, and/or above may be used interchangeably and the terms downstream, down, under, and/or below may be used interchangeably to describe relative positions of corresponding elements and/or relative translations of elements without departing from the spirit and scope of the disclosure and should not be interpreted to limit the scope of the claims.

Structural Tubes and Structural Hub and Tube Unit

A horizontal cross-section of the adjustable size inlet 4a in the Stage 1 position is illustrated in FIG. 13c. In various aspects, the adjustable size inlet lip 4b includes a plurality of outer structural tubes 113 and inner structural tubes 114 evenly spaced around the circumference of the adjustable size inlet 4a. The plurality of inner structural tubes 114 are nested within the outer lumens 113a defined within the outer structural tubes 113 such that at least a portion of each opposed end of each inner structural tube 114 is nested within the outer lumen 113a of an adjacent outer structural tube 113, thereby forming a continuous ring structure. The plurality of inner structural tubes 114 may slide within the outer lumens 113a of the adjacent outer structural tubes 113 to increase or decrease the circumference of the adjustable size inlet lip 4b. In one non-limiting example, the inner structural tubes 114 may slide circumferentially toward one another within the outer lumens 113a to implement a transition from the Stage 1 position illustrated in FIG. 13c to the Stage 2 position illustrated in FIG. 14c.

Referring again to FIG. 13c, a plurality of structural hub and tube units 115 may be situated with the inner lumens 114a defined within the inner structural tubes 114. Each structural hub and tube unit 115 may include a structural hub 115a affixed within a hub tube 115f. Each hub tube 115f may further include solid hub tube ends 115c situated at each end of the hub tube 115f. The plurality of structural hub and tube units 115 are nested within the inner lumens 114a defined within the inner structural tubes 114 such that at least a portion of each opposed end of each structural hub and tube unit 115 is nested within the inner lumen 114a of an adjacent inner structural tube 114. The plurality of structural hub and tube units 115 may slide within the inner lumens 114a of the adjacent inner structural tubes 114.

Alignment Pins and Slots

In various aspects, the adjustable size inlet lip 4b may further include a plurality of alignment pins 117 extending across the diameters of the upper portions 104u of the Type B (inner) petals 104, the outer structural tubes 113, the inner structural tubes 114, and the structural hub and tube units 115. Mechanical interference of the plurality of alignment pins 117 with a plurality of slots may constrain the range of circumferential movements to a range associated with the Phase 1 position and the Phase 2 position, as well as the transition from Phase 1 to Phase 2 and vice versa.

Referring again to FIG. 13d, each alignment pin 117 may be affixed to the type A (outer) petals 103 at diametrically opposed pin fixation fittings 117a and 117b. A central portion of each alignment pin 117 situated between the pin fixation fittings 117a and 117b may pass through a pair of petal slots 104d formed within each underlying type B (inner) petals 104 at diametrically opposed locations beneath the pin fixation fittings 117a and 117b. In addition, each alignment pin 117 may pass through a pair of outer slots 113b formed within the wall of the underlying outer structural tube 113 at diametrically opposed positions. Each alignment pin 117 may also pass through a pair of inner slots 114b formed within the wall of the underlying inner structural tube 114 at diametrically opposed positions. The central portion of each alignment pin 117 may also pass through a pair of hub slots 115b formed within the wall of the underlying structural hub and tube unit 115 at diametrically opposed positions.

Figure 13F:
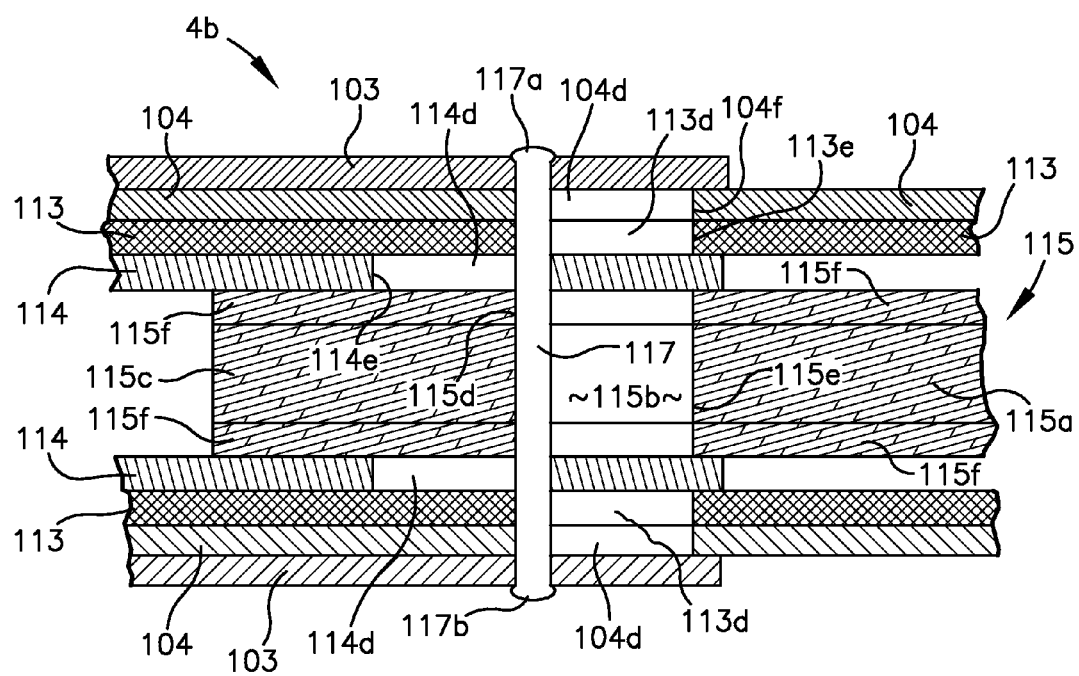
FIG. 13f is an enlarged partial cross-section diagram of the adjustable size inlet lip taken at 13f-13f of FIG. 13c in the Stage 1 position showing a mechanical interference between a pin and a plurality of slots formed in the petals and structural tubes.
Figure 14H:
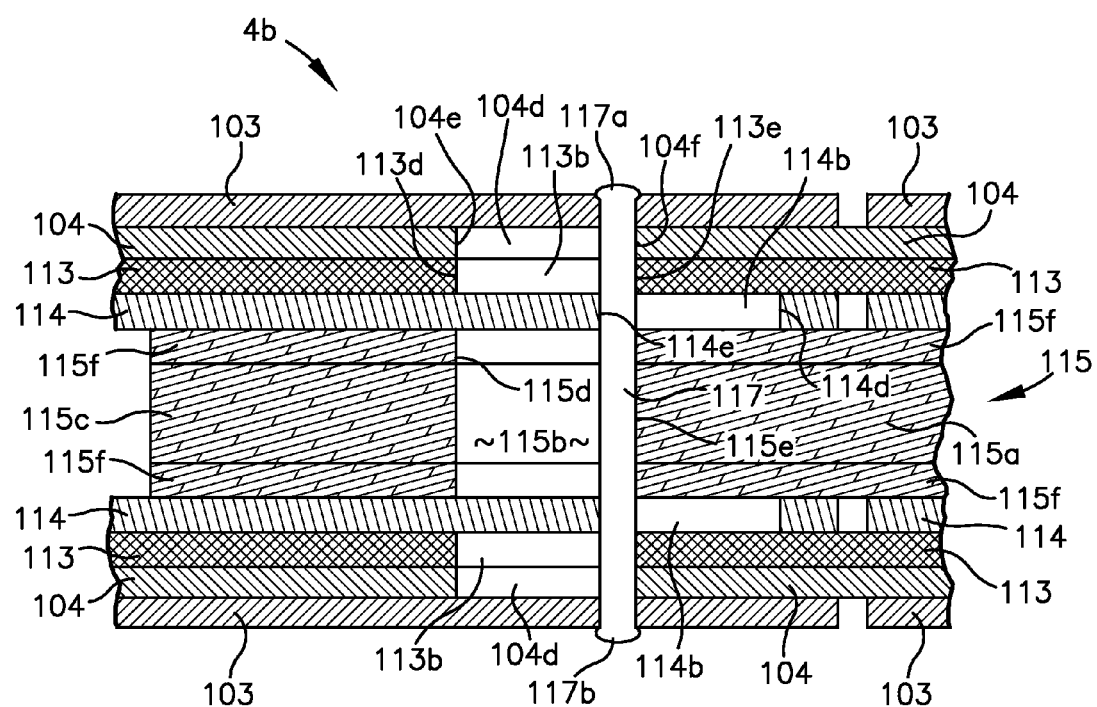
FIG. 14h is an enlarged partial cross-section diagram of the adjustable size inlet lip taken at 14h-14h of FIG. 14c in the Stage 3 position showing a mechanical interference between a pin and a plurality of slots formed in the petals and structural tubes.

In various aspects, the sliding movement of each pin 117 within the slots 104d/113ba/114b/115b may be limited in range by mechanical interaction between the pin 117 and the slots 104d/113b/114b/115b, thereby limiting the overall range of circumferential movement of the adjustable size inlet lip 4b. Referring again to FIG. 13C, each of the petal slots 104d formed within each inner petal 104 may extend laterally inward from a distal petal slot end 104e to a proximal petal slot end 104f over at least a portion of the width of the inner petal 104. Each outer slot 113b formed within each outer structural tube 113 may extend laterally from a distal outer slot end 113d to a proximal outer slot end 113e for a portion of the total length of the outer structural tube 113. Similarly, each of the inner slots 114b formed within each inner structural tube 114 may extend laterally from a distal inner slot end 114d to a proximal inner slot end 114e for a portion of the total length of the inner structural tube 114. Each hub slot 115b formed within each structural hub and tube unit 115 may extend laterally from a distal hub slot end 115d formed within a solid hub tube end 115c to a proximal hub slot end 115e formed within an end of the solid hub 115a for a portion of the total length of the structural hub and tube unit 115. Referring to FIG. 13f, the maximum circumference of the adjustable size inlet lip 4b in the Stage 1 position may be limited by the mechanical interference of a pin 117 with the distal ends 104e/113d/114d/115d of the inner petal 104, outer structural tube 113, inner structural tube 114 and structural hub and tube unit 115, respectively. Referring to FIG. 14h, the minimum circumference of the adjustable size inlet lip 4b in the Stage 2 and 3 positions may be limited by the mechanical interference of a pin 117 with the proximal ends 104f/113e/114e/115e of the inner petal 104, outer structural tube 113, inner structural tube 114 and structural hub and tube unit 115, respectively.

iii. Actuators for Adjustable Size Inlet Lip

In various aspects, the adjustable size inlet system 212 may further include one or more actuators to implement changes in the circumference and curvature of the inner inlet surface associated with transitions between the Stage 1 position and the Stage 2 position. In various aspects, the one or more actuators are operatively coupled to one or more elements of the adjustable size inlet lip 4b. In various other aspects, the one or more actuators are housed within a plurality of equipment bays distributed around the perimeter of the nacelle of the ducted fan system.

Magnetic Push-Pull Locking Solenoid

FIG. 5a is a side cross-sectional view of the adjustable size inlet system 212 configured in the Stage 1 position, in which the cross-sectional view is depicted at the plane defined in FIG. 2d. As illustrated in FIG. 5a, the adjustable size inlet lip 4b is affixed to a first end of an actuating arm 31 that may be rotated about a pivot point 31a situated at a second end of the actuating arm 31. In an aspect, the pivot point 31a may be entrained within a curved slot 34b formed within a duct structural wall 34a of the adjustable size inlet system 212. The pivot point 31a may slide downward within the curved slot 34b when the adjustable size inlet system 212 is configured in the Stage 1 position, as illustrated in FIG. 5a. The pivot point 31a may slide upward within the curved slot 34b when the adjustable size inlet system 212 is configured in the Stage 2 position, as illustrated in FIG. 5b. Referring to FIG. 13d, the first end of the actuating arm 31 may be attached to the structural hub and tube unit 115 of the adjustable size inlet lip 4b.

Referring again to FIG. 5a, the actuating arm 31 may be connected to a magnetic pull/push locking tubular solenoid 3 at a pivoting attachment situated between the first and second ends of the actuating arm 31. A base of the magnetic pull/push locking tubular solenoid 3 is attached at a pivoting attachment to an equipment bay floor 6 to provide a stable structure against which the solenoid 3 may push and/or pull to effectuate movements of the actuating arm 31 and structural hub and tube unit 115 of the adjustable size inlet lip 4b.

Referring to FIG. 5a, when the adjustable size inlet system 212 is arranged in the Stage 1 position, the magnetic pull/push locking tubular solenoid 3 is retracted, causing the actuating arm 31 to rotate outward from the main fan duct centerline and away from the inner wall of the main fan duct. Referring to FIG. 13c, this rotation causes the structural hub and tube unit 115 of the adjustable size inlet lip 4b to move outward, thereby inducing the adjustable size inlet lip 4b to accommodate an increase in circumference of the adjustable size inlet 4a. This rotation of the actuating arm 31 further causes the structural hub and tube unit 115 of the adjustable size inlet lip 4b to move in a downward direction, causing a curvature within the lower petals 103l/104l of the petal array 4. Referring again to FIG. 5a, this curvature of the petal array 4 within the inlet duct entrance results in the bellmouth contour of adjustable size inlet 4a associated with the Stage 1 position.

Referring to FIG. 5b, when the adjustable size inlet system 212 is arranged in the Stage 2 position, the magnetic pull/push locking tubular solenoid 3 is extended, causing the actuating arm 31 to rotate inward toward the main fan duct centerline and toward the inner wall of the main fan duct. Referring to FIG. 14c, this rotation causes the structural hub and tube unit 115 of the adjustable size inlet lip 4b to move inward toward the duct centerline, thereby inducing the circumferential sliding of the inner structural tube 114 within the outer structural tube 113 to accommodate a decrease in circumference of the adjustable size inlet 4a. Referring again to FIG. 5b, this rotation of the actuating arm 31 further causes the actuating arm 31 to assume an essentially vertical orientation, thereby relaxing the curvature of the lower pedals 103l/104l and forming an upper inlet duct surface that is essentially constant in cross-sectional diameter. This constant cross-section upper inlet duct surface characterizes the Stage 2 position.

In various aspects, the actuating arm 31 may rotate through a range of angles relative to the central axis of the fan to alter the curvature of the lower pedals 103l/104l. In one aspect, the actuating arm 31 may rotate inward toward the central axis of the fan at an angle of up to about 15° relative to an axis parallel with the central axis of the fan. In another aspect, the actuating arm 31 may rotate outward away from the central axis of the fan at an angle of up to about 45° relative to an axis parallel with the central axis of the fan. In various other aspects, the actuating arm 31 may rotate inward toward the central axis of the fan and outward away from the central axis of the fan through any intermediate angle from about 15° inward to about 45° outward relative to an axis parallel with the central axis of the fan.

Locking Device

Referring again to FIGS. 5a and 5b, a locking device 33 may be attached to the actuating arm 31 near the attachment of the actuating arm 31 to the structural hub and tube unit 115 of the adjustable size inlet lip 4b. Referring to FIG. 14f, this locking device 33 includes a locking device arm 33a that may be extended from the locking device 33 and reversibly attached to a locking pin 5p affixed to an equipment bay sliding door 5. When the adjustable size inlet system 212 is arranged in the Stage 1 position (see FIG. 5a), the locking device arm 33a may be extended and attached to the locking pin 5p, thereby locking the equipment bay sliding door 5 in place. Referring to FIG. 14g, when the adjustable size inlet system 212 is arranged in the Stage 3 position (see FIG. 5c), the locking device arm 33a may detach from the locking pin 5p affixed to an exterior bypass duct door 12 and retract into the locking device 33. The retracted locking device arm 33a may be covered by a pair of hinged doors 33b attached to a moveable section of the bypass duct wall 42, thereby forming an aerodynamically smooth surface over the adjustable size inlet 4a.

Referring to FIG. 14f, the locking device arm 33a may also be extended from the locking device 33 and reversibly attached to a locking pin 5p affixed to an exterior bypass sliding door 12. When the adjustable size inlet system 212 is arranged in the Stage 1 or Stage 2 positions, the locking device arm 33a may be extended and attached to the locking pin 5p, thereby locking the exterior bypass sliding door 12 in place. When the adjustable size inlet system 212 is arranged in the Stage 1x or Stage 3 position, as illustrated in FIG. 14g, the locking device 33 may detach from the locking pin 5p and retract into the locking device 33, thereby allowing the exterior bypass sliding door 12 to slide downward and expose an exterior bypass duct 13a associated with the Stage 1x and the Stage 3 positions.

Perimeter Control Actuator

In addition to the magnetic pull/push locking tubular solenoid 3, the adjustable size inlet system 212 may also include an additional actuator to control the expansion and contraction of system elements associated with transitions between the different inlet positions in various embodiments. This additional actuator may reduce or increase the circumference around the adjustable size inlet 4a in coordination with the magnetic push/pull tubular solenoid 3.

Figure 11C:
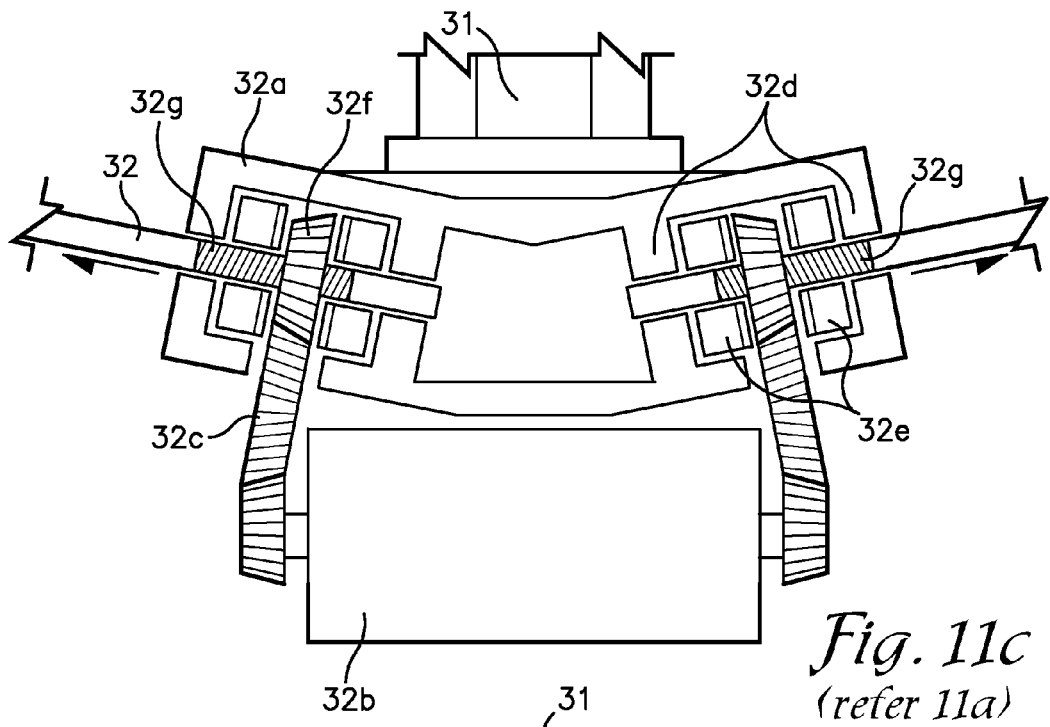
FIG. 11c is a cross-sectional view of a perimeter control rod joining box taken in the Stage 1 position.
Figure 11D:
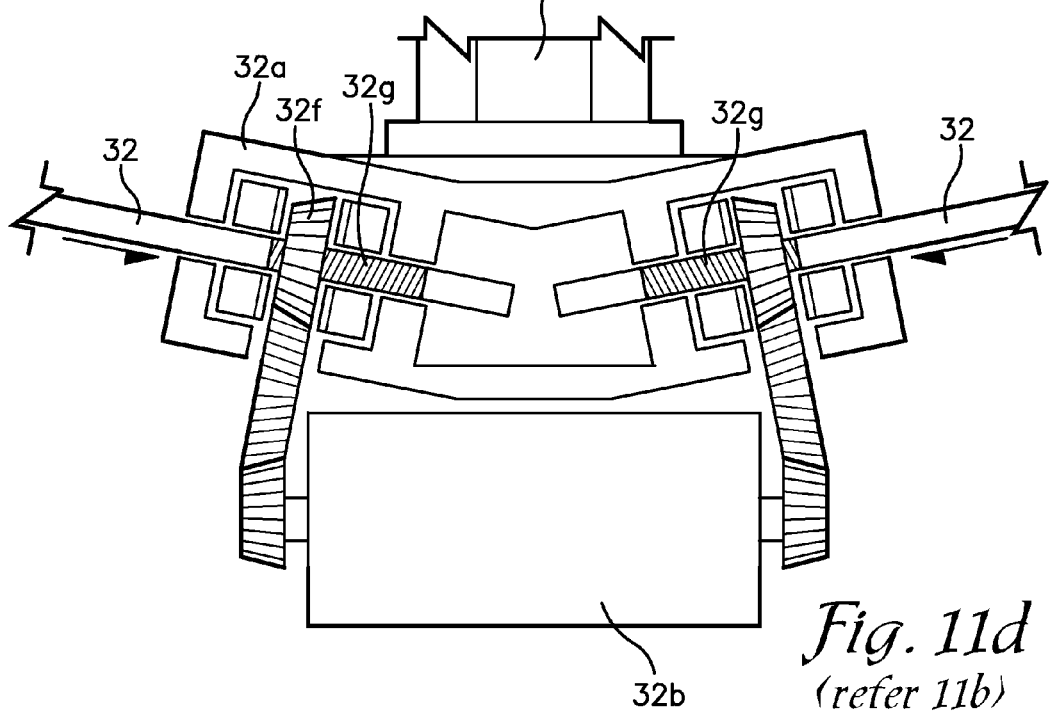
FIG. 11d is an enlarged view taken at 11d of FIG. 11b showing the joining box in the closed Stage 2 or Stage 3 positions.

FIGS. 11a and 11b are horizontal cross-sectional views of the adjustable size inlet system 212 arranged in the Stage 1 and Stage 2 positions, respectively and taken at a plane parallel to the inlet mouth as shown in FIGS. 2d and 3d, respectively. Referring to FIGS. 11a and 11b, a perimeter control rod 32 may extend between each pair of actuating arms 31. Referring to FIG. 5a, the perimeter control rods 32 may be attached at essentially the same location on the actuating arm 31 as the attachment point of the magnetic push/pull tubular solenoid 3. Referring again to FIG. 11b, each end of each perimeter control rod 32 is joined to each actuating arm 31 via a control rod joining box 32a. Each control rod joining box 32a is affixed to one of the actuating arms 31 as illustrated in FIGS. 11c and 11d. Each perimeter control rod 32 may be pulled in or out of a corresponding control rod joining box 32a by an actuator as described herein below to decrease or increase the inlet duct circumference as needed.

FIG. 11c is a detailed view of the control rod joining box 32a illustrated in FIG. 11a. Each control rod joining box 32a is attached to an actuating arm 31 and connects the threaded ends 32g of a pair of perimeter control rods 32, forming a continuous series of segments around the perimeter of the adjustable size inlet system 212. Each control rod joining box 32*a* may include an electric motor 32*b* operatively coupled to a gear system 32*c*. The gear system 32*c* is also operatively coupled to the threaded ends 32*g* of perimeter control rods 32 via a threaded fitting 32*f* that meshes with the threaded ends 32*g* of perimeter control rods 32. The electric motor 32*b* may turn the pair of threaded fittings 32*f* of the gear system 32*c* to push or pull the threaded ends 32*g* of the perimeter control rods 32 in or out of the control rod joining box 32*a*. The linear movement of the perimeter control rods 32 may be limited by mechanical interference of the threaded fitting 32*f* of the gear system 32*c* with expansion and contraction stops 32*d* and bearings 32*e* incorporated into the control rod joining box 32*a*.

As illustrated in FIG. 11*c*, the threaded ends 32*g* of the perimeter control rods 32 may move out of the control rod joining box 32*a* to increase the circumference of the adjustable size inlet lip 4*b* to accommodate the bellmouth inlet shape associated with the Stage 1 position. Referring to FIG. 11*d*, the threaded ends 32*g* of the perimeter control rods 32 may move into the control rod joining box 32*a* to decrease the circumference of the adjustable size inlet lip 4*b* to accommodate the constant cross-section inlet shape associated with the Stage 2 position.

In various aspects, the movements of the perimeter control rods 32 are effectuated in coordination with each magnetic push/pull tubular solenoid 3 and each actuating arm 31 to transition between the different positions of the adjustable size inlet 4*a*. In an aspect, the operation of the electric motor 32*b* of the control rod joining box 32*a* may readjust the inlet profile of the adjustable size inlet system 212 after the changes in the circumference of the adjustable size inlet lip 4*b* have been effectuated by the adjustable size inlet solenoid 3 and actuating arm 31.

iv. Equipment Bay

Referring to FIG. 5*a*, in various aspects, the adjustable size inlet system 212 may include an equipment bay 2 to house the actuators and mechanical elements associated with the movements of the adjustable size inlet 4*a* and duct sidewall extender 37. Each equipment bay 2 may be enclosed by the structural floor 6, the petal array 4, the adjustable size inlet 4*a*, and the nacelle perimeter compartments 8. Referring to FIG. 8*c*, a plurality of equipment bays 3 are distributed in an alternating arrangement with a plurality of exterior bypass ducts 13 around the perimeter of the nacelle. Referring again to FIG. 5*a*, each equipment bay 2 may be separated from each adjacent exterior bypass duct 13 by a duct sidewall extender 37 that may be raised or lowered as needed to maintain an intact separation barrier throughout changes in the shape of the equipment bay associated with operation of the adjustable size inlet system 212 in the Stage 1, Stage 1*x*, Stage 2, or Stage 3 positions as described herein below.

Equipment Bay Sliding Door

In addition, the equipment bay 2 is enclosed by an equipment bay sliding door 5. The equipment bay sliding door 5 may be partially raised to contact the leading edge 5*a* of the sliding door 5 with the adjustable size inlet 4*a* during operation in the Stage 1 and 1*x* positions, or may be fully raised to maintain contact of the leading edge 5*a* with the adjustable size inlet 4*a* during operation in the Stage 2 (see FIG. 5*b*) and Stage 3 (see FIG. 5*c*) positions. Referring to FIG. 9*a*, the equipment bay sliding door 5 may include a leading edge 5*a* that may be partially lowered to accommodate the outward curvature of the inlet lip 4*a* in the bellmouth arrangement associated with the Stage 1 and Stage 1*x* positions. Referring to FIG. 13*d*, the leading edge 5*a* may abut a transition section 119 of the inlet lip 4*a* and may form a tight seal against a compressible material 121 attached around the outer perimeter of the inlet lip 4*a* adjacent to the transition section 119. Referring to FIG. 9*b*, the leading edge 5*a* may be fully raised to bring the leading edge 5*a* into contact with the inlet lip 4*a* to provide a relatively smooth outer nacelle surface during operation in the Stage 2 and Stage 3 positions.

v. Main Fan Assembly

Referring to FIG. 2*a*, the ducted fan system 200 may include a main fan assembly 202 housed within a multi-stage counter-rotating fan 208 housed within the duct structural wall 22 of an adjustable size fan duct 210. The multi-stage counter-rotating fan 208 may include two or more fan sections that may rotate in the same direction in a co-rotating arrangement, or may rotate in opposite directions in a counter-rotating arrangement. Any known fan device may be incorporated into the main fan assembly 202 including, but not limited to, gas turbine fans and electric fans. In various aspects, a single engine may be used to power the main fan assembly 202, or two or more separate engines may be mechanically coupled together using techniques well-known in the art.

Referring to FIG. 8*d*, the multi-stage counter-rotating fan 208 may be provided in four sections: a first section 65, a second section 66, a third section 67, and a fourth section 68. The first section 65 may include a nose cone 65*a* affixed to an upstream end of a half shaft 65*c*. The opposite downstream end of the half shaft 65*c* may be operatively coupled to a contra-rotating gear box 66*a* housed within the second section 66. A first contra-rotating impeller hub 65*b* with a protruding first set of impeller blades 1*g* may be affixed to the first half shaft 65*c* between the nose cone 65*a* and the contra-rotating gear box 66*a*.

Figure 8A:
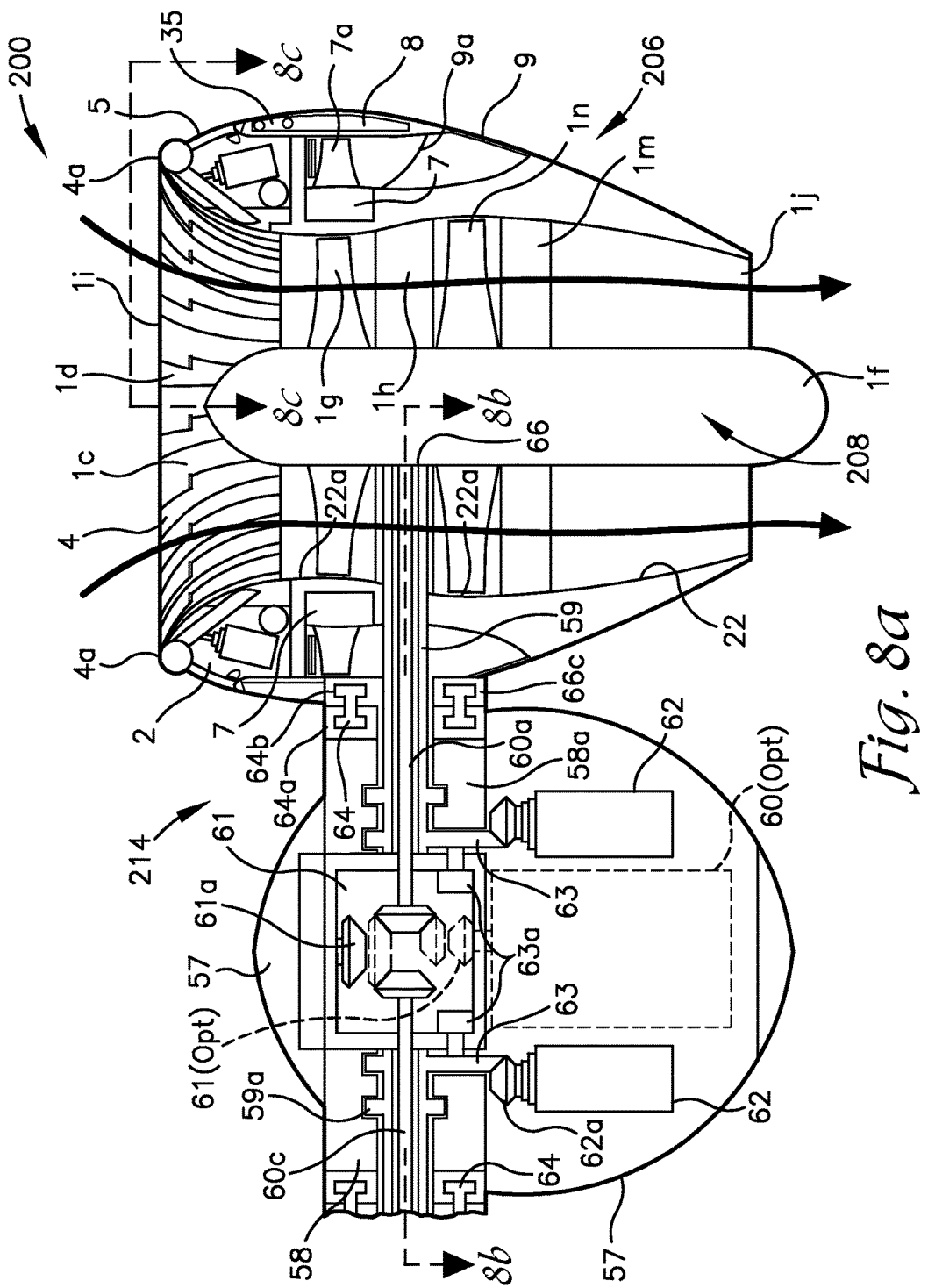
FIG. 8a is a partial cross-sectional top view of a fuselage of a VTOL aircraft affixed to a ducted fan with an adjustable size inlet system and exterior bypass ducts; the ducted fan is tilted vertically for vertical takeoff or landing.

The second section 66 may include the contra-rotating gear box 66*a* affixed to at least two front stators 1*h*. Referring to FIG. 8*a*, each of the front stators 1*h* is a blade-like element characterized by a streamlined cross-sectional profile to reduce the disruption of airflow within the duct downstream of the front stators 1*h*. Each front stator 1*h* may be affixed to the contra-rotating gear box 66*a* at one end and to the duct structural wall 22 at an opposite end. The contra-rotating gear box 66*a* may also be operatively coupled to a driveshaft 67*b* extending upstream from the motors 1*f* housed in the fourth section 68.

Referring again to FIG. 8*d*, the third section 67 may include a downstream impeller hub 67*a* with a plurality of protruding impeller blades 1*n* attached to the driveshaft 67*b* and situated between the motors 1*f* and the contra-rotating gear box 66*a*.

As also shown in FIG. 8*d*, the fourth section 68 may include a casing 68*a* that contains and supports the motors 1*f*. The casing 68*a* is attached and supported by at least two rear stators 1*m*. Each rear stator 1*m* is a blade-like element characterized by a streamlined cross-sectional profile similar to the cross-sectional profile of the front stators 1*h*. Each rear stator 1*m* is attached to the casing 68*a* at one end and to the duct structural wall 22 at an opposite end. The fourth section 68 may also include the driveshaft 67*b*, that is operatively coupled to the motors 1*f*.

In use the driveshaft 67*b* and gear box 66*a* drive both sets of impellers, powered by the motors 1*f*. When activated, the motors 1*f* generate torque that rotates the driveshaft 67*b* and attached downstream impeller hub 67*a* along with a plurality of protruding impeller blades 1*n*. In addition, the driveshaft 67*b* transfers torque from the motors 1*f* to the gear box 66*a*. The gear box 66*a* provides torque to the driveshaft 67*b*. The half shaft 65*c*, powered by the gear box 66*a*, rotates the attached first contra-rotating impeller hub 65*b* and impeller blades 1*g*.

Referring again to FIG. 8*a*, the duct wall 22*a* may be contoured to enhance the performance of the main fan assembly 202. In one aspect, the duct wall 22*a* may be reinforced in the regions at which the front stators 1*h* and lower stators 1*m* are attached. In another aspect, the duct wall 22*a* may be contoured to conform to the different lengths of impellers 1*g*/1*n*. In one aspect, the front impellers 1*g* may be shorter in length than the rear impellers 1*n*. In this aspect, the rear impellers 1*n* may be rotated at a higher rotation rate than the front impellers 1*g* blades, thereby enhancing the thrust by methods well-known in the art. In another aspect, the downstream end of the duct wall may gradually contract between the rear impellers 1*n* and the duct exit 1*j*. In this other aspect, this duct contour may generate additional thrust due to the pressure differential between the downstream end of the duct wall and the external static pressure using the same mechanism described herein above in connection with the bellmouth inlet profile.

C. EXTERIOR BYPASS DUCT SYSTEM

In various aspects, the ducted fan system 200 may include a reversibly deployable exterior bypass duct. Referring to FIG. 5*c*, the exterior bypass duct 13*a*/13*b* may be deployed to provide airflow to a secondary toroidal fan 7 when the ducted fan system 200 is arranged in the Stage 1*x* or Stage 3 positions to produce additional thrust as needed. When not in use, a plurality of moveable elements may be rearranged to close off the exterior bypass duct 13*a*/13*b* and to provide an aerodynamically smooth outer surface for the nacelle 206 during operation in the Stage 1 or Stage 2 positions.

The reversible deployment of the exterior bypass duct 13 may include positioning a plurality of exterior bypass duct doors 12 in an open position to uncover a plurality of inlets to the exterior bypass ducts 13 as illustrated in FIG. 4*c*. The deployment of the exterior bypass duct 13 may be reversed by repositioning the plurality of exterior bypass duct doors 12 to a closed position to seal the plurality of inlets to the exterior bypass ducts 13, as illustrated in FIG. 3*c*.

The exterior bypass ducts 13 may include at least two portions: a configurable upper portion 13*a* and a relatively fixed lower portion 13*b*. The duct walls defining the interior surfaces of the upper portion 13*a* of the exterior bypass ducts 13 may include a combination of fixed structural supports and moveable components that may be rearranged as described herein below to provide clearance for inlet lip elements in the Stage 1 position as well as to provide the interior surfaces of the upper portion 13*a* of the exterior bypass duct 13 in the Stage 2 and Stage 3 positions.

FIG. 7 is a vertical cross-section through the upper portion of an exterior bypass duct 13*a* showing the adjustable size inlet 4*a* positioned in the Stage 1X position. The internal walls of the upper portion 13*a* of the exterior bypass duct 13 are formed by a duct sidewall extender 37, a duct wall moveable section 42, a duct wall fixed section 39, and a flexible seal 39*a*. The upper portion 13*a* of the exterior bypass duct 13 may also include an adjustable profile nose 55 to reduce the turbulence of airflow into the upper portion 13*a* of the exterior bypass duct 13. Referring to FIG. 5*c*, a toroidal secondary fan 7 may pull air from the upper portion 13*a* to the lower portion 13*b* of the exterior bypass duct 13. The airflow may exit the exterior bypass duct 13 via lower duct area operable outlet louvers 16.

Referring to FIG. 8*c*, the nacelle structure may be subdivided circumferentially into a first plurality of sections containing the exterior bypass ducts 13 and a second plurality of equipment bays 2 containing actuators and other mechanical elements associated with the operation of the adjustable size inlet lip 4*a*. When the exterior bypass ducts 13 are deployed, each opening of each exterior bypass duct 13 is separated by an intervening equipment bay door 5 situated over an equipment bay 2, as illustrated in FIGS. 4*b* and 4*c*. The equipment bays 2 do not have air inlets in the upper section but instead draw transfer air from adjacent bypass ducts 13*a* into the lower section 2*b*. The transferred airflow from exterior bypass duct 13*b*, moves past an airflow guide vane 9*a* and exits the equipment bay lower section 2*b* via a plurality of equipment bay operable outlet louvers 9 that are opened during deployment of the exterior bypass ducts 13 and are otherwise closed along with the lower duct area operable outlet louvers 16 in order to maintain an aerodynamically smooth exterior nacelle surface during operation of the ducted fan system during operation in the Stage 1 or Stage 2 positions.

i. Exterior Bypass Duct Doors

In various aspects, the exterior bypass duct doors 12 close off the inlets to the exterior bypass upper ducts 13*a* when positioned in a raised/closed position, as illustrated in FIGS. 2*b* and 3*b*. When the ducted fan system is operating in the Stage 1 position (FIG. 2*b*), the exterior bypass duct sliding doors 12 are only partially raised to accommodate the outward-flaring curvature of the bellmouth inlet shape associated with the Phase 1 position of the adjustable size inlet 4*a*. When the ducted fan system is operating in the Stage 2 position (FIG. 3*b*), the exterior bypass duct sliding doors 12 are configured in a fully raised position. In various aspects, the exterior bypass duct sliding doors 12 also provide an aerodynamically smooth outer nacelle surface during operation of the ducted fan system in the Stage 1 or Stage 2 positions.

During operation in the Stage 1*x* or Stage 3 positions, in which the exterior bypass ducts 13 are deployed, the exterior bypass duct sliding doors 12 are lowered into an open position to allow ram airflow to enter the upper portion of the exterior bypass duct 13*a*, as illustrated in FIG. 4*c* (Stage 3 position). Referring to FIG. 4*a* the exterior bypass duct doors 12 are lowered to allow ram air to enter the exterior bypass duct 13*a*, pass through the annular electric motor impellers 7*a*, and exit through the exterior bypass lower duct 13*b* via the lower duct area operable outlet louvers 16. A portion of the air flow transferred from exterior bypass lower ducts 13*b* may exit through the adjacent lower equipment bay 2*b* via additional equipment bay operable outlet louvers 9.

Referring to FIG. 9A, each sliding equipment bay door 5 may include a door leading edge 5*a* that abuts the inlet lip 4*a* when the equipment bay door 5 is lowered during operation in the Stage 1 position. Referring to FIG. 9*b*, the leading edge 5*a* of the equipment bay door 5 may abut a transition fillet 119 attached at the top of the inlet lip 4*a* illustrated in FIG. 14*f*. A compressible material 121 attached to the inlet lip 4*a* below the transition fillet 119 may receive the door leading edge 12*a* to form a tight seal at the top of the inlet lip 4*a*. Referring to FIG. 9C, the leading edge 12*a* of the exterior bypass duct door 12 may be lowered away from the inlet lip 4*a* during operation in the Stage 3 position in order to expose the opening to the exterior bypass duct 13.

ii. Sliding Door Operating Assembly

Referring to FIG. 11*a*, the left portion of a door motor 102, a left drive shaft 98*h* supported by an left operating gearframe 97, a left pulley wheel 98 and a left belt 98b are operatively coupled with an left upper pulley wheel 98a and left belt 98b. The left drive shaft 98h of the door motor 102 may turn the left lower pulley wheel 98 and left belt 98b which then turns the left upper pulley wheel 98a located at an upper level as shown in FIG. 11b. The right section of the door motor 102, control gear box 102a, right axle 98e supported by the operating gearframe 97a, right lower pulley wheel 98d, and right belt 98f, are operatively coupled with a right upper pulley wheel 98c and right belt 98f. The control gear box 102a and right axle 98e turn the right belt 98f and right lower pulley 98d which turns a right upper pulley wheel 98c and right drive wheel 101a as shown in FIG. 11b.

Referring to FIG. 11b, an upper left section supported by the left operating gearframe 97 supports a left drive wheel 101 driven by a left upper pulley wheel 98a and left belt 98b from the left lower pulley wheel 98. The left drive wheel 101 may include left gear teeth that mesh with corresponding teeth of a left linear gearbar 99 embedded in each exterior bypass duct door 12, and extending vertically along the height of the exterior bypass door 12. To raise and lower the exterior bypass door 12, the door motor 102 may apply torque to the left lower pulley wheel 98. This torque may be transferred to the left upper pulley wheel 98a which turns the left drive wheel 101, the gear teeth of the rotating left drive wheel 101 thereby converting the rotating motion of the left drive wheel 101 into the linear translation of the left gearbar 99. The movement of the left gearbar 99 embedded in the exterior bypass door 12 translates to linear and vertical sliding movement of the exterior bypass door 12.

Referring again to FIG. 11b, an upper right section supported by the right operating gearframe 97a supports a right upper pulley wheel 98c, right belt 98f, right axle 101d, and right drive wheel 101a. The right drive wheel 101a may include gear teeth that mesh with corresponding teeth of a right linear gearbar 99b embedded in the equipment bay door 5 and extending vertically along the height of the equipment bay door 5. To raise and lower the equipment bay door 5, the door motor 102 may apply torque to the right lower pulley wheel 98d. This torque may be transferred to the right upper pulley wheel 98c and right drive wheel 101a, the gear teeth of the rotating right drive wheel 101a thereby converting the rotating motion of the right drive wheel 101a into the linear translation of the right gearbar 99b. The movement of the right gearbar 99b embedded in the equipment bay door 5 translates to linear and vertical sliding movement of the equipment bay door 5.

Figure 9D:
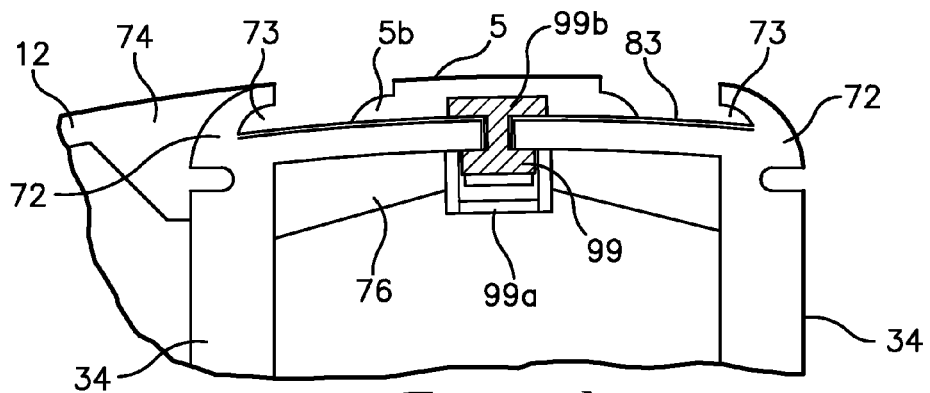
FIG. 9d is a partial cross-sectional view taken at 9d-9d of FIG. 9a through an equipment bay sliding door on the nacelle sliding surface with an embedded door track and fixed portion of the equipment bay sidewall in the Stage 1 position.
Figure 9E:
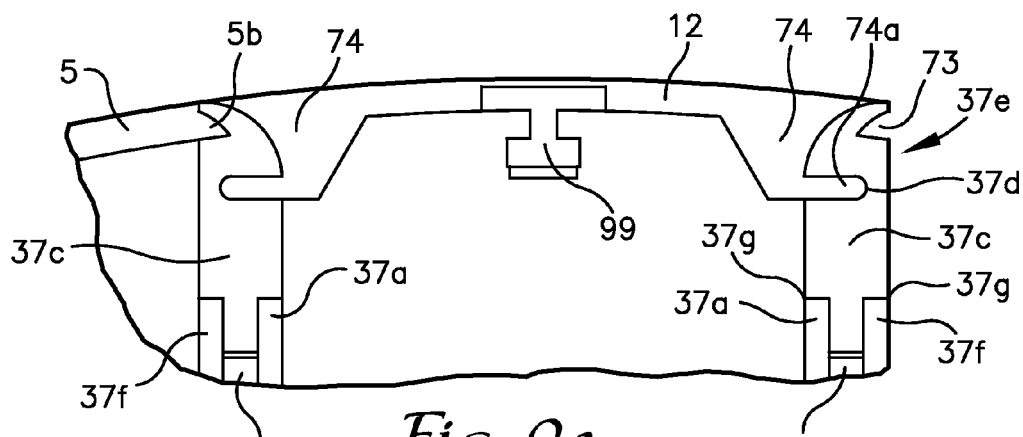
FIG. 9e is a partial cross-sectional view taken at 9e-9e of FIG. 9b through the exterior bypass duct in Stage 2 position with an embedded linear gearbar, showing the exterior bypass duct sliding door closed and supported by duct sidewall extenders.
Figure 9F:
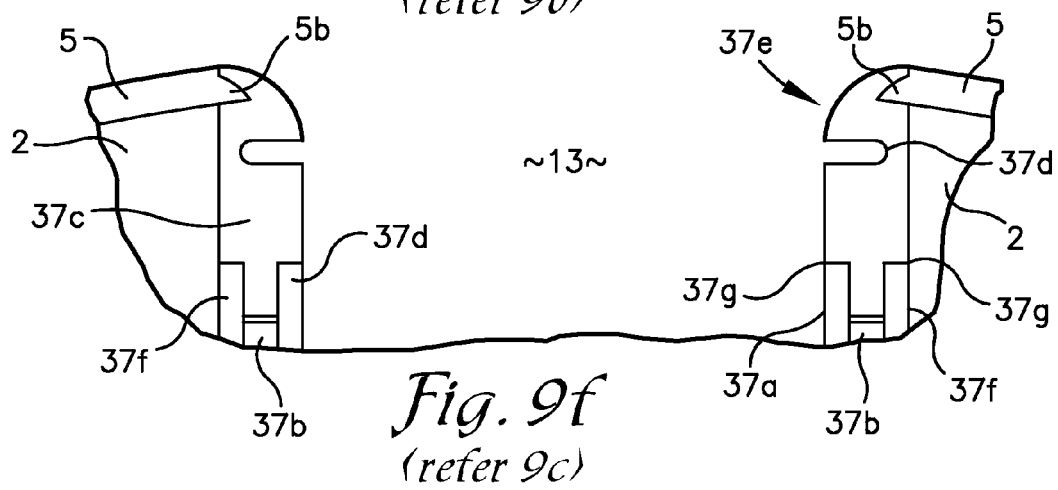
FIG. 9f is a partial cross-sectional view taken at 9f-9f of FIG. 9c through an exterior bypass duct in the Stage 3 position with the exterior bypass duct sliding door opened (not shown) and supported by the duct sidewall extenders.

Referring to FIG. 9e, the lateral edges of the exterior bypass sliding door 12 are provided with interlocking edges 74 that include a protruding ridge 74a. In the stage 2 position, as illustrated in FIG. 9e, each protruding ridge 74a interlocks with a corresponding locking groove 37d formed within a top track rail 37e of the duct sidewall extender 37 components. Each top track rail 37e is fastened between the top edges 37g of the moveable plies 37a/37f of each duct sidewall extender 37. In this arrangement, the top track rail 37e may be raised and lowered as needed along with the moveable plies 37a/37f of each duct sidewall extender 37 as described in further detail below. When the exterior bypass sliding doors 12 are lowered in order to open the exterior bypass ducts in the Stage 1X or Stage 3 positions as illustrated in FIG. 9f, each protruding ridge 74a slides downward through each corresponding locking groove 37d, thereby providing support of the lateral edges of the exterior bypass sliding doors 12 throughout the transition from the raised position to the lowered position.

iii. Duct Sidewall Extender

Figure 6A:
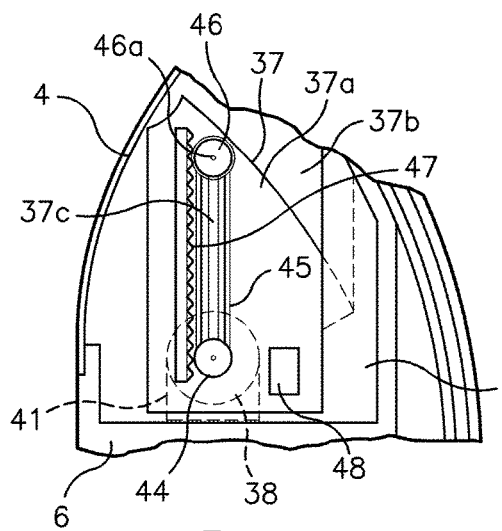
FIG. 6a is a partial cross-sectional view taken at section 6a of FIG. 2b of the ducted fan with an adjustable size inlet system and equipment bay in the Stage 1 position.

Referring to FIG. 7, the wall enclosures of each exterior bypass duct 13 are formed by the duct sidewall extender 37, the duct wall moveable section 42, the duct wall fixed section 39 and flexible seal 39a. Referring to FIG. 5b, the duct sidewall extenders 37 may be raised by a sidewall extender operating assembly 41 to serve as airtight sidewalls separating the equipment bays 2 from the exterior bypass duct bays 13. Referring to FIG. 6a, the inner ply 37a of each duct sidewall extender 37 may be lowered when the adjustable size inlet system 212 is arranged in the Stage 1 position. The fixed duct sidewall core 37b of each duct sidewall extender 37 remains in a fixed position to engage each sliding equipment bay door 5 to form a sealed partition between each exterior bypass duct 13a and each equipment bay 2, as illustrated in FIG. 9e. This reconfigurable duct sidewall extender 37 provides for increased clearance within the equipment bay 2 for the various elements associated with the positioning of the adjustable size inlet lip 4a in the bellmouth profile.

Referring to FIG. 6a, each duct sidewall extender 37 may include a duct wall extender core 37b affixed to the floor 6, a moveable inner ply 37a and outer ply 37f situated on either side of the duct wall core 37b. In an aspect, the inner ply 37a may be situated within the equipment bay 2, and the outer ply 37f may be situated within the upper bypass duct 13a. As described herein above and illustrated in FIG. 9e, a top track rail 37e is fastened between the top edges 37g of the moveable plies 37a/37f of each duct sidewall extender 37 to provide support for the lateral edges of the exterior bypass sliding doors 12. The moveable duct wall plies 37a/37f may be extended upward for the Stage 2 or Stage 3 position (see FIG. 6b and FIG. 7), or retracted into the equipment bay 2 in the Stage 1 position (see FIG. 6a).

The moveable duct wall plies 37a/37f may be extended and retracted using the actuators and associated mechanical elements of an operating assembly 41. Referring again to FIG. 6a, the operating assembly 41 may include an electric motor 38 (shown with dashed lines) situated in between the adjacent duct sidewall extenders 37, a shaft-mounted pulley wheel 44 operatively coupled to the electric motor 38, and an upper pulley wheel 46 operatively coupled to the shaft-mounted pulley wheel 44 via a belt 45. An axle 46a attached to the upper pulley wheel 46 may be supported within a bearing formed within the fixed duct wall core 37b. The axle 46a may protrude through a vertical slot 37c formed through the moveable wall inner ply 37a within the equipment bay 2. The protruding end of the axle 46a may end in a gear-toothed rim 46 situated adjacent to a lateral surface of the moveable wall inner ply 37a within the equipment bay 2 opposite to the fixed duct wall core 37b. A gear strip 47 affixed to the lateral surface of the moveable wall inner ply 37a within the equipment bay 2 is operatively coupled to the gear-toothed rim 46 via meshing gear teeth of the two elements. Each pair of duct wall moveable plies 37a/37f associated with one duct wall core 37b are affixed to one another by an anchor pin. These anchor pins move freely through slots 37d provided within the duct wall cores 37b. The operating assembly 41 may further include a locking device 48 operatively coupled to the electric motor 38 to lock the motor shaft in place as required, thereby fixing the moveable duct wall plies 37a/37f in place via the interconnected elements of the operating assembly 41.

Figure 6B:
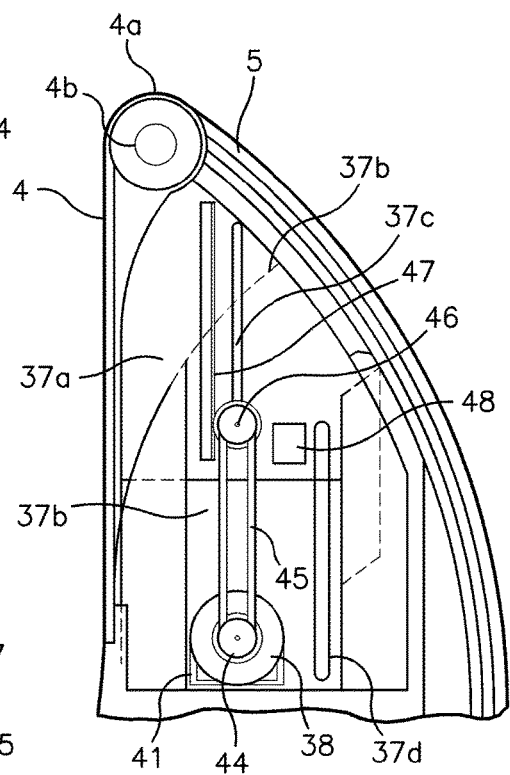
FIG. 6b is a partial cross-sectional view taken at section 6b of FIG. 3b of the ducted fan with an adjustable size inlet system and equipment bay in the Stage 2 position.

Referring to FIG. 6b, the moveable plies 37a/37f of the sidewall extenders 37 may be raised to serve as a seal between the equipment bay 2 and the exterior bypass ducts 13 when the ducted fan system 200 is operating in the Stage 2 or Stage 3 positions. The electric motor 38 of the operating assembly 41 may be activated, thereby turning the shaft mounted pulley wheel 44, belt 45, and upper pulley wheel 46. The meshed gear teeth of the gear-toothed rim 46 and the gear strip 47 affixed to the moveable inner ply 37*a* within the equipment bay 2 translates the rotation of the gear-toothed rim 46 into vertical translation of the gear strip 47 and affixed moveable inner ply 37*a*.

iv. Nose

Referring to FIG. 7, the exterior bypass ducts 13 may further include an adjustable profile nose 55. The nose 55 provides a rounded outer edge for the exterior bypass ducts 13, thereby enhancing the quality of incoming airflow to the toroidal secondary fan 7 further below. Referring to FIG. 12*a*, when the exterior bypass sliding doors 12 are lowered during operation in the Stage 1*x* and Stage 3 positions, the nose 55 is seated over the top edge 12*a* of the exterior bypass sliding door 12 and underlying gearbar 99. During operation in the Stage 1 and Stage 2 positions, each exterior bypass sliding door 12 is raised to cover the opening of the exterior bypass ducts 13, causing the deflection of the nose 55 into a stowed position 56, as depicted in dashed lines in FIG. 12*a*. In an aspect, the nose 55 may include a spring-biased hinge that swings the nose 55 into the stowed position 56. This procedure may be reversed to reseat the nose 55 over the top edge 12*a* of the exterior bypass sliding door 12 and underlying gearbar 99.

v. Lower Bypass Inlet Duct

Referring to FIG. 4*a*, each exterior bypass duct 13 includes a lower duct portion 13*b* situated below the annular electric motor 7 opposite to the upper duct portion 13*a*. The lower duct portion 13*b* receives airflow exiting the impellers 7*a* and exhausts the airflow out of the lower duct portion 13*b* via lower duct area operable outlet louvers 16 that are opened during operation in the Stage 1*x* or Stage 3 positions. Each lower duct portion 13*b* is separated from each adjoining lower equipment bay 2*b* by an outlet airflow control vane 9*a*.

vi. Motor and Impeller Blades

Referring to FIG. 5*c*, an embedded annular electric motor 7 with impeller blades 7*a* may be situated between the upper duct portion 13*a* and lower duct portion 13*b* of the exterior bypass duct 13. The annular electric motor 7 and impeller blades may be housed within an annular compartment 7*b*. Airflow may enter the annular compartment 7*b* via the upper duct portion 13*a* of the exterior bypass duct 13 and airflow may exit the annular compartment 7*b* via the lower duct portion 13*b*. The upper equipment bay 2*a* and the lower equipment bay 2*b* are sealed off from the annular compartment 7*b* by the structural floor 6. Intake air is obtained from the free airflow from the exterior bypass duct 13*b*.

Figure 10A:
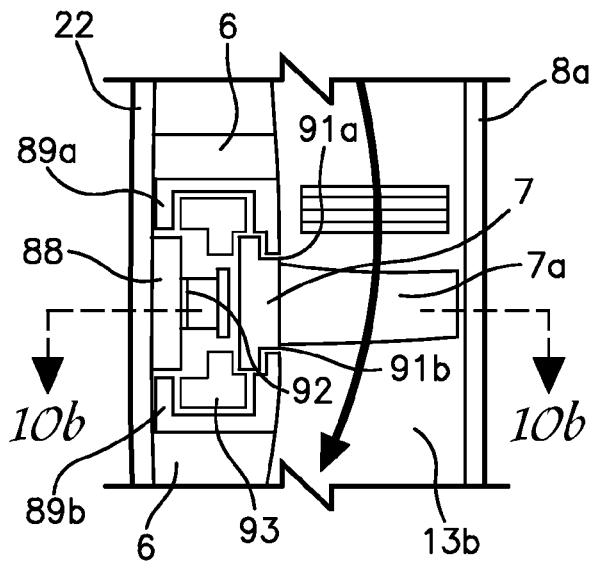
FIG. 10a is an enlarged view taken at 10a of FIG. 5c through an exterior bypass duct and showing the annular electric motor with a plurality of rotor blades affixed to the rotor.
Figure 10B:
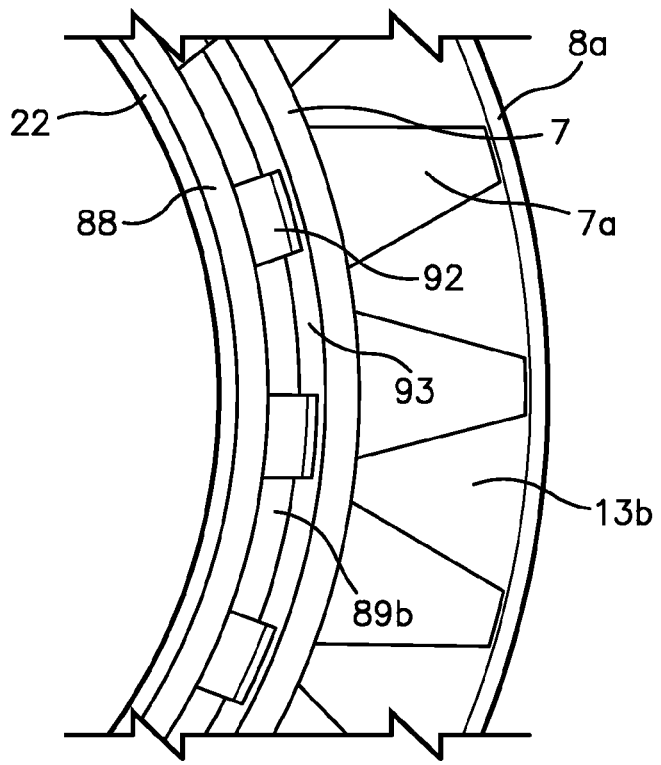
FIG. 10b is a horizontal cross-sectional view of an annular electric motor with a plurality of impeller blades affixed to the rotor of the motor.

Referring to FIGS. 10*a* and 10*b*, the annular electric motor 7 may include an electro-magnetic stator 88, an upper stator ring 89*a*, and a lower stator ring 89*b*, all affixed to outer surface of the ducted fan wall 22*a*. The annular electric motor further includes a plurality of impeller blades 7*a* projecting radially outward from a rotor 7*c*. The rotor 7*c* is suspended between upper air/magnetic bearings 91*a* and lower air/magnetic bearings 91*b*, thereby facilitating frictionless high speed rotation. The stator 89 may further include a plurality of electric-powered magnetic induction elements 92 distributed around the perimeter of the stator 88 and projecting radially outward from the stator 88. The annular electric motor 7 may further include a drive actuator component 93 situated above and below the induction elements 92. The drive actuator component 93 operatively couples the magnetic induction elements 92 and the rotor 7*c* to drive the rotor 7*c* into high speed rotation.

D. TILTING MECHANISM

In various aspects, the nacelle 206 containing the ducted fan system 200 may be attached to an aircraft using a ducted fan tilting system 214. The ducted fan tilting system 214 may include actuators and mechanical elements to rotate the nacelle 206 to a variety of orientations including, but not limited to: slightly aft of vertical, slightly below horizontal, and all orientations between vertical and horizontal orientations. In various aspects, the ducted fan tilting system 214 and ducted fan system 200 may be used to provide directed thrust at a selected orientation to a variety of aircraft including, but not limited to, a VTOL (vertical takeoff and landing) aircraft.

Referring to FIG. 8*a*, the ducted fan tilting system 214 may be housed within a fuselage 57. As illustrated in FIG. 8*a*, the nacelle 206 has been rotated to a vertical orientation to provide vertical thrust during a vertical takeoff, and the ducted fan system 200 is arranged in the Stage 1 position.

The fan tilting system 214 may include a structural support bearing 58 affixed to the fuselage 57. The twin ducted fan tilting system 214 may further include structural carry-thru spines 59 and 59*a*. The carry-thru spine 59 may be affixed at one end to a ducted fan system 200 at the second section 66 of the fan 208. The carry-thru spine 59 may be affixed at an opposite end to a main gear box 61 situated within the center of the fuselage 57 supported by a structural support bearing 58. A segment of the structural carry-thru spine 59 situated between the nacelle 206 and the main gear box 61 may be supported by the structural support bearing 58. The structural carry-thru spine 59 may also serve as a conduit for power and control lines between the ducted fan system 200 and fuselage 57.

A main connector ring 64 may join the fuselage 57 to the nacelle 206. The main connector ring 64 may include a first ring 64*a* affixed to the fuselage 57 and a second ring 64*b* affixed to the nacelle 206. The exposed faces of first ring 64*a* and the second ring 64*b* opposite to the respective attached faces may be rotatably coupled to provide a rotational coupling of the nacelle 206 to the fuselage. The structural carry-thru spine 59 may pass through opening formed through the first ring 64*a* and the second ring 64*b*.

A tilting gear ring 63 may be affixed to the structural carry-thru spine 59 and may be supported within a section of the structural bearing 58*a*. The tilting gear ring 63 may be operatively coupled to a gearmotor 62 situated within the fuselage 57. The gearmotor 62 may include a drive gear 62*a* that mechanically meshes with the tilting gear ring 63.

In use, the gearmotor 62 may be activated to generate a torque that is transferred to the structural carry-thru spine 59 via the meshed gears of the tilting gear ring 63 and drive gear 62*a*. This torque may be transferred via the structural carry-thru spine 59 to the ducted fan system 200 at the connector ring section affixed to the nacelle structure fixation point 64*b*. When the desired tilt is achieved, the gearmotor 62 may be deactivated and the structural elements of the ducted fan tilting system 214 may maintain the nacelle 206 in a fixed position. A locking device 63*a* housed in the main gear box 61 may activate a locking arm through the gear box wall, thereby pinning the gear wheel 63 and locking the ducted fan system 200 into a selected position.

The components of the carry-through spine 59 may serve as a propulsion unit cross-over system that allows either of the operating fans to operate both ducted fans on the aircraft simultaneously in the event that one ducted fan is off or inactive. The cross-over system is activated when the second section gear box 66 of the ducted fan 200 engages the second end gear of the drive shaft 60b, thereby turning the drive shaft 60a and the other end gear of the drive shaft 60b. The turning of the drive shaft 60a drops a transfer idler gear 61a into place, which engages a first end gear of the drive shaft 60c, thereby coupling the ducted fan gear boxes of both ducted fans 200 and activating the cross-over system.

E. OPTIONAL TURBINE/ENGINE POWERPLANT

Referring to FIG. 8a, an optional engine/turbine powerplant 60 (shown as dashed lines) may be installed in a fuselage 57 abutting the main gear box 61 to provide power to the ducted fan gear box 66a and to produce sufficient thrust for safe operation during vertical ascent, climbing, and descent. The optional powerplant 60 may activate a drive shaft gear 61b which is projected forward (shown as dashed lines). The drive shaft gear 61b meshes with a first end gear of the drive shaft 60a and turns a second end gear of the drive shaft 60b. The second end gear of the drive shaft 60c meshes with the counter-rotating gear box 66a in the ducted fan 208 (see FIG. 8d) to turn the counter-rotating impeller blades 1g/1n to produce thrust.

The optional engine/turbine powerplant 60 optionally may be disengaged during less demanding flight conditions such as cruise, taxiing, and low speed forward flight. For example, the gear box 66a in the ducted fan 208 optionally may disengage from the second end gear of the drive shaft 60a; the gear box 66a may then engage the fan motor drive shaft 67b which power the motor impellers during the less demanding flight conditions. In an aspect, the use of an optional engine/turbine powerplant 60 during demanding flight conditions may allow for the use of smaller and lighter ducted fan motors during cruise, taxiing, and low speed flight, resulting in more efficient power consumption than an aircraft lacking the optional engine/turbine powerplant 60.

F. EXEMPLARY VTOL AIRCRAFT

In various aspects, the ducted fan system 200 may be integrated into a VTOL aircraft as described herein above. In one aspect of the disclosure, a twin ducted fan VTOL aircraft may be provided.

FIG. 15a is a planform of a VTOL tilt ducted fan aircraft, shown in Stage 2 position, with two aft fuselage support arm mounted tilt duct fans and one forward fixed duct fan. The single forward ducted fan has the same large bellmouth inlet as in the two aft ducted fans and is enclosed in the forward fuselage in fixed vertical position for VTOL maneuvers and covered while in forward flight. FIG. 15e illustrates the aircraft with the air inlet and the vectored thrust assembly deployed in forward flight. The twin tilt-duct fans may include the ducted fan system 200, annular electric motor impellers and exterior bypass duct secondary propulsion system as described herein.

In an aspect, the aircraft may include the nose ram air inlet 125, fixed ducted fan 126, sliding cover 127, canard wing 128, forward aircraft attitude control thrusters 129p, and 129s, fuselage 131, main wings 132, aft aircraft attitude control thrusters 133p, and 133s, twin mounted ducted fans 135p, and 135s, support arms 134, stabilizer 136, and rudder 137. The aircraft attitude control thrusters may operate as a separately powered system without the need to draw bleed air from any of the aircraft prime propulsion units and may include an electric power supply adjacent to the thrusters, as illustrated in FIGS. 15f and 15g. The aircraft attitude control thrusters may allow immediate response to control the aircraft's attitude in pitch, roll, yaw and horizontal movements. The Stage 2 position may be employed for high speed forward flight and may achieve very high forward speeds by transitioning to Stage 3 with the additional thrust provided by the annular electric motor impellers housed within the exterior bypass ducts.

FIG. 15b is a side elevation of the illustrated VTOL twin tilting duct fan aircraft. In various aspect, the aircraft may include the nose ram air inlet 125, ducted fan sliding cover 127, (closed), canard wing 128, fuselage 131, main wing 132, aft aircraft attitude control thruster 133p, port ducted fan 135p, starboard ducted fan 135s, stabilizer 136, rudder 137, and bottom sliding ducted fan cover 139. An arrow symbol indicates the range of tilting movement. FIG. 15c is a frontal view of the aircraft showing the ram air inlet 125, front aircraft attitude control thrusters 129p, and 129s, fuselage 131, main wing 132, tilting ducted fan structural supports 134, ducted fan 135s, and 135p, rudder 137, and stabilizer 136. FIG. 15d is a partial nose cross-section of the aircraft in Stage 1 (VTOL) position through the ram air inlet 125 (closed), ducted fan 126, ducted fan sliding cover 127, ducted fan sliding exhaust cover 139, EO turret area 141, and optional propulsion unit system compartment 68a. FIG. 15e is a partial nose cross-section of the aircraft with the nose ram air intake 125 opened in Stage 2 and Stage 3 position while the sliding duct door cover 127 is closed. Ram air may enter through the ram air intake 125, into the ducted fan and may be vectored aftward by the interior contour of the lower sliding duct door cover 139, thereby producing forward thrust. The aircraft may further include a cockpit area 141, optional propulsion equipment compartment 68a, and cargo area 142 in various aspects.

FIG. 15f is a partial top view of the aircraft in Stage 1 position showing the front ducted fan 126, front ducted fan sliding duct cover 127, canard wing 128, front aircraft attitude control thruster 129p, and sliding door cover, power supply 129pe, front aircraft attitude control thruster 129s, and sliding door cover, power supply 129se, and fuselage 131. The front aircraft attitude control thrusters may provide control for pitch, yaw, and roll movements. FIG. 15g is a partial top view of a main wing section 132 showing a larger electric attitude control thruster 133s with sliding doors retracted, revealing the control vanes of the thruster. Dashed lines indicate the location of the autonomous power supply 133se. Aft aircraft attitude control thrusters may provide control for roll, yaw and pitch movements. FIG. 15h is a partial top view showing twin ducted fans 135p and 135s tilted vertically in VTOL Stage 1 position, showing a portion of a fuselage 131, support arm 134, and rudder 138.

FIG. 15i is a partial side view of the aircraft showing a ducted fan tilted vertically 135p in VTOL Stage 1 position, the fuselage 131, the main wing 132, the aft attitude control thruster 133p, and the rudder 137. An arrow symbol indicates the range of duct tilting motion.

Figure 16B:
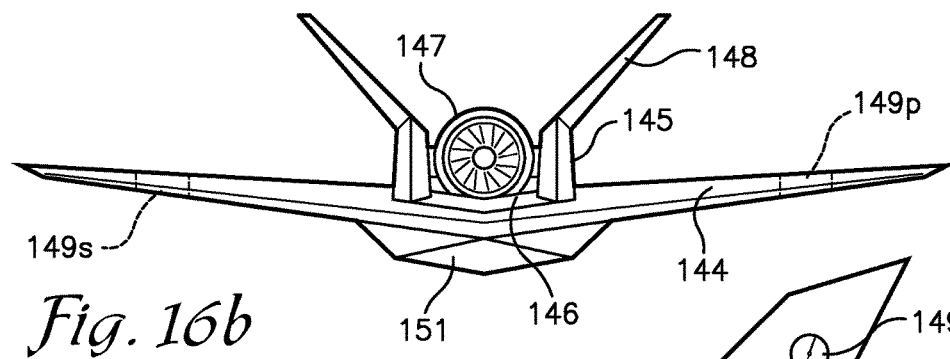
FIG. 16b is a front view of the VTOL aircraft illustrated in FIG. 16a, showing the main wing, tilting ducted fan, boom-mounted V-tail, and attitude control thrusters.
Figure 16A:
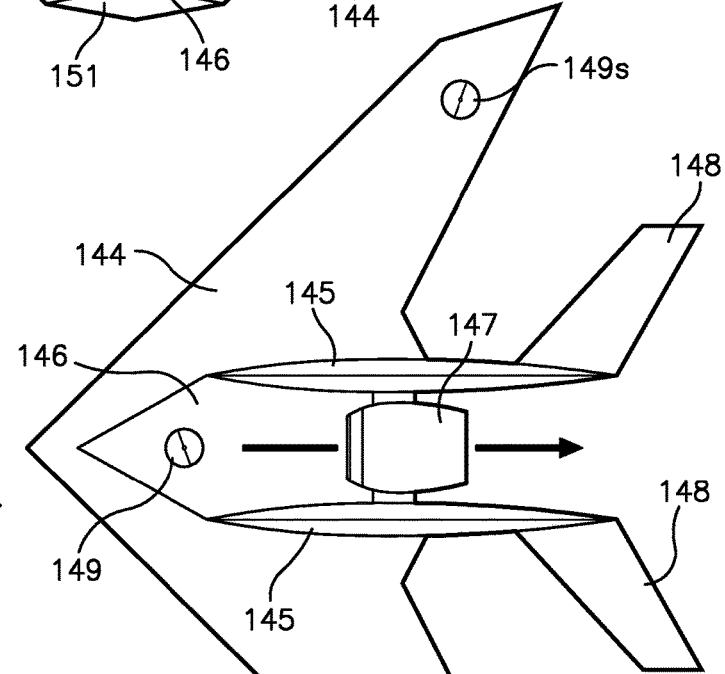
FIG. 16a is a planform view of a VTOL aircraft with a single ducted fan tilted in the Stage 2 position as well as attitude control thrusters.

In another aspect, the ducted fan system 200 may be integrated as described herein above into a single ducted fan VTOL aircraft. FIG. 16a is a planform view of a single tilt ducted fan VTOL aircraft in Stage 2 and Stage 3 position. In this aspect, the aircraft may include a wing 144, twin support pylons 145, air intake passage 146, tilt ducted fan 147, aft aircraft attitude control thrusters 149p and 149s, and a split V-tail assembly 148. FIG. 16b is a frontal view of the single tilt ducted fan VTOL aircraft in Stage 2 and Stage 3 position, showing the main wings 144, twin support pylons 145, air intake passage 146, ducted fan 147, front attitude control thruster (concealed) 149, wing embedded attitude control thrusters 149p, and 149s, and split-V tail assembly 148. The split-V tail may be an extension of the support pylons and may provide an unobstructed zone for the exhaust stream of the tilt duct fan in all Stage positions.

Figure 16C:
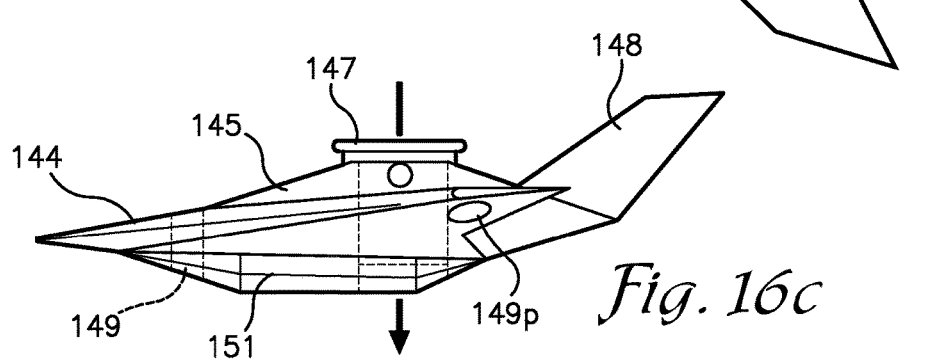
FIG. 16c is a side view of the VTOL aircraft illustrated in FIG. 16a showing the main wing, empennage, vertically tilted duct fan, and attitude control thrusters.

FIG. 16c is a side elevation of a single tilt duct fan VTOL aircraft in Stage 1 position, showing the main wing 144, twin support pylons 145, ducted fan 147, tilted vertically, split-V tail assembly 148, front attitude control thruster 149, wing embedded attitude control thruster 149s and modified fuselage 151.

G. DETAILED DESCRIPTION OF DRAWINGS

FIG. 1a shows a generic ducted fan design, generating a thrust 1a and an inflow field of air 1b, over and through the bellmouth 1c. As the flow goes through the bellmouth it is accelerated. This in turn changes the pressure distribution over the bellmouth of radius 1d as the flow goes from static ambient pressure to lower pressures on the inside. The quiescent static pressure on the outside of the duct 1e remains constant in low speed and/or hovering flight.

FIG. 1b shows air flow through the bellmouth 1c passing by the motors 1f, front and rear impellers 1g, and front and rear stators 1h. The area at the lip of the adjustable size inlet duct 1i is relatively large while at the cross sectional area at the ducted fan exit 1j becomes significantly smaller. If the radius 1e of the bellmouth is large and accordingly the inlet area 1i is large, then the thrust will be relatively large compared to a duct with a smaller bellmouth.

FIG. 2a is cutaway perspective of the present disclosure showing major components of a ducted fan integrated with an adjustable size inlet system 212 and exterior bypass ducts in Stage 1 position. The system is activated by the magnetic push/pull tubular solenoid 3, in the equipment bay 2 pulling on the actuating arm 31, forming a much larger bellmouth radius 1c, and duct inlet area 1i, that accelerates airflow through the duct and into the dual contra-rotating impeller blades 1g, turned by the motors 1f, stators 1h, to the ducted fan exit 1j. In Stage 1 position the radius 1d is large and accordingly, the duct inlet 1i is large, so that the thrust will be relatively large with respect to a duct with a smaller bellmouth. The duct inlet petal array 4 and duct inlet lip 4a are shown in Stage 1 position. Duct sidewall extenders 37 (see FIG. 5a) are lowered to conform to the radius 1d of the bellmouth and provide space in the equipment bay for the expanded duct inlet lip 4a, and inlet petal array 4. Stage 1 position provides optimal thrust for vertical ascent/descent, low speed, hover and loiter.

Referring to FIG. 2a, an upper equipment bay floor 6 and an equipment bay sliding door 5 that has been slightly lowered to provide space into which the larger bellmouth radius 1d expands during operation in the Stage 1 position. An annular electric motor 7, and impeller blades 7a are not activated in Stage 1 but are activated in optional Stage 1X and Stage 3. A nacelle perimeter compartment 8 contains equipment for operation (see FIGS. 12a, 12b, 12c) of the equipment bay sliding doors 5, and exterior bypass sliding doors 12, partially lowered in Stage 1. The annual electric motor 7, impeller blades 7a, and lower equipment bay duct 2b, are not deployed in Stage 1. Shown is an exterior bypass duct sliding door 12 (closed). Not deployed in Stage 1 are the exterior bypass upper ducts 13a, exterior bypass lower duct 13b, and lower duct area operable outlet louver 16. The ducted fan wall 22 is shown. As an option to Stage 1 position, Stage 1X position (FIG. 7) can be activated whereby the annular electric motor 7a is activated; and sliding doors 5/12, equipment bay operable outlet louvers 9, and lower duct area operable outlet louvers 16 are opened, providing supplementary 1X thrust to that of the ducted fan Stage 1 thrust.

FIG. 2b is a top view of the adjustable size inlet system 212 in Stage 1 position showing ducted fan motors 1f, dual contra-rotating impeller blades 1g, stators 1h, a ducted fan wall 22. A petal array 4 forming the surface of the bellmouth, adjustable size inlet 4a, exterior bypass duct sliding doors 12, and equipment bay sliding doors 5 (closed) are shown in Stage 1 position.

FIG. 2c is a side elevation of the ducted fan in Stage 1 position tilted horizontally for optional take-off and low speed forward flight with the adjustable size inlet lip 4a, forming a fully expanded bellmouth. Exterior bypass duct sliding doors 12 are in raised (closed) position as are the equipment bay sliding doors 5. Lower duct area operable outlet louvers 16 and equipment bay operable outlet louvers 9, are shown (closed) in Stage 1 position.

FIG. 2d is a cross section of the ducted fan in Stage 1 position as shown in FIG. 2a tilted horizontally for optional conventional forward take-off and landing, and low speed forward flight.

FIG. 3a is a cutaway perspective of the present disclosure showing components of a ducted fan integrated with an adjustable size inlet system 212 in Stage 2 position. The system is activated by the magnetic pull/push tubular solenoid 3 pushing the actuating arm 31, into full extension to form a smaller bellmouth radius 1d, and duct inlet area 1i, optimal for high speed forward flight allowed by less profile drag. Airflow accelerates through the duct and dual contra-rotating impellers blades 1g, exiting at the ducted fan exit 1j. Exterior bypass sliding doors 12, and equipment bay sliding doors 5, are fully raised (closed). Shown are a significantly smaller inlet area 1c, duct petal array 4 and adjustable size inlet lip 4a. The propulsion components consist of contra-rotating impeller blades 1g, stators 1h, and motors 1f, that have stators affixed to the wall of the ducted fan. The Stage 2 position provides optimal thrust for high speed forward flight. Annular electric motor 7, impeller blades 7a, equipment bay operable outlet louvers 9, and lower duct area operable outlet louvers 16 are not activated in Stage 2 position but are utilized in Stage 3 position, and described in FIG. 4a.

FIG. 3b is a front view of the adjustable size inlet system 212 in Stage 2 position with the same components as FIG. 2b. The components that have changed shape or position are the adjustable size inlet lip 4a with a significantly smaller inlet area, reducing the total profile drag of the duct in forward flight. The nacelle equipment bay sliding doors 5 and the exterior bypass duct sliding doors 12 have been fully raised (closed) from their Stage 1 position partially raised (closed) position.

FIG. 3c is a side elevation of the ducted fan in Stage 2 position tilted horizontally for forward flight with the same components as FIG. 2c. The components that have changed shape or position from FIG. 2c are the adjustable size inlet lip 4a that has a significantly reduced inlet area, the equipment bay sliding doors 5 fully raised (closed) and exterior bypass duct sliding doors 12 fully raised (closed). Lower duct area operable outlet louvers 16, and equipment bay operable outlet louvers 9, are closed.

FIG. 3d is a cross section of the ducted fan in Stage 2 position as shown in FIG. 3a, tilted horizontally for conventional take-off and landing, and high speed forward flight.

FIG. 4a is a cutaway perspective of the present disclosure in Stage 3 position showing a ducted fan integrated with exterior bypass ducts 13 and an annular electric motor 7 with a plurality of impeller blades 7a. Stage 3 is activated by the sliding doors operating assembly 35 located in the nacelle perimeter compartment 8. Exterior bypass duct doors 12, are lowered to allow ram to enter the exterior bypass duct 13a through the high rpm of the annular electric motor impellers 7a, exiting through the exterior bypass lower duct 13b, lower duct area operable outlet louvers 16, and the equipment bay operable outlet louvers 9. Equipment bays do not have ducted air inlets but obtain free air intake from the adjacent exterior bypass duct 13a.

In Stage 3 position the adjustable size inlet lip 4a and petal array 4 are in the same position as described in FIG. 3a. The exterior bypass duct system, with an annular electric motor 7 and impeller blades 7a, is separately powered, serving as an independent thrust provider for supplementary thrust in Stage 3. This system has the ability to serve as a supplementary stand-alone thrust unit when the main power source of the ducted fan motors is off.

FIG. 4b is a top view of the ducted fan with an adjustable size inlet system 212 in Stage 3 position. The components are the same are those of FIG. 3b. Components that have changed position from that shown on FIG. 3b described here are the equipment bay sliding doors (closed) 5, the exterior bypass duct sliding doors 12 lowered (opened), exposing the exterior bypass duct 13 that ingests ram-air into the exterior bypass duct 13a.

FIG. 4c is a side elevation of the ducted fan in Stage 3 position tilted horizontally for forward flight with the same components as FIG. 3c. Components that have changed shape or position from FIG. 3c are the exterior bypass duct sliding doors 12 fully lowered (opened), to ingest ram-air into the exterior upper bypass duct 13a into the high rpm impeller blades 7a, exiting through the lower duct area operable outlet louvers 16 and equipment bay operable outlet louvers 9, providing significant additional thrust to that of the ducted fan. Equipment bays do not have duct air inlets but obtain free air inflow from the adjacent exterior bypass duct 13a.

FIG. 4d is a cross section of the ducted fan in Stage 3, as shown in FIG. 4a, tilted horizontally for very high forward speed, Stage 3 position. In addition to providing additional thrust in forward flight, the exterior bypass duct system can provide supplementary thrust at take-off, resulting in less aircraft ground roll, less distance to aircraft rotation, and less time to reach chosen altitude. A further additional option is to utilize the additional thrust provided by the exterior bypass ducts to increase pay load for a particular mission requirement.

FIG. 5a is a vertical cross-section (see FIG. 2d) of the present disclosure through an equipment bay with the actuating arm 31 of the adjustable size inlet system 212, the adjustable size inlet lip 4a and the petal array 4 pulled into Stage 1 position by the magnetic pull/push tubular locking solenoid 3 on a structural support 6. Alignment tabs 112 affixed to the back surface of inlet petals stabilize the petal array 4 in all three stage positions. A perimeter control rod 32 that controls the expansion and contraction movements of the adjustable size inlet system 212 as it moves through all three Stage positions is attached to the actuating arm 31 where it joins the solenoid 3 arm. A locking device 33 is affixed to the top of the actuating arm. A locking arm 33a, locks onto the top of the equipment bay sliding duct door 5. The equipment bay sliding door operating assembly 35, located in the adjacent nacelle perimeter compartment 8, provides a coordinated dual locking system. The moveable sidewall extender 37 (lowered) is placed in position by the duct extender operating assembly 41 to provide space in the equipment bay as the adjustable size inlet lip 4a and petal array 4 expand into bellmouth 1c configuration while in Stage 1 position. The fixed sidewall 34 has a slot through which the sidewall extender 37 moves during changing positions (see FIGS. 6a and 6b). Not activated in Stage 1 are the annular electric motor 7, impeller blades 7a, equipment bay operable outlet louvers 9, and airflow vane 9a.

FIG. 5b is a vertical cross-section (see FIG. 3d) through an equipment bay 2 with the actuating arm 31 duct petal array 4, duct inlet lip 4a, of the adjustable size inlet system 212 pushed into Stage 2 position by the magnetic pull/push tubular locking solenoid 3. The equipment bay sliding door 5 is raised by the sliding door operating assembly 35 housed in the nacelle perimeter compartment 8 and locked in place by locking devices 33 and 33a. The duct sidewall extenders 37 are raised by the sidewall extender operating assembly 41 to serve as airtight sidewalls separating the equipment bays from the exterior bypass duct bays. The annular electric motor 7, motor impeller blades 7a, airflow vane 9a, and equipment bay operable outlet louvers 9, are not activated in Stage 2 position. A fixed sidewall 34, and alignment tabs 112, are shown.

FIG. 5c is a vertical cross-section (see FIG. 4d) through an exterior bypass duct 13a, and 13b enclosed by the duct inlet petal array 4, with alignment tabs 112, duct inlet lip 4a, and nacelle perimeter compartment 8. Stage 3 is activated by the actuating arm 31 pushed into Stage 3 position by the operation of the magnetic pull/push locking tubular solenoid 3, located in each of the adjacent equipment bays 2 and the perimeter control rods 32. An embedded annular electric motor 7, with impeller blades 7a is activated, passing air through the exterior bypass duct 13b, exiting through the lower duct area operable outlet louvers 16. The locking device 33 affixed to the top of the actuating arm 31 is retracted. A rigid duct section 42 affixed to the back of the actuating arm 31 forms an aerodynamic shape for the exterior bypass duct inlet back wall 39. Duct sidewall extenders 37, of adjacent equipment bays 2, form sidewalls of the exterior bypass duct 13a. The equipment bays do not have air inlets but obtain free airflow from the adjacent exterior bypass ducts 13a with an airflow vane 9a that create additional thrust to that of the main ducted fan in Stage 3 position.

FIG. 6a is a partial frontal view (see FIG. 2b) of a duct sidewall extender 37 lowered in an equipment bay in Stage 1 position to accommodate the expanded bellmouth profile of the petal array 4. The duct sidewall extender has a duct wall core 37b affixed to the floor 6, with a moveable outer ply 37f and a moveable inner ply 37a on each side of the duct wall core 37b. When activated, the two moveable plies 37a/37f of the duct sidewall extender 37 are extended upward for Stage 2 or Stage 3 position, or lowered into the equipment bay to provide space for the expanded bellmouth in Stage 1 position. Operating assembly 41 components include an electric motor 38 (shown with dashed lines) in front of the duct sidewall extender with shaft-mounted pulley wheel 44, belt 45, upper pulley wheel with a gear toothed rim 46 with its axle attached to the fixed duct wall extender core 37b, moving through the slot 37c, of the duct wall extender inner ply 37a, and a gear strip 47 affixed to the moving inner ply 37a of the sidewall extender 37. A gear-toothed rim 46 and gear strip 47 are affixed to the inner side of the moving inner ply 37a, further described in FIG. 6b. A locking device 48 is employed to lock in place the duct wall extender as required.

FIG. 6b is a frontal view (see FIG. 3b) of Stage 2 of the adjustable size inlet 4a defined by the adjustable size inlet lip 4b enclosed by the duct petal array 4, as well as the equipment bay sliding door 5. Sidewall extenders 37 serve as a seal between the equipment bay and the exterior bypass ducts and are comprised of a moveable inner ply 37a and outer ply 37f on each side of the non-moving duct wall extender core 37b, affixed to the bay floor, and a vertical slot 37c, in the moveable inner ply 37a. The duct extender operating assembly system 41 is activated by an electric motor 38, turning the shaft mounted pulley wheel 44, belt 45, upper pulley wheel with a gear toothed rim 46, meshing with a gear strip 46 affixed to the inner ply 37a. The axle is affixed to the duct wall extender core 37b on bearings at the non-moving duct wall extender core 37b. A locking device 48 is employed to lock in place the duct sidewall extender as required. This assembly provides vertical movement of the duct extender moveable plies 37a/37f.

FIG. 7 is a vertical cross-section through an exterior bypass duct showing the adjustable size inlet system 212 in Stage 1X, an optional feature of Stage 1 position. In Stage 1X position the adjustable size inlet 4a is in Stage 1 position, conforming to the bellmouth profile, and in so doing slightly reduces the intake area of the exterior bypass duct, resulting in slightly less thrust from the exterior bypass duct than when in Stage 3. The system is deployed by activating the sliding door operating assembly 35, allowing the exterior bypass sliding doors 12, to lower (open) bringing ram air into the upper exterior bypass duct 13a, and the annular electric motors 7, impeller blades 7a, creating thrust. Lower duct area operable outlet louvers 16, and equipment bays 9, are opened. Equipment bays do not have duct air inlets but obtain free airflow from the exterior bypass ducts 13a. The wall enclosures of the exterior bypass duct are formed by the duct sidewall extender 37, duct wall moveable section 42, duct wall fixed section 39, and flexible seal 39a. An exterior bypass duct intake adjustable profile nose 55 is shown for Stage 1X and Stage 3 (see FIG. 12a for nose in Stage 1 and Stage 2). Since the ducted fan produces thrust sufficient for all three Stage positions, the present disclosure offers Stage 1X position as an option for situations where even more thrust is needed for heavier payloads or when higher speed in Stage 1 position in horizontal flight is required.

FIG. 8a is a vertical cross-section of a fuselage and a ducted fan in Stage 1 position. The twin ducted fan fuselage 57 encloses a tilting mechanism consisting of a ring connector 64 and structural support 58, a structural carry-thru spine 59, a main gear box 61, gearmotors 62 that drive tilting gear rings 63 for tilting requirements of the mechanism and a main connector ring 64 joining the fuselage to the ducted fan. The structural carry-thru spine also serves as a conduit for power and control lines between the ducted fan and fuselage.

The ducted fan with a petal array 4, adjustable size inlet lip 4a, and equipment bays 2 contain components of the adjustable size inlet system 212 that increase the radius 1d, and inlet area 1i, of the bellmouth 1c. The nacelle perimeter compartment 8 contains the operating assembly 35 of the sliding doors 5, and 12. Not activated for Stage 1 are the separately powered annular electric motor 7 and equipment bay operable outlet louvers 9. These components can be activated for Stage 1X position (per FIG. 7). The non-linear profile of the ducted fan wall 22 and 22a conforms to the different lengths of the contra-rotating impeller blades 1g and stators 1h. The front blade section of the ducted fan air induction system has shorter impeller blades than the rear blade section that has longer blades turning at higher rpm than the front section impeller blades. This design generates a greater net thrust than that of a duct wall with a linear, constant diameter wall. The ducted fan wall is shaped so the duct wall profile 22, and 22a, and outlet area 1j itself, generates an additional net upward thrust.

FIG. 8b is a horizontal partial cross-section in Stage 1 through the ducted fan tilting mechanism and ducted fan lower area. The ducted fan tilting mechanism is embedded in a fuselage 57, showing structural support 58, structural carry-thru spine 59, main gear box 61, tilting gear ring 63, and main connector ring 64 connecting the fuselage and ducted fan structure. Across section of the lower portion of the ducted fan shows alternating equipment bays 2 and exterior bypass duct bays 13, stators 1h, and ducted fan motors 1f.

FIG. 8c is a partial horizontal cross-section through the ducted fan showing alternating equipment bays 2 bypass duct bays 13, an actuating magnetic pull/push type tubular locking solenoid 3, annular electric motor impeller blades 7a, ducted fan stators 1h, ducted fan impeller blades 1g, and a nacelle perimeter compartment 8 containing the nacelle sliding duct door operating assembly 35.

FIG. 8d is a cross-section diagram of a propulsion unit in four sections. The first section 65 comprises a nose cone 65a, a contra-rotating impeller hub 65b, with an embedded front set of impeller blades 1g, and a half shaft from the contra-rotating gear box 65c. The second section 66 comprises a contra-rotating gear box 66a and front stators 1h affixed to the ducted fan wall, driven by a thru-driveshaft 67b, from the motors 1f. The contra-rotating gear box 66a drives both sets of impellers. The third section 67 comprises an impeller hub 67a, with an embedded rear set of impeller blades 1g, and a thru-drive axle 67b, from the motors 1f, below. The fourth section 68 comprises a casing that houses the motors 1f, a thru-driveshaft 67b, turning both sets of impellers, and rear stators 1h. Optional propulsion units such as gas turbines can be used. A properly-sized single motor can be employed.

FIG. 9a is a partial top view (see FIG. 11b) of a ducted fan equipment bay and adjustable size inlet lip 4a in Stage 1 position. Shown are the tubular solenoid 3, duct sidewall extender 37, structural sidewall 34, nacelle sliding surface 83, and equipment bay sliding door 5 with equipment bay sliding door leading edge 5a. Shown are adjacent exterior bypass duct doors 12, leading edges 12a, and equipment bay sliding door gearbar extension support bracket 99a.

FIG. 9b is a partial top view (see FIG. 11a) of a ducted fan and adjustable size inlet lip 4a, an exterior bypass duct door 12 with leading edge 12a in Stage 2 position. An adjacent equipment bay sliding door 5 and leading edge 5a are closed, revealing the nacelle sliding surface 83.

FIG. 9c is a partial top view (see FIG. 11a) of a ducted fan and adjustable size inlet lip 4a open in Stage 3 position. Shown are the equipment bay sliding door 5, exterior bypass duct sliding door 12, lowered (open) and leading edge 12a, duct sidewall extender moveable section 37, duct sidewall extender fixed section 34, nacelle sliding surface 83, surface of bypass duct 39 below, and annular electric motor impeller blades 7a.

FIG. 9d is a cross-section (see FIG. 9a) through an equipment bay in Stage 1 showing an equipment bay sliding door 5 with projecting edges 5b, on the nacelle sliding surface 83 with an embedded equipment bay sliding door linear gearbar 99b, and linear gearbar extension support 99a, support brackets 76 and fixed (non-moving) section of the equipment bay duct walls 34. The equipment bay door 5 with projecting edges 5b move over the sliding surface 83 to engage the duct sidewall extender top track engagement grooves 73. One side of the assembly shows the adjacent exterior bypass door 12, bypass door interlocking edges 74 and 74a engaged with the fixed sidewall 34, top track 72, while the other side abuts an open exterior bypass duct. When the sliding equipment bay door 5 is in the lowered Stage 1 position, the sliding door 5 slides on the nacelle sliding surface 83. When the sliding equipment bay door 5 is raised in the Stage 2 position, the gearbar 99b travels within the supporting gearbar support extension 99a braced by brackets 76 which guide the projecting edges 5b of the sliding equipment bay door 5 into the corresponding engagement grooves 73 thereby providing support of the lateral edges of the sliding equipment bay door 5 as it moves over the exposed equipment bay 2 throughout the transition from the lowered position to the raised position.

FIG. 9e is a Stage 2 position cross-section (see FIG. 9b) through an exterior bypass duct sliding door 12 (closed), with an embedded gear-toothed bar 99, and interlocking edges 74 engaged with the duct (moveable section) sidewall extender top tracks 37e. Projecting edges 5b of the equipment bay door 5 are engaged with sidewall extender top track 37e. Other duct sidewall extender materials shown are moveable plies 37a/37f and fixed structural core 37b.

FIG. 9f is a cross-section (see FIG. 9c) through an exterior bypass duct 13 and adjacent equipment bays 2 in Stage 3. The exterior bypass duct sliding door is open and not visible in this cross-section. The projecting edges 5b of the adjacent equipment bay sliding door is engaged with the top track rail 37e, of the sidewall extenders.

FIG. 10a shows the separately powered annular electric motor and impellers providing supplementary thrust to that of the main ducted fan, shown in Stage 3 position. It can also optionally be deployed in Stage 1X position (see FIG. 7). Shown is a vertical cross-section (see FIG. 5c) through an exterior bypass duct fan wall 22, lower bypass duct 13b, duct structure 6, and a nacelle perimeter compartment wall 8a. Components shown are an electro-magnetic stator 88 affixed to the ducted fan wall, an upper stator ring 89a, a lower stator ring 89b, and a rotor 7 with a plurality of affixed impeller blades 7a. The rotor is suspended on air/magnetic bearings between the upper 91a and lower 91b, stator rings providing frictionless high speed rotation. The stator rings are provided with electric-powered magnetic induction elements 92 that drive the rotor into high speed rotation. A drive actuator component 93 is provided, that couples the magnetic induction elements in the stator rings and electric drive controls to the rotor.

FIG. 10b a horizontal cross-section of the annular electric motor shows a ducted fan wall 22 in which a stator section 88, is affixed to the ducted fan wall, a nacelle perimeter compartment wall 8a, and an exterior bypass duct 13b. Other components shown are a lower stator ring 89b, rotor 7 with a plurality of blades 7a, electric-powered magnetic induction elements 92, and drive actuator components 93.

FIG. 11a is partial horizontal cross-section (see FIG. 2d) through an exterior bypass duct 13 and an equipment bay 2, each shown with a section of the nacelle perimeter compartment 8, and sliding duct doors operating assembly 35, in Stage 1 position. The adjustable size inlet lip 4 forming a duct wall of the ducted fan 22 and ducted fan impeller blades 1g are shown. The annular electric motor 7 and impeller blades 7a are not activated in Stage 1. The exterior bypass duct is enclosed by the sidewall duct extenders 37, the fixed structural walls 34, the wall of the nacelle perimeter compartment 8a, and duct surface 39. Other components in the exterior bypass duct 13 indicated by dashed lines are the overhead perimeter control rod 32, and control rod joining box 32a (see FIGS. 11c and 11d) operated by the actuating arm 31. An equipment bay floor 6 and a motor and gear box operating assembly 41 are shown. The equipment bay portion 2 of the horizontal cross-section is enclosed by the fixed structural walls 34, sidewall extenders 37, the wall of the nacelle perimeter compartment 8a, and the ducted fan wall 22. The magnetic push/pull tubular solenoid 3 and the actuating arm 31 are shown. The left section of the door motor 102 activates the lower left operating gearframe 97 directly, while the right section of the motor turns the lower right operating gearframe 97a via a gear box 102a. The lower left pulley wheel 98 and belt 98b turn the upper left pulley wheel 98a (FIG. 11b). The lower right control box axle 98e turns the lower right pulley wheel 98d and belt 98f which turns the upper right pulley wheel 98a and belt 98b. The left hand operating gearframe 97 serves the exterior bypass duct sliding doors 12, the right hand operating gearframe 97a serves the equipment bay sliding doors 5.

FIG. 11b is a horizontal cross-section (see FIG. 2d) in Stage 2 position through an exterior bypass duct 13, an equipment bay 2, and portion of the adjoining nacelle perimeter compartment 8. The exterior bypass duct portion of the cross-section shows an exterior bypass duct 13, ducted fan impeller blade 1g, sidewall extenders 37, a fixed sidewall structure 34, impeller blade 7a and a portion of wall 8a, of the nacelle perimeter compartment 8. The equipment bay 2 portion of the of the partial cross-section shows the floor of the equipment bay 6, electric magnetic pull/push type tubular solenoid 3, motor and gear box operating assembly 41 of the duct sidewall extenders 37, and fixed structural duct sidewalls 34. A perimeter control rod 32 and control rod joining boxes 32a are indicated by overhead dashed lines (see FIGS. 11c and 11d). A portion of the horizontal cross-section shows the nacelle perimeter compartment 8 and operating gearframe 97 for the equipment bay and exterior bypass duct sliding doors. The operating gearframe 97 and upper pulley wheel axle and belt 98a turn the drive wheel 101 that meshes with the linear gearbar 99, moving the sliding door in up/down movements as commanded.

FIG. 11c is a horizontal cross-section diagram (see FIG. 11a) through a joining box 32a of the perimeter control rods with threaded ends 32 in continuous segments around the perimeter of the adjustable size inlet system 212. The diagram illustrates how the electric motor 32b and gear system 32c power the turning of the threaded ends of the control rods 32g, that reduces or increases the circumference around the adjustable size inlet 4a in coordination with the magnetic push/pull tubular solenoid 3 and supporting actuating arm 31 in each equipment bay performing its related task as the system moves from Stage 1 position to Stage 2 or Stage 3 position. The joining boxes control authority is secondary to that of the adjustable size inlet solenoid 3 and actuating arm 31. Expansion and contraction stops 32d and bearings 32e limit the linear movement of the control rods. The joining box is shown in Stage 1 position that requires the greatest amount of total circumferential expansion since the adjustable size inlet 4a is in its largest bellmouth configuration.

FIG. 11d is a horizontal cross-section diagram (see FIG. 11b) through the joining box 32a when in Stage 2 and Stage 3 position. In these two Stages the adjustable size inlet 4a is in its least perimeter circumference. The control rods threaded ends 32g have moved to this position by the coordinated activation of the adjustable size inlet actuating arms 31 joining box motor 32b and control rods threaded ends 32g. This assembly provides support and alignment to the adjustable size inlet lip 4a and ducted fan petal array 4.

FIG. 12a is a vertical cross-section (see FIG. 5c) through a nacelle perimeter compartment 8 containing the operating equipment and operating gearframe units 97/97a for the exterior bypass duct sliding doors 12 and equipment bay sliding doors 5. Each sliding exterior bypass duct door 12 and sliding equipment bay door 5 are served by separate lower and upper operating gearframe units 97/97a (see FIGS. 11a and 11 *b*). Shown is the wall of the nacelle perimeter compartment 8, an operating gearframe unit 97, an electric door motor 102 with an axle 98h, a left lower pulley wheel 98, and a left belt 98b. The upper portion of the perimeter compartment shows the operating gearframe unit 97 and left upper pulley wheel 98a, that turns an axle to the drive wheel 101. An exterior bypass duct door 12 and nose 55 of the nacelle perimeter compartment is shown for Stage 2 position and nose 56 in a hinged back location for Stage 1 position.

FIG. 12b is a horizontal cross-section through the lower left hand operating unit supported by an operating gearframe unit 97 and comprised of an electric door motor 102 with an axle 98h turning the lower left pulley wheel 98 and belt 98b that turns the left upper pulley wheel 98a. The linear gearbar 99 with gear teeth 99c meshes with the drive wheel, above.

FIG. 12c is a horizontal cross-section through the left gearframe operating unit 97 that includes an upper pulley wheel 98a and axle 101b turned by the lower left pulley 98 and a drive wheel 101 affixed to the axle 101b, meshing with the gear teeth 99c of the linear gearbar 99 embedded in the exterior bypass duct sliding door 12, thereby providing control of raising/lowering the exterior bypass duct sliding door 12.

FIG. 13a is a partial projected front elevation (as seem from inside of the ducted fan) of an adjustable size inlet system 212 in Stage 1 or Stage 1X position. Shown are type A inlet petals 103 with transitions slits 103a and type B inlet petals 104. The upper sections of the petals 103u/104u, above transition slits are slightly curved horizontally to conform to the circumference of the adjustable size inlet system 212 while the lower sections of the petals 103l/104l, below the transition slits curve only vertically to form the ducted fan bellmouth 1c. In the upper petal sections above the transition slit 103a, type A petals partially enclose the type B petals (type B are inside the type A petals) while the lower petal sections below the transition slit overlap with a repeating A, B, A, B, etc. pattern. Dashed lines indicate the concealed back edges 103b of type A petals and concealed edges 104b, of type B petals. Bases of both type petals are affixed to the top edge 109c of the ducted fan wall 22.

FIG. 13b is a partial projected back elevation of an adjustable size inlet system 212 in Stage 1 or Stage 1X position. In the petal sections above the transition slits 103a type A petals partially enclose type B petals while the lower petal sections below the transition slits 103a overlap in a repeating A, B, A, B, etc., pattern. Alignment tabs 112 affixed to the back surface of the petals keep the vertical edge of each adjoining petal in proper fit and alignment with adjacent petals system changes Stage positions. The bases of both type petals are secured to the top edge 109c of the ducted fan wall 22.

FIG. 13c is a horizontal cross-section of the adjustable size inlet lip 4a in Stage 1 position showing how type A petals 103, type B petals 104, and other inlet lip structural components, and their expansion and contraction abilities accommodate the requirements of the adjustable size inlet system 212 as it changes positions. Inlet lip components are the outer structural tubes 113, inner structural tube 114, and structural hub and tube unit 115. Alignment pins 117, with petal slots 104b, outer slots 113b, inner slots 114d, and hub slots 115b, limit lateral perimeter expansion and contraction movements of inlet lip structural components.

FIG. 13d is a vertical cross-section of an adjustable size inlet lip 4a (see FIG. 5a) in Stage 1 position showing type B petals 104, inlet lip components and an actuating arm 31 that has been pulled into the full bellmouth configuration by the magnetic pull/push tubular solenoid 3 in the equipment bay (FIG. 5a). A locking device 33 with a locking arm 33a is attached to an actuator arm 31 and locks onto to a locking pin 5p affixed to an equipment bay sliding door 5. The equipment bay sliding door 5 with a variable throw leading edge 5a provides a tight fit to the compressible material 121 and the transition section 119 of the inlet lip assembly. A section of the duct 42 affixed to the actuating arm 31 is also shown in FIG. 7.

Figure 13E:
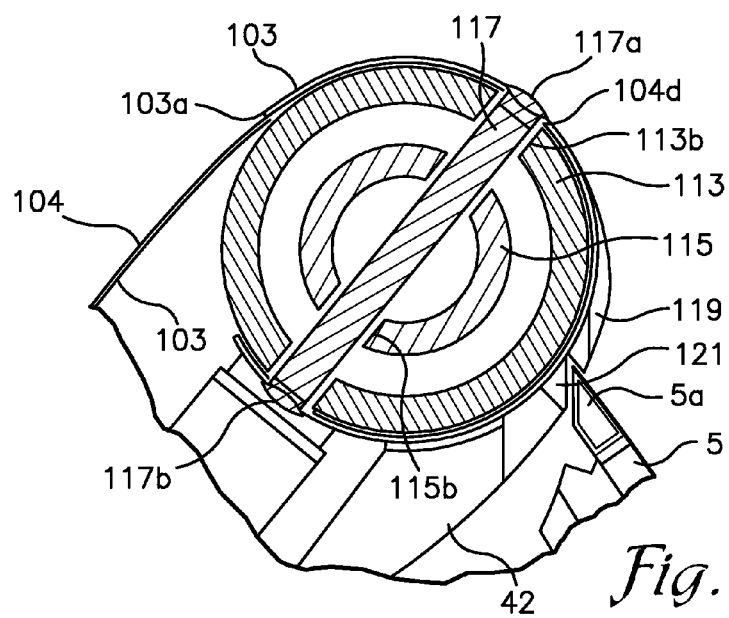
FIG. 13e is an enlarged vertical cross-sectional view of the adjustable size inlet taken at 13e-13e of FIG. 13c in the Stage 1 position showing the type B petals enclosing the inlet lip structural components.

FIG. 13e is a second vertical cross-section of an adjustable size inlet lip 4a (see FIG. 13c) in Stage 1 position showing type A petals 103 and type B petals 104. The bypass duct sliding door 12 with a variable throw leading edge 12a provides a secure tight fit to the compressible material 121 and the transition section 119 of the inlet assembly. A wall section of the duct 43 affixed to the actuating arm 31 is shown.

Components of the inlet lip structure 4a may include: an outer structural tube 113; an inner structural tube 114 (not visible in this cross-section); a structural hub and tube units 115; and alignment pin 117 with alignment pin fixation points 117A and 117B within petal slot 104d, outer slot 113b, inner slot 114b (not visible in this cross-section), and hub slot 115b that limit the lateral expansion and contraction of the inlet lip components. The incremental movements of the circumferential assembly provides for and controls the desired inlet profile changes of the adjustable size inlet system 212.

FIG. 14a is a partial projected front elevation of an adjustable size inlet lip 4a in Stage 2 or Stage 3 position showing alternating type A petals 103 with transition slits 103a and type B lower petals 104l. In the upper petal sections above the transition slit, type A petals 103u tightly abut and fully enclose type B petals 104u (concealed). In the lower petal sections below the transition slit type A petals 103l and lower type B 104l petal sections overlap in an A, B, A, B, etc. repeating pattern. The bases of both type petals are affixed to the top edge 109c of the ducted fan wall 22.

FIG. 14b is a partial projected back elevation of an adjustable size inlet system 212 in Stage 2 or Stage 3 position showing type A petals 103, upper sections of type A petals 103u, and transition slits 103a. Lower sections of type A petals 103l and type B petals 104l below the transition slits overlap in a repeating A, B, A, B, etc. pattern. Alignment tabs 112 affixed to the back surfaces of the petals keep the vertical edge of each petal in proper alignment with the vertical edge of each adjoining petal as the adjustable size inlet system 212 changes positions. The bases of both type petals are secured to the top edge 109c of the ducted fan wall 22.

FIG. 14c is a horizontal cross-section of the adjustable size inlet lip 4a in Stage 2 and Stage 3 position showing how type A petals 103 are tightly abutted and fully enclose by the upper sections 104u of the type B petals 104. Duct inlet lip structural components, and their controlled expansion and contraction ability accommodate the requirements of the adjustable size inlet system 212 as it changes Stage positions. Inlet lip structural components are the outer structural tubes 113, inner structural tubes 114, structural hub and tube units 115, and alignment pins 117, with petal slots 104d, outer slots 113b, inner slots 114b, and hub slots 115b, that control linear perimeter expansion and contraction movements of the inlet lip structural components as the adjustable size inlet system 212 moves into different positions.

FIG. 14d is a partial horizontal cross-section (see FIG. 14b) in Stage 2 or Stage 3 positions through a section of the duct inlet petals 103 and 104, below the transition slit. The overlapping type A 103 and type B 104 petals are shown with alignment tabs 112 affixed to the backs of each petal keeping the vertical edge of each petal in proper fit and alignment with the vertical edge of each adjoining petal.

FIG. 14e is partial horizontal cross-section (see FIG. 14b) through the bases of the inlet petals 104 and 103 in Stage 2 and Stage 3 position where they are affixed to the top edge 109c of the ducted fan wall 22. The overlapping type A and type B petals are mounted to wedge shaped formers 109a, keeping the inlet petals straight across their horizontal width while allowing the petals to curve vertically for adjustable size inlet bellmouth configurations. Anchor fittings 109b affix the inlet petals to the top edge 109c of the duct structural wall 22. The wedge-shaped formers 109a and anchor fittings 109b allow for fractional vertical movement by the petals bases when changing between Stage positions.

FIG. 14f is a vertical cross-section (see FIG. 5b) of an adjustable size inlet system 212 in Stage 2 position showing type A petals 103 with a transition slit 103a and type B petals 104. Above the transition slit type A petals 103u are tightly abutted and fully enclose type B petals. Below the transition slit the type A and type B petals alternate positions in an A, B, A, B, etc., pattern. Stage 2 position is activated by the actuating arm 31 pulled into the smaller duct inlet area configuration by the magnetic push/pull tubular solenoid 3 (see FIG. 5b). The adjustable size inlet 4a configuration shown allows the petal array 4 to smoothly accommodate the changing shapes and positions of the components in all three Stage positions. Inlet lip components shown are the outer structural tubes 113, inner structural tubes 114, structural hub and tube unit 115, solid hub 116, and alignment pins 117 with slots 118, that control lateral perimeter expansion and contraction movements of duct inlet lip structural components. An equipment bay sliding door 5 with a variable throw leading edge 12a is shown meeting the top of the inlet lip at a transition fillet 119. A compressible material 121 receives the exterior by-pas sliding door leading edge 12a, insuring a tight seal at the top of the inlet lip. An actuating arm 31 attached to the solid hub 116 of the lip has a locking device 33 and locking device arm 33a mounted to its surface. An equipment bay sliding door 5 is locked in place by the arm and claw 33a of the locking device and a locking pin 5p, affixed to the equipment bay sliding door 5. The locking device arm and claw locks the sliding door to the actuating arm in Stage 2 position and is shown retracted in Stage 3 position when the exterior bypass duct is open. Hinged doors 33b are affixed to the duct wall section 42.

FIG. 14g is a partial cross-section (see FIG. 5c) of an adjustable size inlet system 212 in Stage 3 showing type A 103 and type B 104 petals, as well as an actuating arm 31 supporting the inlet lip interior structural components, and a locking device 33. A locking device arm 33a is retracted and covered by hinged doors 33b, allowing the duct inlet lip 4a to maintain a smooth aerodynamic surface. A transition fillet 119 and compressible material 121 conforming to the lip profile, and a section of the exterior bypass duct 42 are shown. Structural lip components are the same as those shown in FIG. 14f.

FIG. 15a is a planform of a VTOL tilt ducted fan aircraft, shown in Stage 2 position, with two aft fuselage support arm mounted tilt duct fans and one forward fixed duct fan. The single forward ducted fan has the same large bellmouth inlet as in the two aft ducted fans and is enclosed in the forward fuselage in fixed vertical position for VTOL maneuvers and covered while in forward flight. See FIG. 15d, for the ram air inlet and the vectored thrust assembly deployed in forward flight. The twin tilt-duct fans contain the adjustable size inlet system (ASIS) 212, annular electric motor impellers and exterior bypass duct secondary propulsion system described in the present disclosure.

Components shown are the nose ram air inlet 125, fixed ducted fan 126, sliding cover 127, canard wing 128, forward aircraft attitude control thrusters 129p, and 129s, fuselage 131, main wings 132, aft aircraft attitude control thrusters 133p, and 133s, twin mounted ducted fans 135p, and 135s, support arms 134, stabilizer 136, and rudder 137. The aircraft attitude control thrusters operate as a separately powered system without the need to draw bleed air from any of the aircraft prime propulsion units and have an electric power supply adjacent to the thrusters, shown in FIGS. 15f and 15g. This system allows immediate response to control aircraft attitude in pitch, roll, yaw and horizontal movements. This Stage 2 position is employed for high speed forward flight and can achieve very high speed forward by transitioning to Stage 3 with the additional thrust provided by the annular electric motor impellers embodied in the exterior bypass ducts.

FIG. 15b is a side elevation of the illustrated VTOL twin tilting duct fan aircraft. Components shown are the nose ram air inlet 125, ducted fan sliding cover 127 (closed), canard wing 128, fuselage 131, main wing 132, aft aircraft attitude control thruster 133p, port ducted fan 135p, starboard ducted fan 135s, stabilizer 136, rudder 137, and bottom sliding ducted fan cover 139. An arrow symbol indicates the tilting movement possible.

FIG. 15c is a frontal view of the aircraft showing the ram air inlet 125, front aircraft attitude control thrusters 129p and 129s, fuselage 131, main wing 132, tilting ducted fan structural supports 134, ducted fan 135s and 135p, stabilizer 136, and rudder 137.

FIG. 15d is a partial nose cross-section of the aircraft in Stage 1 (VTOL) position through the ram air inlet 125 (closed), ducted fan 126, ducted fan sliding cover 127, ducted fan sliding exhaust cover 139, EO turret area 141, and optional propulsion unit system compartment 68a.

FIG. 15e is a partial nose cross-section of the aircraft with the nose ram air intake 125, open in Stage 2 and Stage 3 position while the sliding duct door cover 127 is closed. Ram air enters through the ram air intake 125, into the ducted fan and vectored aft by the inside shape of the lower sliding duct door cover 139, as forward thrust. A cockpit area 141, optional propulsion equipment compartment 68a, and cargo area 142 are shown.

FIG. 15f is a partial top view of the aircraft in Stage 1 position showing the front ducted fan 126, front ducted fan sliding duct cover 127, canard wing 128, front aircraft attitude control thruster 129p, and sliding door cover, power supply 129pe, front aircraft attitude control thruster 129s, and sliding door cover, power supply 129se, and fuselage 131. The front aircraft attitude control thrusters provide control for pitch, yaw, and roll movements.

FIG. 15g is a partial top view of a main wing section 132 showing a larger electric attitude control thruster 133s, with sliding doors retracted, revealing the control vanes of the thruster. Dashed lines indicate the location of the autonomous power supply 133se. Aft aircraft attitude control thrusters provide control for roll, yaw and pitch movements.

FIG. 15h is a partial top view showing twin ducted fans 135p and 135s tilted vertically in VTOL Stage 1 position. Shown are a portion of a fuselage 131, support arm 134, and rudder 137.

FIG. 15i is a partial side view of the aircraft with a ducted fan tilted vertically 135p, in VTOL Stage 1 position, fuselage 131, main wing 132, aft attitude control thruster 133p, and rudder 137. An arrow symbol indicates the range of duct tilting motion.

FIG. 16a is a planform of a single tilt ducted fan VTOL aircraft in Stage 2 and Stage 3 position, Components are the wing 144, twin support pylons 145, air intake passage 146, tilt ducted fan 147, aft aircraft attitude control thrusters 149p, and 149s, and split V-tail assembly 148.

FIG. 16b is a frontal view of a single tilt ducted fan VTOL aircraft in Stage 2 and Stage 3. Components are the main wings 144, twin support pylons 145, air intake passage 146, ducted fan 147, front attitude control thruster (concealed) 149, wing embedded attitude control thrusters 149p/149s, and split-V tail assembly 148. The split-V tail is an extension of the support pylons and provides an unobstructed zone for the exhaust stream of the tilt duct fan in all Stage positions.

FIG. 16c is a side elevation of a single tilt duct fan VTOL aircraft in Stage 1 position. Components are the main wing 144, twin support pylons 145, ducted fan 147, tilted vertically, split-V tail assembly 148, front attitude control thruster 149, wing embedded attitude control thruster 149s and modified fuselage 151.

It should be understood from the foregoing that, while particular embodiments have been illustrated and described, various modifications can be made thereto without departing from the spirit and scope of the disclosure as will be apparent to those skilled in the art. Such changes and modifications are within the scope and teachings of this disclosure as defined in the claims appended hereto.

What is claimed is:

1. An adjustable size inlet system for a fan duct containing a fan, the adjustable size inlet system comprising:
    a plurality of nested structural tubes forming a ring;
    a petal array comprising an interleaved plurality of petals arranged around a perimeter of the ring to define an adjustable size inlet lip, each petal comprising an upper portion curved over, and at least partially enclosing, at least a portion of the plurality of nested structural tubes; and
    a plurality of mechanical actuators to cause the plurality of nested structural tubes to move radially outward and inward, thereby causing an increase or a decrease of a circumference of the adjustable size inlet lip, wherein:
    the partially enclosed portions of the plurality of nested structural tubes cause corresponding upper portions of the plurality of petals to expand to form a bellmouth inlet profile when the plurality of mechanical actuators cause the circumference of the adjustable size inlet lip to increase; and
    the corresponding upper portions of the plurality of petals contract to form a cylindrical inlet profile when the plurality of mechanical actuators cause the circumference of the adjustable size inlet lip to decrease.

2. The adjustable size inlet system of claim 1, wherein the plurality of nested structural tubes are operatively coupled in a sliding arrangement, wherein:
    the plurality of nested structural tubes slide circumferentially outward to increase the circumference of the adjustable size inlet lip when the plurality of mechanical actuators move the plurality of nested structural tubes radially outward; and
    the plurality of nested structural tubes slide circumferentially inward to decrease the circumference of the adjustable size inlet lip when the plurality of mechanical actuators move the plurality of nested structural tubes radially inward.

3. The adjustable size inlet system of claim 1, wherein each petal of the plurality of petals further comprises a lower portion affixed to the edge of the fan duct, wherein each lower portion:
    forms a curved profile when the plurality of mechanical actuators moves the plurality of nested structural tubes radially outward; and
    forms a linear profile when the plurality of mechanical actuators moves the plurality of nested structural tubes radially inward.

4. The adjustable size inlet system of claim 3, wherein each petal of the petal array comprises a strip, the strip comprising the upper portion and the lower portion at opposite ends of the strip.

5. The adjustable size inlet system of claim 1, further comprising a plurality of structural hub and tube units operatively connected to the plurality of mechanical actuators, each structural hub and tube unit enclosed within one of the plurality of nested structural tubes, wherein the plurality of mechanical actuators each cause a corresponding structural hub and tube unit to move radially inward and outward to cause the plurality of nested structural tubes to move radially inward and outward, thereby contracting or expanding the circumference of the adjustable size inlet lip.

6. The adjustable size inlet system of claim 5, wherein at least a second portion of the plurality of nested structural tubes slide circumferentially apart or together when the plurality of mechanical actuators cause the structural hub and tube units to move radially inward and outward to cause the plurality of nested structural tubes to move radially inward and outward.

7. The adjustable size inlet system of claim 1, wherein each mechanical actuator of the plurality of mechanical actuators are located in equipment bays and comprise a piston arm attached to an actuator arm at an actuator pivot between an opposed first end and second end of the actuator arm, wherein:
    the first end of each actuator arm is operatively coupled to an end pivot entrained within a curved slot formed within a duct structural wall within the adjustable size inlet system; and
    the second end of each actuator arm is attached to one of a plurality of structural hub and tube units within one of the plurality of nested structural tubes.

8. The adjustable size inlet system of claim 7, wherein:
    the second end of each actuator arm causes the attached structural hub and tube unit to move radially outward and causes the end pivot to slide to a lower end of the curved slot when the piston arm is retracted;
    the second end of each actuator arm causes the attached structural hub and tube unit to move radially inward and causes the end pivot to slide to an upper end of the curved slot when the piston arm is extended.

9. The adjustable size inlet system of claim 8, wherein at least a second portion of the plurality of nested structural tubes slide circumferentially apart or together when the actuator arms cause the corresponding attached structural hub and tube units to move radially outward or inward, thereby expanding or contracting the circumference of the adjustable size inlet lip.

10. The adjustable size inlet system of claim 1, wherein the plurality of nested structural tubes comprises:
a plurality of outer structural tubes;
a plurality of inner structural tubes, each inner structural tube comprising opposed inner tube ends inserted within corresponding adjacent outer structural tubes; and
a plurality of structural hub and tube units, each structural hub and tube unit comprising a solid cylinder affixed within a structural hub tube, each structural hub tube comprising opposed hub tube ends inserted within corresponding adjacent inner structural tubes.

11. The adjustable size inlet system of claim 10, wherein the plurality of nested structural tubes further comprises a plurality of alignment pins, each end of each alignment pin affixed to one of a pair of pin fixation fittings formed within the upper portion of an outer petal from the plurality of petals, each outer petal comprising two pairs of pin fixation fittings, and each alignment pin extending through a plurality of slots formed within corresponding adjacent petals, adjacent outer structural tubes, adjacent inner structural tubes, and adjacent structural hub and tube units, wherein a range of the expansion and contraction of the circumference of the adjustable size inlet lip is limited by a mechanical interference between each alignment pin and at least one end of at least one corresponding slot.

12. The adjustable size inlet system of claim 1, further comprising a plurality of control rods arranged around a perimeter of the adjustable size inlet system to limit the expansion and contraction of the circumference of the adjustable size inlet lip.

13. The adjustable size inlet system of claim 1, further comprising a plurality of sliding doors comprising a plurality of exterior bypass duct doors and a plurality of equipment bay doors arranged in an alternating sequence around an outer perimeter of a nacelle containing the fan duct and adjacent to the plurality of interleaved petals, the plurality of sliding doors sliding to maintain a position adjacent to the plurality of interleaved petals throughout the expansion and contraction of the plurality of petals.

14. The adjustable size inlet system of claim 13, further comprising a plurality of sidewall extenders within the nacelle, each sidewall extender shortening and elongating to adjust a length of a sidewall within the nacelle formed by each sidewall extender, thereby accommodating the expansion and contraction of the plurality of interleaved petals.

15. The adjustable size inlet system of claim 14, wherein each exterior bypass duct door further comprises a pair of projecting ridges, the pair of projecting ridges projecting laterally from opposed lateral edges of the exterior bypass duct door along at least a portion of the lateral edge, wherein each projecting ridge slideably engages with a corresponding engagement groove formed within an adjacent sidewall extender forming at least a portion of an outer surface of the nacelle, thereby providing support of the lateral edges of the exterior bypass duct door throughout a range of sliding.

16. The adjustable size inlet system of claim 13, further comprising:
a plurality of exterior bypass ducts, each exterior bypass duct extending within the nacelle between an upper exterior bypass duct inlet and a lower duct area operable outlet louver, wherein both the upper exterior bypass duct inlet and the lower duct area operable outlet louver oven through an outer surface of the nacelle that is radially outside of the fan duct;
each exterior bypass duct door of the plurality of exterior bypass duct doors seal the upper exterior bypass duct inlet when the exterior bypass duct door is raised and to open the upper exterior bypass duct inlet when the exterior bypass duct door is lowered; and
a plurality of sliding door operating assemblies, each sliding door operating assembly to raise and lower one of the exterior bypass duct doors.

17. The adjustable size inlet system of claim 16, further comprising a plurality of equipment bays, each equipment bay comprising an upper equipment bay formed within the nacelle and sealed at one end by one of the plurality of equipment bay doors; wherein:
the one equipment bay door is raised and lowered by one of the plurality of sliding door operating assemblies;
the one equipment bay door is lowered to prevent mechanical interference with the petal array when the circumference of the adjustable size inlet lip is increased;
the one equipment bay door is raised to maintain a seal at the one end of the equipment bay when the circumference of the adjustable size inlet lip is decreased; and
the one equipment bay door further comprises an embedded linear guidebar guided by an extension track affixed over the one end of the equipment bay.

18. The adjustable size inlet system of claim 13, wherein the nacelle and adjustable size inlet system rotate to a horizontal orientation, a vertical orientation, clockwise relative to the horizontal orientation, counterclockwise relative to the horizontal orientation, clockwise relative to the vertical orientation, counterclockwise relative to the vertical orientation, and to a plurality of intermediate orientations between the horizontal orientation and the vertical orientation.

19. The adjustable size inlet system of claim 1, wherein each petal of the plurality of petal slides circumferentially apart or together from each corresponding petal when the mechanical actuators expand or contract the circumference of the adjustable size inlet lip.

20. The adjustable size inlet system of claim 1, wherein each mechanical actuator of plurality of mechanical actuators, located in bypass duct bays, comprises an actuator arm and a piston arm attached to the actuator arm at an actuator pivot between an opposed first and second end of the actuator arm, wherein:
the first end of each actuator arm is operatively coupled to an end pivot entrained in within a curved slot formed within a duct structural wall within the adjustable size inlet system; and
the second end of each actuator arm is attached to one of a plurality of structural hub and tube units within one of the plurality of nested structural tubes.

21. The adjustable size inlet of claim 20, wherein each actuator arm of the plurality of actuator arms located in bypass duct bays, wherein:
the second end of each actuator arm causes the attached structural hub and tube unit to move radially outward and causes the end pivot to slide to the lower end of the curved slot when the piston arm in the equipment bay is retracted; and
the second end of each second actuator arm causes the attached structural hub and tube unit to move radially inward and causes the end pivot to slide to an upper end of the curved slot when the piston arm in the equipment bay is extended.

22. An adjustable size inlet system for attachment to an edge of a fan duct, the adjustable size inlet system comprising:
a plurality of nested structural tubes operatively coupled in a sliding arrangement and forming a ring;
a petal array comprising a plurality of outer petals interleaved with a plurality of inner petals, the petal array arranged around a perimeter of the ring to define an adjustable size inlet lip, each petal of the petal array comprising a strip with an upper portion and a lower portion at opposite ends of the strip, wherein:
each upper portion is curved over at least a portion of the plurality of nested structural tubes to at least partially enclose the portion of the plurality of nested structural tubes; and
each lower portion is attached to the edge of the fan duct;
a plurality of mechanical actuators located in a plurality of equipment bays, each mechanical actuator comprising a piston arm attached to an actuator arm at an actuator pivot between an opposed first end and second end of the actuator arm, wherein the first end of each actuator arm is operatively coupled to an end pivot entrained within a curved slot formed within a duct structural wall within the adjustable size inlet system; and
structural hub and tube units operatively connected to the plurality of mechanical actuators, each structural hub and tube unit enclosed within one of the plurality of nested structural tubes and attached to the second end of each actuator arm, wherein:
the second end of each actuator arm moves each corresponding attached structural hub and tube Unit radially outward when the piston arm is retracted;
the second end of each actuator arm moves each corresponding attached structural hub and tube Unit radially inward when the piston arm is extended;
at least a second portion of the plurality of nested structural tubes slide circumferentially apart or together when the plurality of mechanical actuators move the plurality of structural hub and tube units outward or inward, thereby expanding or contracting a circumference of the adjustable size inlet lip;
each upper portion of each petal slides circumferentially apart or together from each corresponding adjacent upper portion of each adjacent petal when the plurality of mechanical actuators expand or contract the circumference of the adjustable size inlet lip;
each lower portion of each petal forms a curved profile when the plurality of mechanical actuators expand the circumference of the adjustable size inlet lip; and
each lower portion of each petal forms an linear profile when the plurality of mechanical actuators contract the circumference of the adjustable size inlet lip.

23. The adjustable size inlet system of claim 22, wherein an exposed surface of the petal array defines an adjustable size inlet duct, wherein the exposed surface comprises a total of all exposed surfaces of the plurality of petals in the petal array.

24. The adjustable size inlet system of claim 22, wherein:
the adjustable size inlet system assumes bellmouth inlet profile when the plurality of mechanical actuators expand the circumference of the adjustable size inlet lip; and
the adjustable size inlet system assumes a cylindrical inlet profile when the plurality of mechanical actuators contract the circumference of the adjustable size inlet lip.

25. The adjustable size inlet system of claim 22, further comprising a plurality of perimeter control actuators, each perimeter control actuator comprising:
a control rod joining box affixed to one actuator arm of the plurality of actuator arms between the first end and second end of the one actuator arm, wherein the control rod joining box comprises:
a pair of gear systems at opposite ends of the control rod joining box, each gear system comprising a threaded fitting;
a motor operatively coupled to the pair of gear systems to reversibly rotate both threaded fittings of both gear systems when the motor is activated; and
a first control rod and a second control rod, each control rod comprising a first threaded portion at a first rod end and a second threaded portion at a second rod end opposite the first rod end; wherein
each first rod end is operatively coupled to one threaded fitting of the control rod joining box by meshing the first threaded portion with the threaded fitting; and
each second rod end is operatively coupled to one adjacent threaded fitting of one adjacent control rod joining box;
wherein:
each control rod joining box is coupled to a first adjacent control rod joining box by the first control rod and to a second adjacent control rod joining box by the second control rod opposite to the first adjacent control rod joining box, forming a portion of a second continuous ring around the perimeter of the adjustable size inlet system;
each first threaded portion and each second threaded portion of each control rod translates in or out of each corresponding control rod joining box when each corresponding threaded fitting is rotated by each corresponding motor, causing the perimeter of the second continuous ring to decrease or increase; and
the operation of each motor is coordinated with the operation of the plurality of actuators to coordinate the decrease or increase of the circumference of the second continuous ring with the decrease or increase of the circumference of the adjustable size inlet lip.

26. The adjustable size inlet system of claim 22, wherein the plurality of nested structural tubes comprises:
a plurality of outer structural tubes evenly spaced around the circumference of the adjustable size inlet lip, each outer structural tube comprising a first curved tube enclosing an outer lumen extending a length of the outer structural tube and opening at each opposed end of the outer structural tube;
a plurality of inner structural tubes evenly spaced around the circumference of the adjustable size inlet lip, each inner structural tube comprising a second curved tube enclosing an inner lumen extending a length of the inner structural tube and opening at each opposed end of the inner structural tube, wherein each opposed end, and at least a portion of the inner structural tube, are situated within the outer lumen of an adjacent outer structural tube; and
the plurality of structural hub tube units evenly spaced around the circumference of the adjustable size inlet lip, each structural hub tube unit comprising a solid cylinder affixed within a third curved tube, wherein each opposed end of the third curved tube and at least a portion of the structural hub tube unit are situated within the inner lumen of an adjacent inner structural tube; wherein:

each end of each inner structural tube slides in and out of a toroidal space between the outer structural tube and the structural hub and tube unit when the plurality of mechanical actuators move the plurality of structural hub and tube units radially inward and outward.

27. The adjustable size inlet system of claim 26, further comprising a plurality of alignment pins, each alignment pin affixed at each end to an opposed pair of pin fixation fittings situated near a lateral edge of each outer petal of the petal array, wherein:

a central portion of each pin extends inward through a pair of opposed petal slots formed within an underlying petal edge of an underlying inner petal of the petal array, wherein each petal slot extends along a portion of a width of the inner petal from a distal petal slot end near the underlying edge to a proximal petal slot end;

the central portion of each pin further extends inward through a pair of opposed outer slots formed within an underlying outer tube end of an underlying outer structural tube, wherein each outer slot extends along a portion of a length of the underlying outer structural tube from a distal outer slot end near the underlying outer tube end to a proximal outer slot end;

the central portion of each pin extends inward through a pair of opposed inner slots formed within an underlying inner tube end of an underlying inner structural tube, wherein each inner slot extends along a portion of a length of the underlying inner structural tube from a distal inner slot end near the underlying inner tube end to a proximal inner slot end; and the central portion of the pin further extends through a hub slot formed within an underlying hub tube end of the structural hub and tube unit, each hub slot extending from a distal hub slot end near the underlying hub tube end for a portion of the length of the structural hub and tube unit to a proximal hub slot end.

28. The adjustable size inlet system of claim 27, wherein a range of sliding movement of the plurality of structural tubes is limited by a mechanical interference of each alignment pin with at least one or more corresponding slot ends selected from: the proximal petal slot end, the proximal outer slot end, the proximal inner slot end, the proximal hub slot ends, the distal petal slot end, the distal outer slot end, the distal inner slot end, and the distal hub slot end.

29. The adjustable size inlet system of claim 22, wherein the plurality of petals comprises a plurality of first petals interleaved between a plurality of second petals, wherein:

each first petal comprises a first left lateral edge, a first right lateral edge, and a transition slit extending inward from the first left lateral edge to a centerline situated midway between the first left and first right lateral edges;

each second petal comprises a second left lateral edge and a second right lateral edge; and each second right lateral edge is inserted into an adjacent transition strip of an adjacent first petal, wherein:

an upper portion of the second right lateral edge is situated between the underlying adjustable size inlet lip and a overlying upper portion of the adjacent first petal;

a lower portion of the second right lateral edge is situated over the lower portion of the adjacent first petal;

the second left lateral edge is situated between the underlying adjustable size inlet lip and an opposite adjacent first petal situated opposite to the adjacent first petal; and each second right lateral edge slides in and out of each transition slit when the plurality of mechanical actuators contract and expand the circumference of the adjustable size inlet lip.

30. A ducted fan propulsion system comprising:

a main fan duct and an adjustable size inlet attached at an end of the main fan duct, the adjustable size inlet comprising:

a plurality of nested structural tubes operatively coupled in a sliding arrangement and forming a ring; and a petal array comprising an interleaved plurality of petals arranged around a perimeter of the ring to define an adjustable size inlet system, each petal comprising:

an upper portion curved over, and at least partially enclosing, a first portion of the plurality of nested structural tubes; and a lower portion attached to the main fan duct; and a plurality of mechanical actuators to cause the plurality of nested structural tubes to move radially outward and inward, thereby causing an increase or a decrease of a circumference of the adjustable size inlet lip.

31. The ducted fan propulsion system of claim 30, further comprising a plurality of structural hub and tube units operatively connected to the plurality of mechanical actuators, each structural hub and tube unit enclosed within one of the plurality of nested structural tubes, wherein the plurality of mechanical actuators each cause a corresponding structural hub and tube unit to move radially inward and outward to cause the plurality of nested structural tubes to move radially inward and outward, thereby contracting or expanding the circumference of the adjustable size inlet lip.

32. The ducted fan propulsion system of claim 31, wherein each mechanical actuator of the plurality of mechanical actuators is located in an equipment bay and comprises a piston arm attached to an actuator arm at an actuator pivot between an opposed first end and second end of the actuator arm, wherein:

the first end of each actuator arm is operatively coupled to an end pivot entrained within a curved slot formed within a duct structural wall within the adjustable size inlet system;

the second end of each actuator arm is attached to one of the plurality of structural hub and tube units within one of the plurality of nested structural tubes;

the second end of each actuator arm and corresponding attached structural hub and tube unit move radially outward when the piston arm is retracted, thereby increasing the circumference of the adjustable size inlet lip;

the second end of each actuator arm and corresponding attached structural hub and tube unit move radially inward when the piston arm is extended, thereby decreasing the circumference of the adjustable size inlet lip;

at least a second portion of the plurality of nested structural tubes slide circumferentially apart or together when the plurality of mechanical actuators expand or contract the circumference of the adjustable size inlet lip;

each upper portion of the plurality of petals slides circumferentially apart or together from each corresponding adjacent upper portion when the plurality of mechanical actuators expand or contract the circumference of the adjustable size inlet lip;

each lower portion of the plurality of petals forms a curved profile when the plurality of mechanical actuators expand the circumference of the adjustable size inlet lip; and each lower portion forms a linear profile when the plurality of mechanical actuators contract the circumference of the adjustable size inlet lip.

33. The ducted fan propulsion system of claim 31, wherein each mechanical actuator is located in a bypass duct bay and comprises an actuator arm coupled at an actuator pivot between an opposed first end and second end of the actuator arm, wherein:

the first end of each actuator arm is operatively coupled to an end pivot entrained within a curved slot formed within a duct structural wall within the adjustable size inlet system;

the second end of each actuator arm is attached to one of the plurality of structural hub and tube units within one of the plurality of nested structural tubes;

the second end of each actuator arm and corresponding attached structural hub and tube unit move radially outward when the piston arm is retracted, thereby increasing the circumference of the adjustable size inlet lip;

the second end of each actuator arm and corresponding attached structural hub and tube unit move radially inward when the piston arm is extended, thereby decreasing the circumference of the adjustable size inlet lip;

at least a second portion of the plurality of nested structural tubes slide circumferentially apart or together when the plurality of mechanical actuators expand or contract the circumference of the adjustable size inlet lip;

each upper portion of the plurality of petals slides circumferentially apart or together from each corresponding adjacent upper portion when the plurality of mechanical actuators expand or contract the circumference of the adjustable size inlet lip;

each lower portion of the plurality of petals forms a curved profile when the plurality of mechanical actuators expand the circumference of the adjustable size inlet lip; and each lower portion forms a linear profile when the plurality of mechanical actuators contract the circumference of the adjustable size inlet lip.

34. A nacelle comprising:

a ducted fan wall enclosing a ducted fan and separating the ducted fan from a plurality of exterior bypass ducts each exterior bypass duct extending within the nacelle between an upper exterior bypass duct inlet, and a lower duct area operable outlet louver, wherein both the upper exterior bypass duct inlet and the lower duct area operable outlet louver open through an outer surface of the nacelle that is radially outside of the ducted fan wall;

a plurality of exterior bypass duct doors, each exterior bypass duct door of the plurality of exterior bypass duct doors seal the upper exterior bypass duct inlet when the exterior bypass duct door is raised and to open the upper exterior bypass duct inlet when the exterior bypass duct door is lowered;

a plurality of sliding door operating assemblies, each sliding door operating assembly to raise and lower one of the exterior bypass duct doors.

35. The nacelle of claim 34, wherein each bypass duct comprises an upper exterior bypass duct and a lower exterior bypass duct and each upper exterior bypass duct further comprises:

a duct wall fixed section adjacent the upper area of the bypass duct and extending toward a first end of an actuator arm of an adjustable size inlet system;

a duct wall moveable section comprising a duct wall section mounted on the actuator arm; and a pair of duct sidewall extenders, each duct sidewall extender comprising a fixed duct wall core extending outward from the duct wall fixed section and an inner extendable duct wall ply and an outer extendable duct wall ply on opposite sides of the fixed duct wall core, wherein the inner and outer extendable duct wall plies are fastened and may be raised or lowered together when the actuator arm moves radially inward or outward;

wherein:

the duct wall fixed section and the duct wall moveable section form a back wall of the upper exterior bypass duct; and the fixed duct wall cores and inner extendable duct wall ply form a pair of lateral duct walls extending outward from the back wall of the upper exterior bypass duct.

36. The nacelle of claim 35, wherein the outer extendable duct wall plies are raised and lowered by a sidewall extender operating assembly comprising:

a sidewall extender motor operatively coupled to a lower pulley wheel, the lower pulley wheel coupled to an upper pulley wheel with a belt;

an axle operatively coupled to the upper pulley wheel, the axle comprising a gear-toothed rim; and a gear strip affixed to a lateral surface of the inner extendable duct wall ply, wherein the gear strip is operatively coupled to the gear-toothed rim;

wherein the sidewall motor is activated to rotate the gear-toothed rim, causing the raising or lowering of the inner extendable duct wall ply and the fastened outer extendable duct wall ply.

37. The nacelle of claim 35, further comprising a flexible seal attached at an upper seal edge to the duct wall moveable section and attached at a lower seal edge to the duct wall fixed section.

38. The nacelle of claim 34, wherein each sliding door operating assembly comprises:

a door motor supported within a nacelle compartment;

a first lower door pulley operatively coupled to the door motor and a first upper door pulley operatively coupled to the first lower door pulley by a first belt;

a first drive wheel comprising first gear teeth operatively coupled to the first upper door pulley; and a first door gearbar attached to an interior surface of the exterior bypass duct and operatively coupled to the first gear teeth of the first drive wheel, wherein the door motor rotates the first drive wheel to translate the first door gearbar, thereby raising or lowering the attached exterior bypass duct door.

39. The nacelle of claim 38, wherein each sliding door operating assembly further raises and lowers an equipment bay door, the sliding door operating assembly further comprising:

a second lower door pulley operatively coupled to the door motor by a control gear box and axle;

a second upper door pulley operatively coupled to the second lower door pulley by a second belt;

a second drive wheel comprising second gear teeth operatively coupled to the second upper door pulley; and a second door gearbar attached to an interior surface of the equipment bay door and operatively coupled to the second gear teeth of the second drive wheel, wherein the door motor rotates the second drive wheel to translate the second door gearbar, thereby raising or lowering the attached equipment bay door.

40. The nacelle of claim 34, wherein each exterior bypass duct further comprises a rounded nose attached at a pivot affixed to an interior edge of a nacelle perimeter compartment, wherein:

the rounded nose is positioned over the edge of the nacelle perimeter compartment when the exterior bypass duct door is lowered to provide a smooth inlet edge for the open exterior bypass duct; and the nose pivots upward to provide clearance when the exterior bypass duct door is raised.

41. A nacelle comprising:

a fan duct extending between a duct inlet and a duct exit;

a plurality of interleaved petals arranged around a perimeter of the duct inlet;

a plurality of mechanical actuators to cause the plurality of interleaved petals to expand to form a bellmouth inlet profile and to contract to form a cylindrical inlet profile;

a plurality of control rods arranged around a perimeter of the fan duct to limit expansion of the plurality of interleaved petals; and a plurality of sliding doors arranged around an outer perimeter of the nacelle adjacent to the plurality of interleaved petals, the plurality of sliding doors sliding to remain adjacent to the plurality of interleaved petals throughout the expansion and contraction of the plurality of interleaved petals.

42. The nacelle of claim 41 further comprising a plurality of sidewall extenders within the nacelle to shorten and elongate, each sidewall extender shortening and elongating to adjust a length of a sidewall within the nacelle formed by each sidewall extender, thereby accommodating the expansion and contraction of the plurality of interleaved petals.

\* \* \* \* \*